United States Patent
Li et al.

(10) Patent No.: US 12,209,922 B2
(45) Date of Patent: Jan. 28, 2025

(54) PRESSURE DETECTION STRUCTURE AND ELECTRONIC DEVICE

(71) Applicant: HUAWEI TECHNOLOGIES CO., LTD., Shenzhen (CN)

(72) Inventors: Wenbo Li, Shanghai (CN); Xinyu Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/794,123

(22) PCT Filed: Nov. 2, 2020

(86) PCT No.: PCT/CN2020/125953
§ 371 (c)(1),
(2) Date: Jul. 20, 2022

(87) PCT Pub. No.: WO2021/147445
PCT Pub. Date: Jul. 29, 2021

(65) Prior Publication Data
US 2023/0055731 A1 Feb. 23, 2023

(30) Foreign Application Priority Data
Jan. 22, 2020 (CN) .......................... 202010075715.9

(51) Int. Cl.
*G01L 1/18* (2006.01)
*G06F 3/041* (2006.01)

(52) U.S. Cl.
CPC .............. *G01L 1/18* (2013.01); *G06F 3/0414* (2013.01)

(58) Field of Classification Search
CPC .................................. G01L 1/18; G06F 3/0414
See application file for complete search history.

(56) References Cited

U.S. PATENT DOCUMENTS

2007/0277616 A1* 12/2007 Nikkel .................. G01L 9/0073
73/715
2015/0277502 A1* 10/2015 Witham ............... H04B 1/3888
269/287

(Continued)

FOREIGN PATENT DOCUMENTS

| CN | 104468950 A | 3/2015 |
| CN | 104697701 A | 6/2015 |

(Continued)

*Primary Examiner* — Jamel E Williams
(74) *Attorney, Agent, or Firm* — Rimon PC

(57) ABSTRACT

A pressure detection structure and an electronic device are provided that improve sensitivity and accuracy of pressure detection. The pressure detection structure includes: N piezo-resistors connected at the first dielectric layer to form a Wheatstone bridge, where an opening of a first cavity is provided on the first surface of the substrate. The two ends, in a first direction, of the vertical projection of a first piezo-resistor among the N piezo-resistors on a contact surface between the N piezo-resistors and the first dielectric layer are located respectively on the two sides, in the first direction, of the vertical projection of the first cavity on the contact surface. The long side of a second piezo-resistor among the N piezo-resistors is perpendicular to the first direction, and the vertical projection of the second piezo-resistor on the contact surface does not overlap with the vertical projection of the first cavity.

20 Claims, 29 Drawing Sheets

(56) References Cited

U.S. PATENT DOCUMENTS

2017/0123548 A1* 5/2017 Shih .......................... G01L 1/22
2019/0368952 A1* 12/2019 Li ........................... G06F 3/016

FOREIGN PATENT DOCUMENTS

| | | | |
|---|---|---|---|
| CN | 204652340 U | 9/2015 | |
| CN | 104995587 A | 10/2015 | |
| CN | 105094449 A | 11/2015 | |
| CN | 106066219 A | 11/2016 | |
| CN | 106066737 A | 11/2016 | |
| CN | 107526480 A | 12/2017 | |
| CN | 107643621 A | 1/2018 | |
| CN | 108540119 A | 9/2018 | |
| CN | 109540355 A | 3/2019 | |
| CN | 109827681 A | 5/2019 | |
| CN | 109917948 A | 6/2019 | |
| CN | 110031136 A | 7/2019 | |
| CN | 110095212 A | 8/2019 | |
| CN | 110617914 A | 12/2019 | |
| EP | 1087219 A2 * | 3/2001 | ............... G01D 3/08 |
| WO | 2018093031 A1 | 5/2018 | |
| WO | 2018133054 A1 | 7/2018 | |

* cited by examiner

PRESSURE DETECTION STRUCTURE AND ELECTRONIC DEVICE

CROSS-REFERENCE TO RELATED APPLICATION

This application is a National Stage of International Patent Application No. PCT/CN2020/125953 filed on Nov. 2. 2020, which claims priority to Chinese Patent Application No. 20/201,0075715.9, filed on Jan. 22, 2020. Both of the aforementioned applications are hereby incorporated by reference in their entireties.

TECHNICAL FIELD

Embodiments of this application relate to the field of touch control technologies, and in particular, to a pressure detection structure and an electronic device.

BACKGROUND

With development of mobile device technologies, integration becomes a trend, and has great advantages in terms of waterproofing and user experience. To implement integration of a mobile terminal, an electronic device may be provided with a pressure detection structure including a piezo-resistor in an area in which a physical button (also referred to as an entity button) needs to be disposed. The pressure detection structure may detect, based on a piezoresistive characteristic of the piezo-resistor, a press operation input by the user, to implement specific functions of the physical button such as taking a screenshot, photographing, and volume adjustment. Such a button that implements a button function based on a piezoresistive characteristic of a piezo-resistor may be referred to as a pressure-sensitive button. Alternatively, this type of button may be referred to as a virtual key or the like because this type of button may be not visible on a housing of the electronic device.

A principle of using the piezo-resistor for pressure detection is: When the area in which the piezo-resistor is disposed on the electronic device is subject to pressure by an external force, the external force is transferred to the piezo-resistor through the housing of the electronic device, causing the piezo-resistor to deform. A resistance value of the piezo-resistor that deforms changes. In this case, the pressure detection structure may detect a pressure signal (an electrical signal generated due to resistance value change). The electronic device may implement the foregoing related functions based on the pressure signal.

However, there are many problems with the foregoing pressure-sensitive button to be resolved. For example, in the foregoing pressure detection process, deformation of the piezo-resistor may be not obvious for reasons such as great thickness of the housing of the electronic device and exerting a force unevenly on the area in which the piezo-resistor is disposed on the electronic device. In other words, a deformation degree (that is, a strain) of the piezo-resistor is small. Consequently, sensitivity of pressure detection is low, and accuracy of pressure detection is affected.

In addition, the resistance value of the piezo-resistor changes due to piezo-resistor deformation, and the resistance value of the piezo-resistor is also affected by environmental conditions (such as temperature and humidity). Temperature significantly affects the resistance value of the piezo-resistor. However, in the foregoing solution, impact of temperature on the piezo-resistor is not considered. Therefore, accuracy of pressure detection is low.

SUMMARY

This application provides a pressure detection structure and an electronic device that can increase a strain of a piezo-resistor, and therefore pressure detection sensitivity can be improved, and impact of temperature on a resistance value of the piezo-resistor can be reduced. In this way, accuracy of pressure detection can be improved.

According to a first aspect, this application provides an electronic device. The electronic device may include a processor and one or more pressure detection structures. The processor is connected to an output end of the pressure detection structure. The pressure detection structure includes a substrate, a first dielectric layer, and N piezo-resistors.

A first cavity is disposed in the substrate, and an opening of the first cavity is provided on a first surface of the substrate. A first dielectric layer is fastened to a first surface of the substrate. The N piezo-resistors are fastened to the first dielectric layer, where N≥2, and N is an integer. The N piezo-resistors include first piezo-resistors and second piezo-resistors. The first piezo-resistors and the second piezo-resistors are made of the same material and have the same resistance value. The two ends, in a first direction, of the vertical projection of the first piezo-resistor on a contact surface between the N piezo-resistors and the first dielectric layer are located respectively on the two sides, in the first direction, of the vertical projection of the first cavity on the contact surface. The first direction is parallel to the long side of the first piezo-resistor. The vertical projection of the second piezo-resistor on the contact surface does not overlap with the vertical projection of the first cavity on the contact surface.

The N piezo-resistors are connected at the first dielectric layer to form a Wheatstone bridge. An output end of the Wheatstone bridge is the output end of the foregoing pressure detection structure. When a second surface of the substrate facing the first surface is pressed by an external force, a stress is transferred to the first dielectric layer, causing the first piezo-resistor to deform. Deformation of the first piezo-resistor causes a resistance value change of the first piezo-resistor, and further causes an output voltage change of the Wheatstone bridge. The processor is configured to: receive an output voltage of the Wheatstone bridge, and determine, based on an input voltage, a press operation performed by a user on a pressure-sensitive button formed by the pressure detection structure, so that the electronic device performs a function corresponding to the press operation.

On one hand, when an external force is exerted on the second surface of the substrate, the substrate bends and deforms. A normal stress is converted into a shear stress tangent to the second face and transferred to the first dielectric layer. In addition, because the first cavity is disposed on the first surface of the substrate, when the substrate bends and deforms, strain amplification may be generated in the first cavity, maximizing the strain at the top of the first cavity. Further, because the opening is provided at the top of the first cavity, the strain of the first cavity is concentrated at the opening of the first cavity, and there is no device supporting at the opening. In this way, a strain amplification effect can be achieved.

The two ends, in the first direction, of the vertical projection of the first piezo-resistor on the contact surface are located respectively on the two sides, in the first direction, of the vertical projection of the first cavity on the contact surface, in other words, the first piezo-resistor spans the first cavity in the first direction, and is located at the opening at the top of the first cavity. Therefore, a shear stress from the substrate may be intensively exerted in a direction of the long side of the first piezo-resistor. As a result, the first piezo-resistor is stretched in the direction of the long side of the first piezo-resistor and deforms greatly. In conclusion, in the foregoing design, when an external force is exerted on the substrate, the shear stress transferred to the first dielectric layer may be intensively exerted in the direction of the long side of the first piezo-resistor. In this way, strain concentration and strain amplification of the first piezo-resistor is achieved. In this way, deformation of the first piezo-resistor can be increased, and therefore pressure detection sensitivity is improved.

On the other hand, because the vertical projection of the second piezo-resistor on the contact surface does not overlap with the vertical projection of the first cavity on the contact surface, a shear stress generated due to deformation of the first cavity may be prevented from being exerted on the second piezo-resistor. Therefore, deformation of the second piezo-resistor may be avoided, and a strain of the second piezo-resistor may be minimized, so that the strain of the second piezo-resistor approaches zero. In this way, even if the substrate is subject to an external force, the second piezo-resistor does not deform under the stress from the substrate, and the resistance value of the second piezo-resistor does not change.

It can be learned from the foregoing description that when the substrate is subject to an external force, the resistance value of the first piezo-resistor changes, but the resistance value of the second piezo-resistor does not change. However, the resistance values of the first piezo-resistor and the second piezo-resistor are affected by temperature. In addition, temperature affects the resistance values of the first piezo-resistor and the second piezo-resistor to basically the same extent. Therefore, in this application, because the N piezo-resistors are connected at the first dielectric layer to form the Wheatstone bridge, impact of temperature on the resistance value of the first piezo-resistor may be offset by impact of temperature on the resistance value of the second piezo-resistor. In this way, impact of temperature on pressure detection can be reduced or even avoided.

In conclusion, according to the foregoing solution, a strain of a piezo-resistor can be increased, pressure detection sensitivity can be improved, and impact of temperature on a resistance value of the piezo-resistor can be reduced. In this way, accuracy of pressure detection can be improved.

It should be noted that the resistance values of the first piezo-resistor and the second piezo-resistor being the same specifically means that initial resistance values of the first piezo-resistor and the second piezo-resistor are the same. The initial resistance value is a resistance value of a piezo-resistor not affected by an external factor (such as an external force or a temperature change).

With reference to the first aspect, in a possible design, the substrate may be made of an elastic material or a rigid material. For example, the material of the substrate may be any one of glass, plastic, metal, ceramic, wood, or the like. The first cavity may be a through cavity or a non-through cavity.

With reference to the first aspect, in another possible design, the substrate may be an integrated substrate.

In one case, the integrated substrate may be a middle frame of the electronic device. An inner side of the middle frame is the first surface of the substrate, and the first cavity is disposed on the inner side of the middle frame.

In another case, the integrated substrate may be an independent component, that is, a component independent of the middle frame of the electronic device. In this case, the second surface of the substrate is attached to the inner side of the middle frame. Alternatively, the second surface of the substrate is attached to a lower surface of a display screen of the electronic device.

With reference to the first aspect, in another possible design, the substrate may be fastened to the inner side of the middle frame or the lower surface of the display screen of the electronic device by using adhesive, welding, screwing, or the like.

With reference to the first aspect, in another possible design, the substrate may be fastened to the inner side of the middle frame or the lower surface of the display screen of the electronic device by using adhesive. For example, the substrate may be stuck to the inner side of the middle frame or the lower surface of the display screen of the electronic device by using glue with a high elastic modulus. The glue with a high elastic modulus refers to glue whose elastic modulus is greater than a first modulus threshold.

A higher elastic modulus of an object indicates better normal stress transfer performance of the object. Therefore, the substrate is fastened to the inner side of the middle frame or the lower surface of the display screen of the electronic device by using the glue with a high elastic modulus. In this way, a loss of a normal stress transferred from the middle frame or the display screen to the substrate can be reduced, and the substrate is subject to a maximum normal stress. This helps implement strain amplification.

With reference to the first aspect, in another possible design, the substrate may alternatively be a non-integrated substrate. Specifically, a second cavity is disposed on an inner side of a middle frame of the electronic device. An opening of the second cavity is provided on the inner side of the middle frame. The substrate may include a first module that is provided with a through hole and the middle frame that is provided with the second cavity.

The first module is fastened to a surface, of the middle frame, on which the second cavity is disposed, and a first opening of the through hole of the first module corresponds to an opening of the second cavity. The second cavity and the through hole of the first module form a first cavity, and a second opening of the through hole of the first module is the opening of the first cavity. In other words, one part of the substrate is disposed on the middle frame of the electronic device, and the other part is attached to the inner side of the middle frame. Such a design is conducive to assembly of the pressure detection structure on the electronic device.

With reference to the first aspect, in another possible design, the first module may be fastened to the inner side of the middle frame by using adhesive, welding, screwing, or the like.

With reference to the first aspect, in another possible design, the first module may be fastened on the inner side of the middle frame (that is, a surface on which the opening of the second cavity in the middle frame is provided) by using glue with a high elastic modulus. The glue with a high elastic modulus refers to glue whose elastic modulus is greater than a first modulus threshold.

A higher elastic modulus of an object indicates better normal stress transfer performance of the object. Therefore, the first module is fastened on the inner side of the middle frame by using the glue with a high elastic modulus. This can reduce a loss of a normal stress transferred from the middle frame to the first module, so that the substrate is subject to a maximum normal stress. This helps implement strain amplification.

With reference to the first aspect, in another possible design, the first dielectric layer is an elastic dielectric layer. The first dielectric layer may be fastened to the first surface of the substrate in any manner, for example, using adhesive, welding, or screwing.

With reference to the first aspect, in another possible design, the first dielectric layer may be fastened to the first surface of the substrate by using glue (also referred to as adhesive). A shear modulus of the glue is greater than a second modulus threshold.

It may be understood that the substrate transfers a shear stress tangent to the first direction to the first dielectric layer. A higher shear modulus of an object indicates better shear stress transfer performance of the object. In addition, a larger shear stress exerted on a piezo-resistor indicates a larger strain (that is, a deformation degree) of the piezo-resistor in a direction of the shear stress. Therefore, glue with a high shear modulus is used to fasten the first dielectric layer to the first surface of the substrate. This can improve performance of shear stress transfer between the substrate and the first dielectric layer, and reduce a loss of a shear stress transferred from the substrate to the first dielectric layer. In this way, the first dielectric layer is subject to a maximum shear stress, which facilitates strain amplification.

With reference to the first aspect, in another possible design, the two ends, in the first direction, of the vertical projection of the first piezo-resistor on the contact surface are located beyond the vertical projection of the first cavity on the contact surface. This reduces a possibility that an electrode is peeled off because the first piezo-resistor is subject to the shear stress tangent to the contact surface.

With reference to the first aspect, in another possible design, the center line, in a second direction, of the vertical projection of the first piezo-resistor on the contact surface coincides with the center line, in the second direction, of the vertical projection of the first cavity on the contact surface. In this application, the second direction is perpendicular to the first direction. Details are not described below. In this way, a force may be evenly exerted on the first piezo-resistor. This reduces a possibility that an electrode is peeled off because the first piezo-resistor is subject to a shear stress tangent to the contact surface.

With reference to the first aspect, in another possible design, a long side of the second piezo-resistor is perpendicular to the first direction. If a stress is exerted in a direction of a long side of a piezo-resistor, the piezo-resistor may be stretched in the direction of the long side, and then the piezo-resistor greatly deforms. If a stress is exerted in a direction of a short side of the piezo-resistor, it is difficult to stretch the piezo-resistor in the direction of the short side, and therefore great deformation of the piezo-resistor is difficult.

It may be understood that the substrate transfers the shear stress tangent to the first direction to the first dielectric layer when the substrate is subject to an external force. In a case in which the long side of the second piezo-resistor is perpendicular to the first direction, the shear stress is exerted in a direction of a short side of the second piezo-resistor, and therefore it is difficult to stretch the second piezo-resistor in the direction of the short side, and great deformation of the second piezo-resistor is difficult. In this design, a strain of the second piezo-resistor approaches zero, which helps improve the accuracy of pressure detection.

With reference to the first aspect, in another possible design, N=4. The N piezo-resistors may include two first piezo-resistors and two second piezo-resistors. The four piezo-resistors may be connected at the first dielectric layer to form a full bridge, that is, two half bridges, of the Wheatstone bridge. The distribution of the vertical projections of the two second piezo-resistors on the contact surface is symmetric about the center line, in the second direction, of the vertical projection of the first cavity on the contact surface. That is, the two second piezo-resistors are symmetrically disposed on the two sides of the first cavity.

It may be understood that deformation of the two second piezo-resistors symmetrically disposed on the two sides of the first cavity is almost the same, and resistance values of the two second piezo-resistors are also almost the same, where deformation of the two second piezo-resistors is caused by deformation of the first cavity. Therefore, in the foregoing design, impact of a distribution manner of the piezo-resistors on the resistance values of the piezo-resistors can be reduced, and the accuracy of pressure detection can be further improved.

With reference to the first aspect, in another possible design, when N=4, the Wheatstone bridge includes a first output end and a second output end.

The processor is further configured to: receive an output voltage of the first output end and an output voltage of the second output end, use the difference between the output voltage of the first output end and the output voltage of the second output end as a pressure signal, and determine, based on the pressure signal, a press operation performed by the user on the pressure-sensitive button, so that the electronic device performs a function corresponding to the press operation.

The difference between the output voltage of the first output end and the output voltage of the second output end is used as the pressure signal, which can offset the impact of temperature on the resistance value of the piezo-resistor. In this way, the impact of temperature on pressure detection can be reduced or even avoided.

With reference to the first aspect, in another possible design, N=2. The N piezo-resistors include a first piezo-resistor and a second piezo-resistor. The two piezo-resistors may be connected at the first dielectric layer to form a half bridge of the Wheatstone bridge. A long side of the second piezo-resistor is perpendicular to the first direction. In this way, a strain of the second piezo-resistor approaches zero, which helps improve the accuracy of pressure detection.

With reference to the first aspect, in another possible design, N=6. The N piezo-resistors include two first piezo-resistors and four second piezo-resistors. The six piezo-resistors may be connected at the first dielectric layer to form three half bridges of the Wheatstone bridge.

Among the four second piezo-resistors, the distribution of the vertical projections of two second piezo-resistors on the contact surface is symmetric about the center line, in a second direction, of the vertical projection of the first cavity on the contact surface. As to the other two second piezo-resistors, one second piezo-resistor is parallel to the first direction, and the other second piezo-resistor is perpendicular to the first direction.

It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this application, long sides of some second piezo-resistors are perpendicular to the first direction, and long sides of some second piezo-resistors are parallel to the first direction, so that impact of a distribution manner of the piezo-resistors on the resistance values of the piezo-resistors can be reduced. In this way, the accuracy of pressure detection can be further improved.

With reference to the first aspect, in another possible design, when N=6, the Wheatstone bridge includes a third output end, a fourth output end, and a fifth output end.

The processor is further configured to: receive an output voltage of the third output end, an output voltage of the fourth output end, and an output voltage of the fifth output end; use the difference between the output voltage of the third output end and the output voltage of the fourth output end as a pressure signal; determine, based on the pressure signal, a press operation performed by the user on the pressure-sensitive button, so that the electronic device performs a function corresponding to the press operation; and use a variation of the output voltage of the fifth output end as a temperature compensation signal, to eliminate impact of temperature on the pressure signal.

With reference to the first aspect, in another possible design, N=8, and the N piezo-resistors include two first piezo-resistors and six second piezo-resistors. The eight piezo-resistors may be connected at the first dielectric layer to form four half bridges of the Wheatstone bridge. Among the six second piezo-resistors, the distribution of the vertical projections of every two second piezo-resistors on the contact surface is symmetric about the center line, in the second direction, of the vertical projection of the first cavity on the contact surface.

It may be understood that deformation of two second piezo-resistors symmetrically disposed on two sides of the first cavity is almost the same, and resistance values of the two second piezo-resistors are also almost the same, where deformation of the two second piezo-resistors is caused by deformation of the first cavity. Therefore, in the foregoing design, impact of a distribution manner of the piezo-resistors on the resistance values of the piezo-resistors can be reduced, and the accuracy of pressure detection can be further improved.

With reference to the first aspect, in another possible design, among the six second piezo-resistors, four second piezo-resistors are perpendicular to the first direction, and the other two second piezo-resistors are parallel to the first direction. It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this application, long sides of some second piezo-resistors are perpendicular to the first direction, and long sides of some second piezo-resistors are parallel to the first direction, so that impact of a distribution manner of the piezo-resistors on the resistance values of the piezo-resistors can be reduced. In this way, the accuracy of pressure detection can be further improved.

With reference to the first aspect, in another possible design, when N=8, the Wheatstone bridge includes a sixth output end, a seventh output end, an eighth output end, and a ninth output end.

The processor is further configured to calculate a first difference, a variation of the first difference, a second difference, a variation of the second difference, a third difference, and a variation of the third difference. The first difference is a difference between an output voltage of the sixth output end and an output voltage of the ninth output end. The second difference is a difference between an output voltage of the seventh output end and an output voltage of the eighth output end. The third difference is a difference between an output voltage of the eighth output end and an output voltage of the ninth output end.

The processor is further configured to: receive the output voltages of the sixth output end, the seventh output end, the eighth output end, and the ninth output end; use a sum of the variation of the first difference and the variation of the second difference as a pressure signal; and determine, based on the pressure signal, a press operation performed by the user on the pressure-sensitive button, so that the electronic device performs a function corresponding to the press operation.

The processor is further configured to: use the variation of the third difference as a temperature compensation signal to eliminate impact of temperature on the pressure signal; and use a difference between the variation of the first difference and the variation of the second difference as a distortion signal to eliminate impact of deformation of the second piezo-resistor on the pressure signal.

With reference to the first aspect, in another possible design, the first piezo-resistor and the second piezo-resistor are rectangular block materials made of a polymer. Alternatively, the first piezo-resistor and the second piezo-resistor are strain resistors or strain gauges made of metal or a semiconductor material. In this application, a functional layer (for example, the first piezo-resistor and the second piezo-resistor) needs to be manufactured/printed on only single side of the first dielectric layer. A manufacture process is simple, assembly and mass production are easy, and production costs of the pressure detection structure can be reduced.

With reference to the first aspect, in another possible design, the opening of the first cavity is smaller than a distance between two opposite cavity walls in the first cavity. The opening of the first cavity being smaller than the distance between two opposite cavity walls in the first cavity helps improve the strain amplification effect of the substrate.

With reference to the first aspect, in another possible design, the opening of the first cavity may be an arc extending inwards from the cavity walls of the first cavity. Such a design helps improve the strain amplification effect of the substrate and a structural strength of the substrate.

With reference to the first aspect, in another possible design, a bottom of the first cavity may be an arc extending inwards from the cavity walls of the first cavity. Such a design helps improve the structural strength of the substrate.

With reference to the first aspect, in another possible design, a shape of a cross section of the first cavity is any one of a triangle, a trapezoid, a rectangle, a polygon, a circle, a sector, or an ellipse.

With reference to the first aspect, in another possible design, the pressure detection structure further includes a second dielectric layer and a capacitive layer. The second dielectric layer is fastened to the second surface of the substrate, and the second surface of the substrate faces the first surface of the substrate. The capacitive layer is fastened to the second dielectric layer. The capacitive layer includes one or more metal electrodes connected to a circuit. When a finger of the user approaches or touches the second dielectric layer, an electric charge flow occurs on the metal electrode, and the capacitive layer outputs an electrical signal.

With reference to the first aspect, in another possible design, the second dielectric layer may be fastened to the second surface of the substrate by using glue (also referred to as adhesive). The glue is glue with a high elastic modulus, for example, glue whose elastic modulus is greater than the first modulus threshold. The second dielectric layer is fastened to the second surface of the substrate by using the glue with a high elastic modulus. In this way, a loss of a normal stress transferred from the second dielectric layer to the substrate can be reduced, and the substrate is subject to a maximum normal stress, which helps strain amplification.

With reference to the first aspect, in another possible design, the pressure detection structure further includes an insulating protection layer. The insulating protection layer is disposed on the first dielectric layer, and is configured to protect the first dielectric layer and the N piezo-resistors from being external conduction and from being affected by an external factor. The external factor may include ambient humidity.

With reference to the first aspect, in another possible design, the electronic device further includes a battery and a power management module. The power management module is configured to receive an input from the battery, to supply power to the processor, the memory, and the pressure detection structure.

The power management module outputs a constant voltage to the pressure detection structure, where the constant voltage includes a voltage of any voltage value such as 1.8 V, 3.3 V, or 5 V; or the power management module outputs a constant current to the pressure detection structure, where the constant current includes a current of any current value such as 0.3 mA, 0.5 mA, or 1 mA.

According to a second aspect, this application provides a pressure detection structure. The pressure detection structure includes a substrate, a first dielectric layer, and N piezo-resistors.

A first cavity is disposed in the substrate, and an opening of the first cavity is provided on a first surface of the substrate. A first dielectric layer is fastened to a first surface of the substrate. The N piezo-resistors are fastened to the first dielectric layer, where N≥2, and N is an integer. The N piezo-resistors include first piezo-resistors and second piezo-resistors. The first piezo-resistors and the second piezo-resistors are made of the same material and have the same resistance value. The two ends, in a first direction, of the vertical projection of the first piezo-resistor on a contact surface between the N piezo-resistors and the first dielectric layer are located respectively on the two sides, in the first direction, of the vertical projection of the first cavity on the contact surface. The first direction is parallel to the long side of the first piezo-resistor. The vertical projection of the second piezo-resistor on the contact surface does not overlap with the vertical projection of the first cavity on the contact surface.

The N piezo-resistors are connected at the first dielectric layer to form a Wheatstone bridge. When a second surface of the substrate facing the first surface is pressed by an external force, a stress is transferred to the first dielectric layer, causing the first piezo-resistor to deform. Deformation of the first piezo-resistor causes a resistance value change of the first piezo-resistor, and further causes an output voltage change of the Wheatstone bridge.

It should be noted that for a principle of strain amplification of the pressure detection structure and improving pressure detection sensitivity, and a principle of reducing impact of temperature on a resistance value of a piezo-resistor and improving pressure detection accuracy, refer to the detailed description in the first aspect. Details are not described herein again.

With reference to the second aspect, in a possible design, the substrate may be made of an elastic material or a rigid material. For example, the material of the substrate may be any one of glass, plastic, metal, ceramic, wood, or the like. The first cavity may be a through cavity or a non-through cavity.

With reference to the second aspect, in another possible design, the substrate may be an integrated substrate.

In one case, the integrated substrate may be a middle frame of an electronic device. An inner side of the middle frame is the first surface of the substrate, and the first cavity is disposed on the inner side of the middle frame.

In another case, the integrated substrate may be an independent component, that is, a component independent of the middle frame of the electronic device. In this case, the second surface of the substrate is attached to the inner side of the middle frame. Alternatively, the second surface of the substrate is attached to a lower surface of a display screen of the electronic device.

With reference to the second aspect, in another possible design, the substrate may be fastened to the inner side of the middle frame or the lower surface of the display screen of the electronic device by using adhesive, welding, screwing, or the like.

With reference to the second aspect, in another possible design, the substrate may be fastened to the inner side of the middle frame or the lower surface of the display screen of the electronic device by using glue with a high elastic modulus. The glue with a high elastic modulus refers to glue whose elastic modulus is greater than a first modulus threshold.

A higher elastic modulus of an object indicates better normal stress transfer performance of the object. Therefore, the substrate is fastened to the inner side of the middle frame or the lower surface of the display screen of the electronic device by using the glue with a high elastic modulus. In this way, a loss of a normal stress transferred from the middle frame or the display screen to the substrate can be reduced, and the substrate is subject to a maximum normal stress. This helps implement strain amplification.

With reference to the second aspect, in another possible design, the substrate may alternatively be a non-integrated substrate. Specifically, the substrate may include a first module that is provided with a through hole and a middle frame that is provided with a second cavity.

The middle frame is a middle frame of an electronic device on which the pressure detection structure is installed. The second cavity is disposed on an inner side of the middle frame. An opening of the second cavity is provided on the inner side of the middle frame. The first module is fastened to a surface, of the middle frame, on which the second cavity is disposed, and a first opening of the through hole of the first module corresponds to an opening of the second cavity. The second cavity and the through hole of the first module form a first cavity, and a second opening of the through hole of the first module is the opening of the first cavity. In other words, one part of the substrate is disposed on the middle frame of the electronic device, and the other part is attached to the inner side of the middle frame. Such a design is conducive to assembly of the pressure detection structure on the electronic device.

With reference to the second aspect, in another possible design, the first module may be fastened to the inner side of the middle frame by using adhesive, welding, screwing, or the like.

With reference to the second aspect, in another possible design, the first module may be fastened on the inner side of the middle frame (that is, a surface on which the opening of the second cavity in the middle frame is provided) by using glue with a high elastic modulus. The glue with a high elastic modulus refers to glue whose elastic modulus is greater than a first modulus threshold.

A higher elastic modulus of an object indicates better normal stress transfer performance of the object. Therefore, the first module is fastened on the inner side of the middle frame by using the glue with a high elastic modulus. This can reduce a loss of a normal stress transferred from the middle frame to the first module, so that the substrate is subject to a maximum normal stress. This helps implement strain amplification.

With reference to the second aspect, in another possible design, the first dielectric layer is an elastic dielectric layer. The first dielectric layer may be fastened to the first surface of the substrate in any manner, for example, using adhesive, welding, or screwing.

With reference to the second aspect, in another possible design, the first dielectric layer may be fastened to the first surface of the substrate by using glue (also referred to as adhesive). A shear modulus of the glue is greater than a second modulus threshold.

It may be understood that the substrate transfers a shear stress tangent to the first direction to the first dielectric layer. A higher shear modulus of an object indicates better shear stress transfer performance of the object. In addition, a larger shear stress exerted on a piezo-resistor indicates a larger strain (that is, a deformation degree) of the piezo-resistor in a direction of the shear stress. Therefore, glue with a high shear modulus is used to fasten the first dielectric layer to the first surface of the substrate. This can improve performance of shear stress transfer between the substrate and the first dielectric layer, and reduce a loss of a shear stress transferred from the substrate to the first dielectric layer. In this way, the first dielectric layer is subject to a maximum shear stress, which facilitates strain amplification.

With reference to the second aspect, in another possible design, the two ends, in the first direction, of the vertical projection of the first piezo-resistor on the contact surface are located beyond the vertical projection of the first cavity on the contact surface. This reduces a possibility that an electrode is peeled off because the first piezo-resistor is subject to a shear stress tangent to the contact surface.

With reference to the second aspect, in another possible design, the center line, in a second direction, of the vertical projection of the first piezo-resistor on the contact surface coincides with the center line, in the second direction, of the vertical projection of the first cavity on the contact surface. In this application, the second direction is perpendicular to the first direction. Details are not described below. In this way, a force may be evenly exerted on the first piezo-resistor. This reduces a possibility that an electrode is peeled off because the first piezo-resistor is subject to a shear stress tangent to the contact surface.

With reference to the second aspect, in another possible design, a long side of the second piezo-resistor is perpendicular to the first direction. If a stress is exerted in a direction of a long side of a piezo-resistor, the piezo-resistor may be stretched in the direction of the long side, and then the piezo-resistor greatly deforms. If a stress is exerted in a direction of a short side of the piezo-resistor, it is difficult to stretch the piezo-resistor in the direction of the short side, and therefore great deformation of the piezo-resistor is difficult.

It may be understood that the substrate transfers the shear stress tangent to the first direction to the first dielectric layer when the substrate is subject to an external force. In a case in which the long side of the second piezo-resistor is perpendicular to the first direction, the shear stress is exerted in a direction of a short side of the second piezo-resistor, and therefore it is difficult to stretch the second piezo-resistor in the direction of the short side, and great deformation of the second piezo-resistor is difficult. In this design, a strain of the second piezo-resistor approaches zero, which helps improve the accuracy of pressure detection.

With reference to the second aspect, in another possible design, N=4. The N piezo-resistors may include two first piezo-resistors and two second piezo-resistors. The four piezo-resistors may be connected at the first dielectric layer to form a full bridge, that is, two half bridges, of the Wheatstone bridge. The distribution of the vertical projections of the two second piezo-resistors on the contact surface is symmetric about the center line, in the second direction, of the vertical projection of the first cavity on the contact surface. That is, the two second piezo-resistors are symmetrically disposed on the two sides of the first cavity.

It may be understood that deformation of two second piezo-resistors symmetrically disposed on two sides of the first cavity is almost the same, and resistance values of the two second piezo-resistors are also almost the same, where deformation of the two second piezo-resistors is caused by deformation of the first cavity. Therefore, in the foregoing design, impact of a distribution manner of the piezo-resistors on the resistance values of the piezo-resistors can be reduced, and the accuracy of pressure detection can be further improved.

With reference to the second aspect, in another possible design, N=2. The N piezo-resistors include a first piezo-resistor and a second piezo-resistor. The two piezo-resistors may be connected at the first dielectric layer to form a half bridge of the Wheatstone bridge. A long side of the second piezo-resistor is perpendicular to the first direction. In this way, a strain of the second piezo-resistor approaches zero, which helps improve the accuracy of pressure detection.

With reference to the second aspect, in another possible design, N=6. The N piezo-resistors include two first piezo-resistors and four second piezo-resistors. The six piezo-resistors may be connected at the first dielectric layer to form three half bridges of the Wheatstone bridge.

Among the four second piezo-resistors, the distribution of the vertical projections of two second piezo-resistors on the contact surface is symmetric about a center line, in a second direction, of the vertical projection of the first cavity on the contact surface. As to the other two second piezo-resistors, one second piezo-resistor is parallel to the first direction, and the other second piezo-resistor is perpendicular to the first direction.

It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this application, long sides of some second piezo-resistors are perpendicular to the first direction, and long sides of some second piezo-resistors are parallel to the first direction, so that impact of a distribution manner of the piezo-resistors on the resistance values of the piezo-resistors can be reduced. In this way, the accuracy of pressure detection can be further improved.

With reference to the second aspect, in another possible design, N=8, and the N piezo-resistors include two first piezo-resistors and six second piezo-resistors. The eight piezo-resistors may be connected at the first dielectric layer to form four half bridges of the Wheatstone bridge. Among the six second piezo-resistors, the distribution of the vertical projections of every two second piezo-resistors on the contact surface is symmetric about the center line, in the second direction, of the vertical projection of the first cavity on the contact surface.

It may be understood that deformation of two second piezo-resistors symmetrically disposed on two sides of the first cavity is almost the same, and resistance values of the two second piezo-resistors are also almost the same, where deformation of the two second piezo-resistors is caused by deformation of the first cavity. Therefore, in the foregoing design, the impact of a distribution manner of the piezo-resistors on the resistance values of the piezo-resistors can be reduced, and the accuracy of pressure detection can be further improved.

With reference to the second aspect, in another possible design, among the six second piezo-resistors, four second piezo-resistors are perpendicular to the first direction, and the other two second piezo-resistors are parallel to the first direction. It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this application, long sides of some second piezo-resistors are perpendicular to the first direction, and long sides of some second piezo-resistors are parallel to the first direction, so that the impact of a distribution manner of the piezo-resistors on the resistance values of the piezo-resistors can be reduced. In this way, the accuracy of pressure detection can be further improved.

With reference to the second aspect, in another possible design, the first piezo-resistor and the second piezo-resistor are rectangular block materials made of a polymer. Alternatively, the first piezo-resistor and the second piezo-resistor are strain resistors or strain gauges made of metal or a semiconductor material. In this application, a functional layer (for example, the first piezo-resistor and the second piezo-resistor) needs to be manufactured/printed on only single side of the first dielectric layer. A manufacture process is simple, assembly and mass production are easy, and production costs of the pressure detection structure can be reduced.

With reference to the second aspect, in another possible design, the opening of the first cavity is smaller than a distance between two opposite cavity walls in the first cavity. The opening of the first cavity being smaller than the distance between two opposite cavity walls in the first cavity helps improve a strain amplification effect of the substrate.

With reference to the second aspect, in another possible design, the opening of the first cavity may be an arc extending inwards from the cavity walls of the first cavity. Such a design helps improve the strain amplification effect of the substrate and a structural strength of the substrate.

With reference to the second aspect, in another possible design, a bottom of the first cavity may be an arc extending inwards from the cavity walls of the first cavity. Such a design helps improve the structural strength of the substrate.

With reference to the second aspect, in another possible design, a shape of a cross section of the first cavity is any one of a triangle, a trapezoid, a rectangle, a polygon, a circle, a sector, or an ellipse.

With reference to the second aspect, in another possible design, the pressure detection structure further includes a second dielectric layer and a capacitive layer. The second dielectric layer is fastened to the second surface of the substrate, and the second surface of the substrate faces the first surface of the substrate. The capacitive layer is fastened to the second dielectric layer. The capacitive layer includes one or more metal electrodes connected to a circuit. When a finger of the user approaches or touches the second dielectric layer, an electric charge flow occurs on the metal electrode, and the capacitive layer outputs an electrical signal.

With reference to the second aspect, in another possible design, the second dielectric layer may be fastened to the second surface of the substrate by using glue (also referred to as adhesive). The glue is glue with a high elastic modulus, for example, glue whose elastic modulus is greater than the first modulus threshold. The second dielectric layer is fastened to the second surface of the substrate by using the glue with a high elastic modulus. In this way, a loss of a normal stress transferred from the second dielectric layer to the substrate can be reduced, and the substrate is subject to a maximum normal stress, which helps strain amplification.

With reference to the second aspect, in another possible design, the pressure detection structure further includes an insulating protection layer. The insulating protection layer is disposed on the first dielectric layer, and is configured to protect the first dielectric layer and the N piezo-resistors from being external conduction and from being affected by an external factor. The external factor may include ambient humidity.

It may be understood that, for beneficial effects that can be achieved by the pressure detection structure in the second aspect and any possible design of the second aspect, refer to beneficial effects in the first aspect and any possible design of the first aspect. Details are not described herein again.

DESCRIPTION OF EMBODIMENTS

Figure 1A:
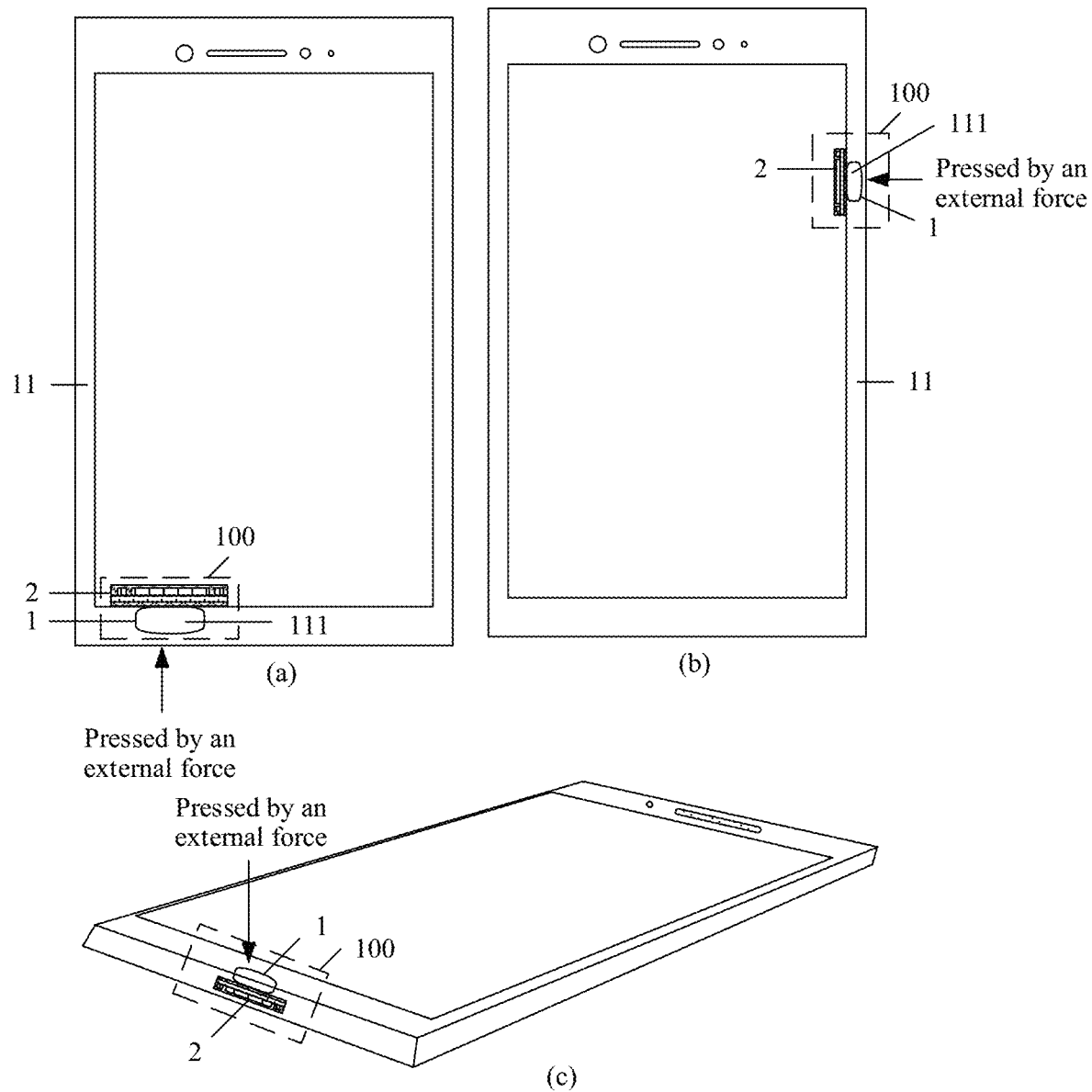
FIG. 1A is a schematic diagram of a structure of a mobile phone according to some embodiments of this application.

To facilitate understanding of solutions of this application, the following describes terms in embodiments of this application.

(1) Strain: A strain refers to a deformation degree of an object (such as a piezo-resistor) when the object is subject to an external force. A value of the strain is a variation per unit length. It may be understood that, on a premise that a magnitude of an external force is fixed, a larger strain of a piezo-resistor indicates a larger change in a resistance value of the piezo-resistor.

(2) Stress: An object may deform due to an external factor (such as an external force or a temperature change). As a result of deformation of the object, there is an internal force acting on any cross section (referred to as a shear surface) inside the object. Stress is an internal force on a unit area of any cross section inside an object when the object deforms.

The stress can be decomposed into a component perpendicular to a surface of the object and a component tangent to a shear surface. A component of an external force perpendicular to the surface of the object may be referred to as a "normal stress", and a component tangent to the surface of the object may be referred to as a "shear stress".

(3) Shear modulus: A shear modulus is a material constant. The shear modulus is a ratio of a shear stress on an object to a shear strain (that is, deformation of a material). The shear modulus may also be referred to as a modulus of rigidity. The shear modulus is one of mechanical property indicators of a material of an object, and is used to represent an ability of the material to resist a shear strain (that is, a strain in a direction of a shear stress). Specifically, a higher shear modulus of an object indicates better shear stress transfer performance of the object.

(4) Elastic modulus: An elastic modulus, also referred to as Young's modulus, is a material constant. The elastic modulus is a ratio of a normal stress on an object to a strain (a deformation degree of a material) in a direction of the normal stress. The elastic modulus is one of mechanical property indicators of a material of an object, and is used to represent an ability of the material to resist a normal strain (that is, a strain in a direction of a normal stress). Specifically, a higher elastic modulus of an object indicates better normal stress transfer performance of the object.

Embodiments of this application provide a pressure detection structure. The pressure detection structure may include a strain amplification layer and a differential resistor layer. The differential resistor layer may include N piezo-resistors, where N≥2, and N is a positive integer. The N piezo-resistors include first piezo-resistors and second piezo-resistors, and the first piezo-resistors and the second piezo-resistors are the same. A first cavity is disposed on the strain amplification layer. The differential resistor layer is disposed on a side on which an opening of the first cavity is provided.

The first cavity is designed, and positions of the piezo-resistors are designed to face a position of the first cavity, so that strain concentration and strain amplification of the piezo-resistors can be implemented. The differential resistor layer is designed to reduce impact of temperature on a resistance value of a piezo-resistor, to improve accuracy of pressure detection. For a specific structure and an operating principle of the pressure detection structure, refer to detailed descriptions in the following embodiments. Details are not described herein. It may be understood that, on a premise that a magnitude of an external force is fixed, a larger strain of a piezo-resistor indicates a larger change in a resistance value of the piezo-resistor and greater pressure detection sensitivity.

In conclusion, according to the solutions in embodiments of this application, the pressure detection sensitivity of the pressure detection structure can be improved, and the impact of temperature on a resistance value of a piezo-resistor can be reduced. In this way, the accuracy of pressure detection can be improved.

The pressure detection structure may be disposed on an electronic device and used as a pressure-sensitive button of the electronic device. The pressure detection structure may be disposed at a position at which a physical button needs to be disposed on the electronic device. The pressure detection structure may detect, based on a piezoresistive characteristic of a piezo-resistor, a pressure signal generated by a press operation input by a user, to implement related functions of the physical button such as taking a screenshot, photographing, and volume adjustment. In this way, a quantity of physical buttons disposed on a surface of the electronic device can be reduced, and an appearance of the electronic device can be improved. In some other embodiments, such a button may be referred to as a virtual key or the like. This is not limited in embodiments of this application.

For example, the pressure-sensitive button (that is, the pressure detection structure) may be disposed on a frame (for example, a left-side frame, a right-side frame, an upper-side frame, or a lower-side frame) of the electronic device. Alternatively, the pressure-sensitive button may be disposed on a front surface or a back of the electronic device, for example, disposed below a display screen or a frame of the display screen.

For example, the electronic device is a mobile phone. As shown in (a) in FIG. 1A, a pressure-sensitive button (that is, a pressure detection structure) 100 may be disposed on a lower-side frame of the mobile phone. The pressure detection structure 100 may include a strain amplification layer 1 and a differential resistor layer 2, and the strain amplification layer 1 includes a first cavity 111. When the lower-side frame of the mobile phone is pressed by an external force shown in (a) in FIG. 1A, the first cavity 111 of the strain amplification layer 1 may transfer the external force to piezo-resistors of the differential resistor layer 2, so that the piezo-resistors deform, and resistance values of the piezo-resistors change. In this case, the mobile phone may detect a pressure signal generated due to a change in the resistance values of the piezo-resistors.

For another example, the electronic device is a mobile phone. As shown in (b) in FIG. 1A, the pressure-sensitive button (that is, the pressure detection structure) 100 may be disposed on a side frame (for example, a right-side frame) of the mobile phone. The pressure detection structure 100 may include a strain amplification layer 1 and a differential resistor layer 2, and the strain amplification layer 1 includes a first cavity 111. When the right-side frame of the mobile phone is pressed by an external force shown in (b) in FIG. 1A, the first cavity 111 of the strain amplification layer 1 may transfer the external force to piezo-resistors of the differential resistor layer 2, so that the piezo-resistors deform, and resistance values of the piezo-resistors change. In this case, the mobile phone may detect a pressure signal generated due to a change in the resistance values of the piezo-resistors.

For another example, the electronic device is a mobile phone. As shown in (c) in FIG. 1A, a pressure-sensitive button (that is, a pressure detection structure) 100 may be disposed below a frame of a display screen of the mobile phone. The pressure detection structure 100 may include a strain amplification layer 1 and a differential resistor layer 2, and the strain amplification layer 1 includes a first cavity. When the frame of the display screen of the mobile phone is pressed by an external force shown in (b) in FIG. 1A, the first cavity of the strain amplification layer 1 may transfer the external force to piezo-resistors of the differential resistor layer 2, so that the piezo-resistors deform, and resistance values of the piezo-resistors change. In this case, the mobile phone may detect a pressure signal generated due to a change in the resistance values of the piezo-resistors.

In some embodiments, the cavity of the strain amplification layer may be disposed on an inner side of a middle frame of the mobile phone, and the differential resistor layer is fastened to a side on which an opening of the cavity of the strain amplification layer is provided.

For example, as shown in (a) in FIG. 1A, (b) in FIG. 1A, or (c) in FIG. 1A, the cavity of the strain amplification layer 1 may be disposed on the inner side of the middle frame of the mobile phone, and the differential resistor layer 2 is fastened to the side on which the opening of the cavity of the strain amplification layer 1 is provided.

Figure 1B:
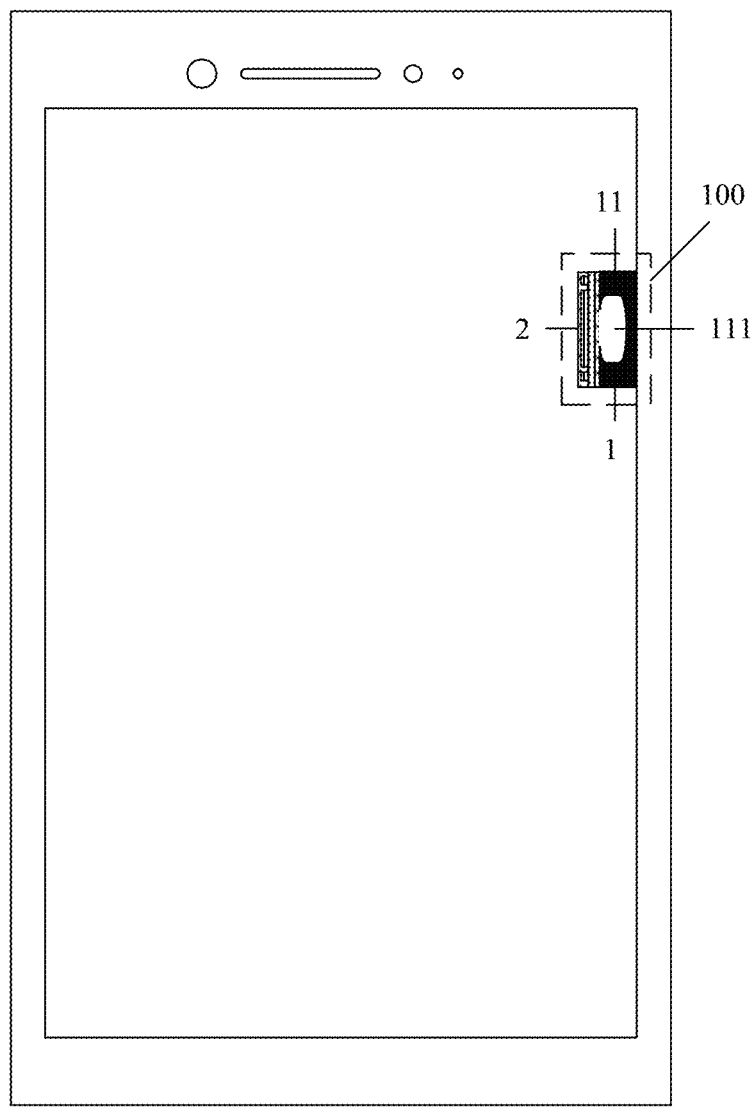
FIG. 1B is a schematic diagram of a structure of a mobile phone according to some other embodiments of this application.

In some other embodiments, only one side of the strain amplification layer 1 is attached to the inner side of the middle frame of the mobile phone. For example, as shown in FIG. 1B, the differential resistor layer 2 is disposed on the side on which the opening of the cavity of the strain amplification layer 1 is provided, and the other side of the cavity is attached to the inner side of the middle frame of the mobile phone. When the middle frame of the mobile phone is pressed by an external force shown in FIG. 1B, the middle frame of the mobile phone may transfer the external force to the strain amplification layer 1. The cavity of the strain amplification layer 1 can implement strain concentration and strain amplification in response to the external force, and transfer a concentrated and amplified stress (that is, a force generated due to a strain) to the piezo-resistors of the differential resistor layer 2. Then the piezo-resistors deform, and the resistance values of the piezo-resistors change. In this case, the mobile phone may detect a pressure signal generated due to a change in the resistance values of the piezo-resistors.

In some embodiments, one pressure-sensitive button (namely, a pressure detection structure) may be disposed in the electronic device. For example, as shown in (a) in FIG. 1A, (b) in FIG. 1A, (c) in FIG. 1A, or FIG. 1B, one pressure detection structure 100 is disposed in the mobile phone.

Figure 1C:
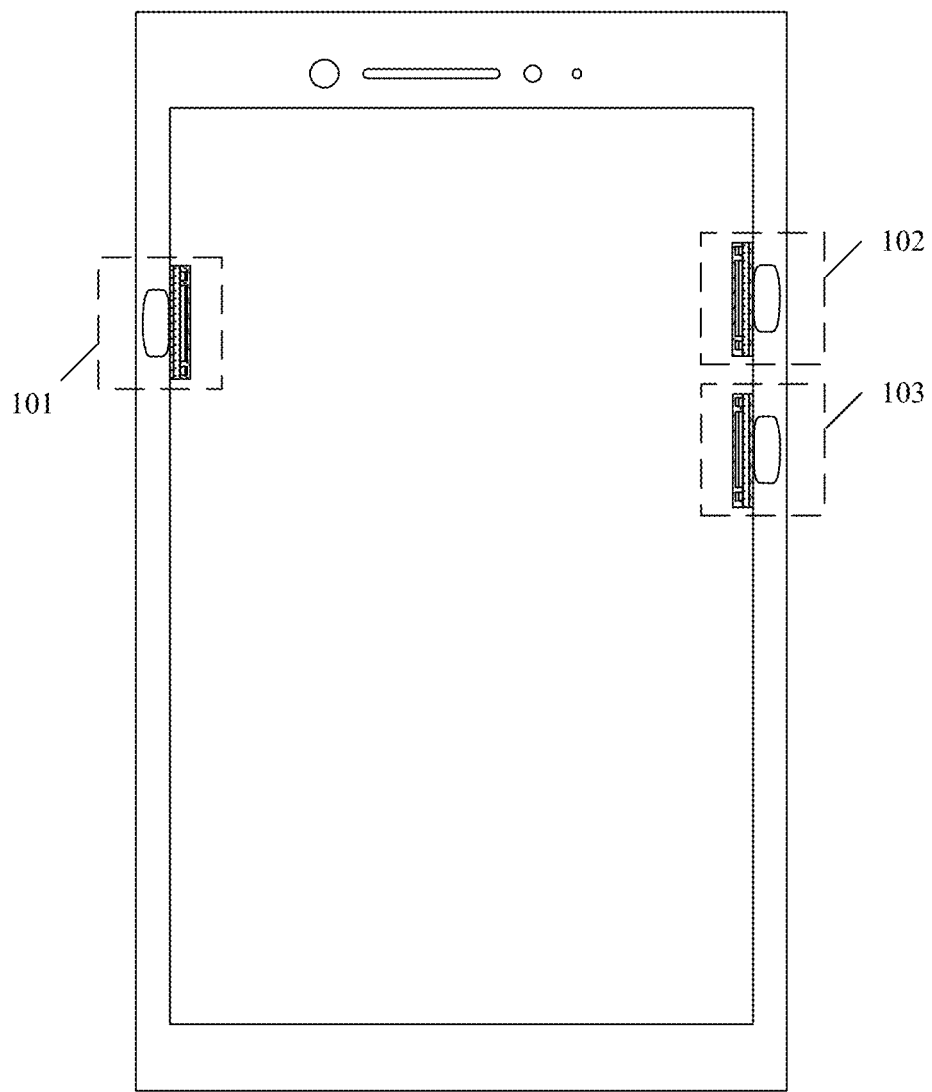
FIG. 1C is a schematic diagram of a structure of a mobile phone according to some other embodiments of this application.

In some other embodiments, a plurality of pressure-sensitive buttons (namely, pressure detection structures) may be disposed in the electronic device. For example, as shown in FIG. 1C, three pressure detection structures are disposed in the mobile phone, for example, a pressure detection structure 101, a pressure detection structure 102, and a pressure detection structure 103.

For example, for a location of the pressure detection structure in the electronic device, refer to a location of a physical button (such as a "volume+" button, a "volume−" button, or a screen locking button) in the electronic device. For example, as shown in FIG. 1C, the pressure detection structure 102 may be disposed at a position on the side frame of the mobile phone where the "volume+" button is disposed; the pressure detection structure 103 may be disposed at a position on the side frame of the mobile phone where the "volume−" button is disposed; and the pressure detection structure 101 may be disposed at a position on the side frame of the mobile phone where the screen locking button is disposed.

Figure 2:
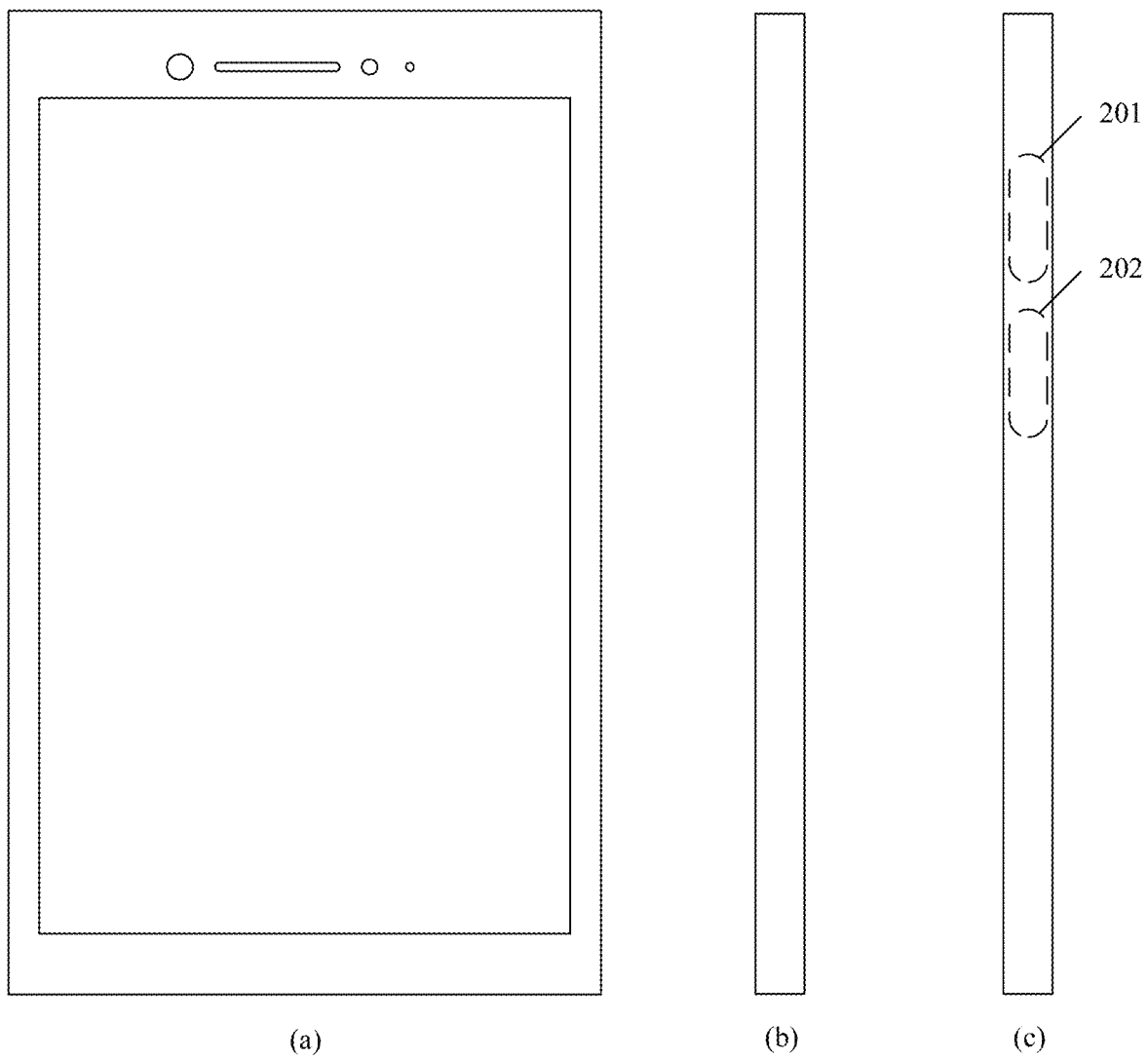
FIG. 2 is a main view and a right view of the mobile phone shown in FIG. 1B.

Generally, different from a physical button, the pressure-sensitive button disposed on the electronic device is located inside the electronic device and is invisible to a user. For example, refer to (a) in FIG. 2, where (a) in FIG. 2 shows a main view of the mobile phone shown in FIG. 1C. Refer to (b) in FIG. 2 and (c) in FIG. 2, where (b) in FIG. 2 and (c) in FIG. 2 are right side views of the mobile phone shown in FIG. 1C. As shown in (a) in FIG. 2 or (b) in FIG. 2, the pressure-sensitive button is invisible to the user. Certainly, to facilitate user operations, a mark that is visible to the user and that indicates the pressure-sensitive button is disposed on the mobile phone. For example, as shown in (c) in FIG. 2, the right-side frame of the mobile phone includes a mark 201 and a mark 202. The mark 201 is used to mark a position of the pressure-sensitive button 102 shown in FIG. 1C. The mark 202 is used to mark a position of the pressure-sensitive button 103 shown in FIG. 1C.

In embodiments of this application, a unit of an exerted pressure may be Newton, N for short, and a unit symbol is N. In physics, the formula G=mg is used to calculate gravity of an object, where G is gravity, m is mass, g is a constant, and g is approximately 9.8 N/kg. That is, gravity is proportional to mass. Therefore, in this embodiment, a unit of mass m may be used as a unit of an exerted pressure and a pressure threshold. The unit of mass m is kilogram (a unit symbol is kg) or gram (a unit symbol is g). For example, in this embodiment, the unit of an exerted pressure may be gram, and a unit symbol is g.

Alternatively, the unit of an exerted pressure may be kPa (kPa), where kPa is a pressure unit, and kPa can be converted into an engineering mechanics unit: kilogram-force (kgf) or kilogram-force/square centimeter (kgf/cm^2), to be specific, a pressure generated when an object of 1 kg presses on an area of 1 square centimeter, which is approximately equal to an atmospheric pressure. In engineering, generally, kilogram-force is used to indicate a pressure. A conversion rule is 1 kgf=100000 Pa (Pa)=100 kPa=0.1 MPa (MPa). Alternatively, the unit of an exerted pressure may be N/square meter (N/m$^2$).

For example, the electronic device in embodiments of this application may be a device including a pressure-sensitive button such as a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device/a virtual reality (VR) device, a smart band, a smart watch, a headset, a smart sound box. A specific form of the electronic device is not limited in embodiments of this application.

The following describes the implementations of embodiments of this application in detail with reference to accompanying drawings.

Figure 3:
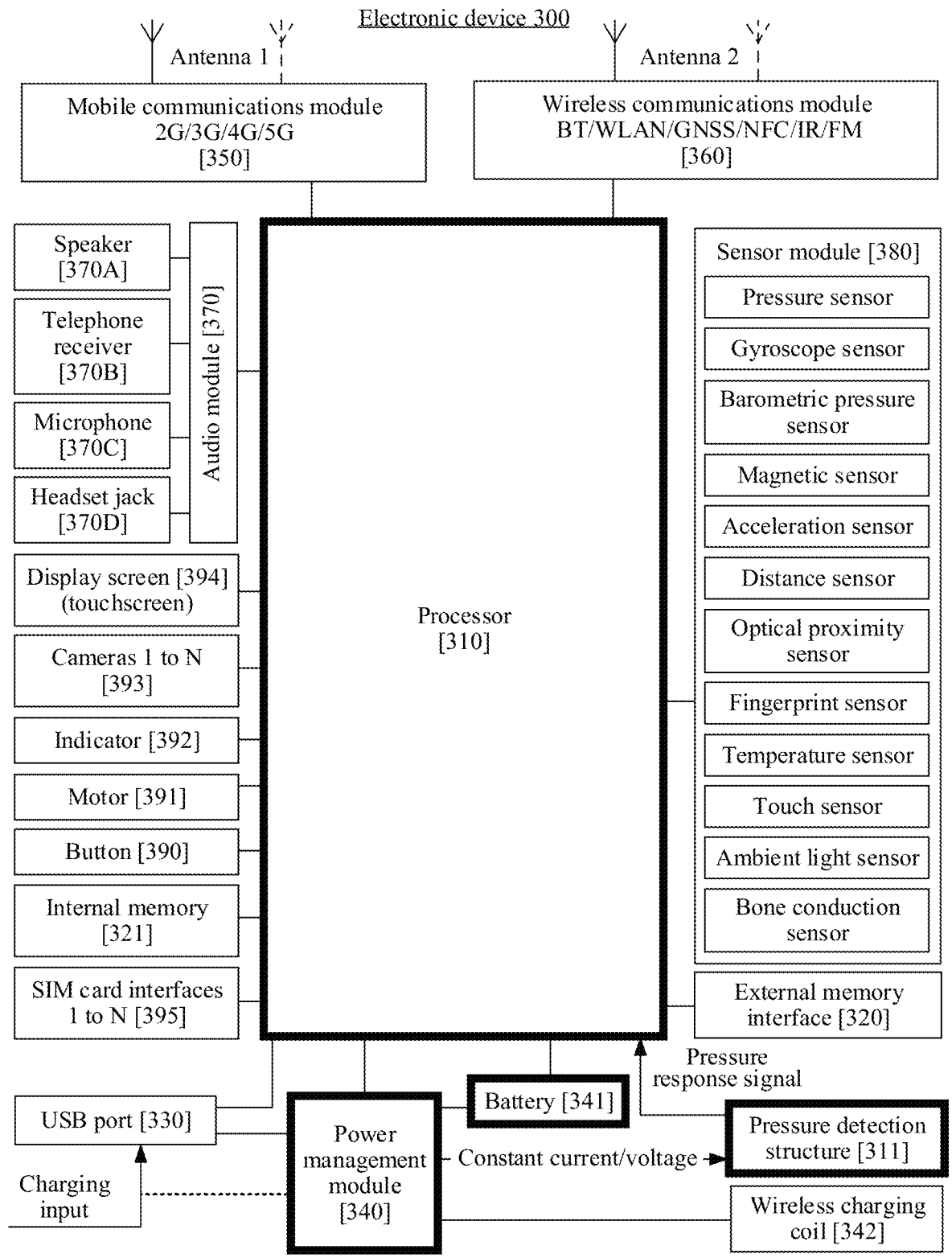
FIG. 3 is a schematic diagram of a hardware structure of an electronic device according to an embodiment of this application.

FIG. 3 is a schematic diagram of a structure of an electronic device according to an embodiment of this application. For example, an electronic device 300 shown in FIG. 3 may be the mobile phone shown in FIG. 1A, FIG. 1B, or FIG. 1C.

As shown in FIG. 3, the electronic device 300 may include a processor 310, a pressure detection structure 311, an external memory interface 320, an internal memory 321, a universal serial bus (USB) port 330, a power management module 340, a battery 341, a wireless charging coil 342, an antenna 1, an antenna 2, a mobile communications module 350, a wireless communications module 360, an audio module 370, a speaker 370A, a telephone receiver 370B, a microphone 370C, a headset jack 370D, a sensor module 380, a button 390, a motor 391, an indicator 392, a camera 393, a display screen 394, a subscriber identity module (SIM) card interface 395, and the like.

The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of the present disclosure does not constitute a specific limitation on the electronic device 300. In some other embodiments of this application, the electronic device 300 may include more or fewer components than those shown in the figure, or some components may be combined, or some components may be split, or different component arrangements may be used. The components shown in the figure may be implemented by using hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. For example, the processor 310 may be the application processor AP. Alternatively, the processor 310 may be integrated into a system on chip (SOC). Alternatively, the processor 310 may be integrated into an IC chip. The processor 310 may include an analog front end (AFE) and a microcontroller unit (MCU) in the IC chip.

The controller may be a nerve center and a command center of the electronic device 300. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces waiting time of the processor 310. Therefore, system efficiency is improved.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB port, and/or the like.

It may be understood that an interface connection relationship between the modules that is shown in this embodiment of the present disclosure is merely an example for description, and does not constitute a limitation on the structure of the electronic device 300. In some other embodiments of this application, the electronic device 300 may alternatively use an interface connection manner different from the interface connection manner in this embodiment, or a combination of a plurality of interface connection manners.

The power management module 340 is configured to receive a charging input from a charger. The charger may be a wireless charger (for example, a wireless charging cradle of the electronic device 300 or another device that can wirelessly charge the electronic device 300), or may be a wired charger. The power management module 340 may receive a charging input of the wired charger through the USB port 330. The charging management module 340 may receive a wireless charging input through the wireless charging coil 342 of the electronic device.

The power management module 340 may further supply power to the electronic device when charging the battery 341. The power management module 340 receives an input from the battery 341, and supplies power to the processor 310, the pressure detection structure 311, the internal memory 321, the external memory interface 320, the display screen 394, the camera 393, the wireless communications module 360, and the like. The power management module 340 may further be configured to monitor parameters of the battery 341, such as a battery capacity, a battery cycle count, and a battery health status (electric leakage or impedance). In some other embodiments, the power management module 340 may alternatively be disposed in the processor 310. For example, in this embodiment of this application, the power management module 340 may provide a constant voltage (for example, a constant voltage of 5 volts (V)) or a constant current for the pressure detection structure 311.

The pressure detection structure 311 may include a strain amplification layer and a differential resistor layer. The pressure detection structure 311 is configured to detect a press operation performed by a user on a pressure-sensitive button, and input a pressure signal to the processor 310. For an operating principle of the pressure detection structure 311, refer to detailed descriptions in the following embodiments. Details are not described in this embodiment of this application.

A wireless communications function of the electronic device 300 may be implemented through the antenna 1, the antenna 2, the mobile communications module 350, the wireless communications module 360, the modem processor, the baseband processor, and the like.

The antenna 1 and the antenna 2 are configured to transmit and receive an electromagnetic wave signal. Each antenna in the electronic device 300 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 350 may provide a solution that is applied to the electronic device 300 and that includes wireless communications technologies such as 2G, 3G, 4G, and 5G. The wireless communications module 360 may provide a wireless communications solution that includes a wireless local area network (WLAN) (such as, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 300. In some embodiments, the antenna 1 of the electronic device 300 is coupled to the mobile communications module 350, and the antenna 2 is coupled to the wireless communications module 360, so that the electronic device 300 can communicate with a network and another device by using a wireless communications technology.

The electronic device 300 implements a display function by using the GPU, the display screen 394, the application processor, and the like. The GPU is a microprocessor for image processing, and is connected to the display screen 394 and the application processor. The GPU is configured to perform mathematical and geometric calculation, and render an image. The processor 310 may include one or more GPUs that execute program instructions to generate or change display information.

The display screen 394 is configured to display an image, a video, and the like. The display screen 394 includes a display panel. In some embodiments, the electronic device 300 may include one or N display screens 394, where N is a positive integer greater than 1.

The electronic device 300 may implement a photographing function by using the ISP, the camera 393, the video codec, the GPU, the display screen 394, the application processor, and the like. The ISP is configured to process data fed back by the camera 393. In some embodiments, the ISP may be disposed in the camera 393. The camera 393 is configured to capture a static image or a video. In some embodiments, the electronic device 300 may include one or N cameras 393, where N is a positive integer greater than 1.

The external memory interface 320 may be configured to connect to an external storage card, for example, a micro SD card, to extend a storage capability of the electronic device 300. The external storage card communicates with the processor 310 through the external memory interface 320, to implement a data storage function. For example, files such as music and videos are stored in the external storage card.

The internal memory 321 may be configured to store computer-executable program code. The executable program code includes instructions. The processor 310 executes various function applications and data processing of the electronic device 300 by running the instructions stored in the internal memory 321. In addition, the internal memory 321 may include a high-speed random access memory, and may further include a nonvolatile memory, for example, at least one magnetic disk storage device, a flash storage device, or a universal flash storage (UFS).

The electronic device 300 may implement audio functions, for example, music playing and recording, by using the audio module 370, the speaker 370A, the telephone receiver 370B, the microphone 370C, the headset jack 370D, the application processor, and the like.

The audio module 370 is configured to convert digital audio information into an analog audio signal for output, and is also configured to convert an analog audio input into a digital audio signal. In some embodiments, the audio module 370 may be disposed in the processor 310, or some functional modules in the audio module 370 are disposed in the processor 310. The speaker 370A, also referred to as a "loudspeaker", is configured to convert an audio electrical signal into a sound signal. The telephone receiver 370B, also referred to as an "earpiece", is configured to convert an audio electrical signal into a sound signal. The microphone 370C, also referred to as a "mike" or a "mic", is configured to convert a sound signal into an electrical signal. The electronic device 300 may be provided with at least one microphone 370C. The headset jack 370D is configured to connect to a wired headset. The headset jack 370D may be the USB port 330, or may be a 3.5 mm open mobile terminal platform (OMTP) standard interface or a cellular telecommunications industry association of the USA (CTIA) standard interface.

The button 390 includes a power button, a volume button, and the like. The button 390 may be a mechanical button, or may be a touch button. The electronic device 300 may receive a button input to generate a button signal input related to user settings and function control of the electronic device 300. The motor 391 may generate a vibration prompt. The motor 391 may be configured to produce an incoming call vibration prompt and a touch vibration feedback. The indicator 392 may be an indicator light, and may be configured to indicate a charging status and a power change, or may be configured to indicate a message, a missed call, a notification, and the like. The SIM card interface 395 is configured to connect to a SIM card. The SIM card may be inserted into or removed from the SIM card interface 395, to implement contact with and separation from the electronic device 300. The electronic device 300 may support one or N SIM card interfaces, where N is a positive integer greater than 1. The SIM card interface 195 may support a nano-SIM card, a micro-SIM card, a SIM card, and the like. In some embodiments, the electronic device 300 uses an eSIM, namely, an embedded SIM card. The eSIM card may be embedded into the electronic device 300, and cannot be separated from the electronic device 300.

An electronic device in the following embodiments may be implemented in the electronic device 300 having the foregoing hardware structure.

Figure 4A:
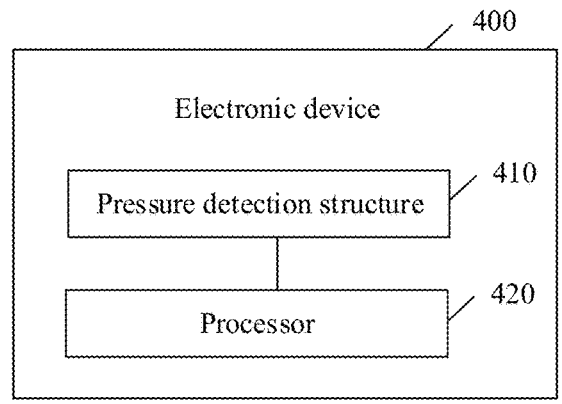
FIG. 4A is a schematic diagram of a structure of an electronic device according to an embodiment of this application.

An embodiment of this application provides an electronic device 400. As shown in FIG. 4A, the electronic device 400 may include a pressure detection structure 410 and a processor 420. The pressure detection structure 410 is coupled to the processor 420. It may be understood that when the electronic device 400 is the electronic device 300 shown in FIG. 3, the pressure detection structure 410 may be the pressure detection structure 311 shown in FIG. 3, and the processor 420 may be the processor 310 shown in FIG. 3.

The processor 420 is connected to an output end of the pressure detection structure 410. An output voltage generated when the pressure detection structure 410 is pressed by an external force is different from an output voltage generated when the pressure detection structure 410 is not pressed by an external force. In addition, when the pressure detection structure 410 is pressed by external forces with different press intensity, output voltages of the pressure detection structure 410 are different. The processor 420 may receive an output voltage of the pressure detection structure 410, and determine, based on the output voltage, a press operation performed by a user on a pressure-sensitive button formed by the pressure detection structure 410.

Figure 4B:
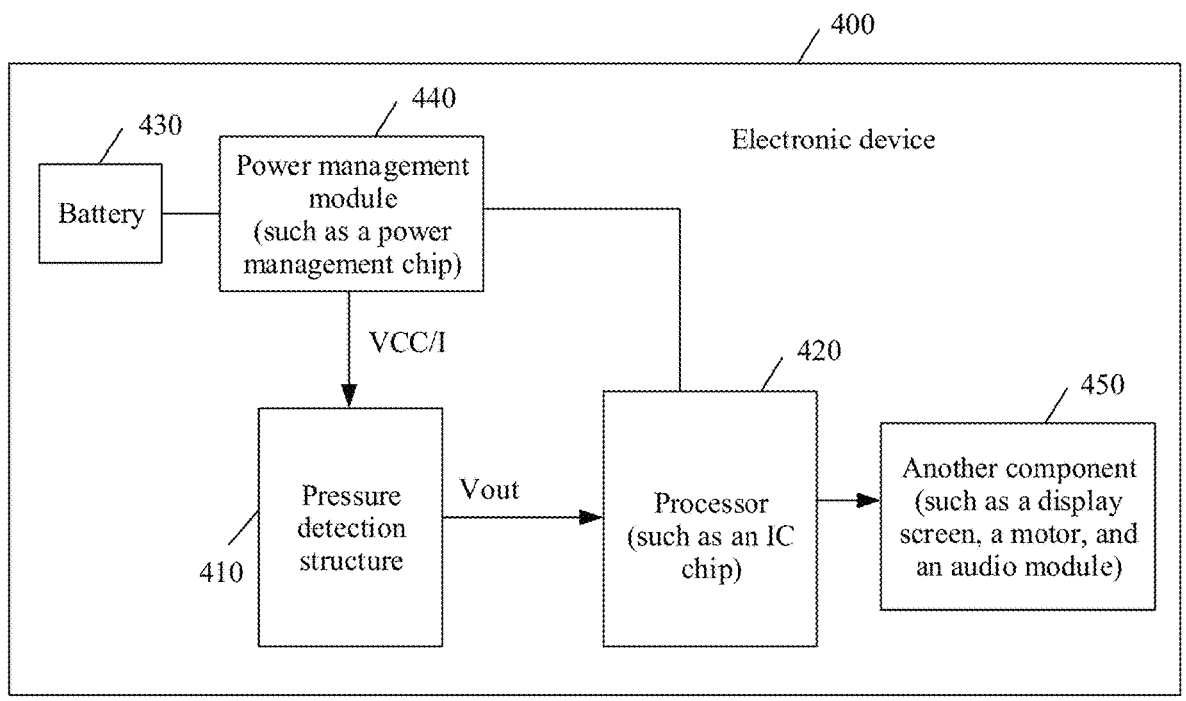
FIG. 4B is a schematic diagram of another structure of an electronic device according to an embodiment of this application.

Certainly, components in the electronic device 400 include but are not limited to the foregoing components. For example, as shown in FIG. 4B, the electronic device 400 may further include a battery 430, a power management module 440, and another component 450. The power management module 440 is configured to receive an input from the battery 430, and supply power to components such as the processor 420 and the pressure detection structure 410. When the electronic device 400 is the electronic device 300 shown in FIG. 3, the power management module 440 may be the power management module 340 shown in FIG. 3. The battery 430 is the battery 341 shown in FIG. 3. The another component 450 may include components such as a display screen, a motor, and an audio module.

In embodiments of this application, the power management module 440 may supply power to the pressure detection structure 410 with a constant voltage or a constant current. As shown in FIG. 4B, the power management module 440 may output a constant voltage VCC or a constant current I to the pressure detection structure 410. For example, the VCC may be any voltage value such as 1.8 V, 3.3 V, or 5 V. For another example, I may be any current value such as 0.3 mA, 0.5 mA, or 1 mA.

As shown in FIG. 4B, the processor 420 may be further connected to the another component 450. For example, when determining, based on the output voltage of the pressure detection structure 410, that the user inputs the press operation on the pressure-sensitive button, the processor 420 may interact with the another component 450 in response to the press operation, to perform a function corresponding to the press operation. For example, the processor 420 may trigger, in response to the press operation, the display screen to display a corresponding interface. For another example, the processor 420 may adjust volume of the audio module in response to the press operation. For another example, the processor 420 may trigger motor vibration in response to the press operation.

An embodiment of this application provides a pressure detection structure (for example, the foregoing pressure detection structure 410). The pressure detection structure 410 may include a substrate, a first dielectric layer, and N piezo-resistors, where N≥2, and N is an integer.

It should be noted that the pressure detection structure 410 may be classified into a strain amplification layer and a differential resistor layer based on functions of the components of the pressure detection structure 410. The strain amplification layer includes the substrate, and the differential resistor layer includes the first dielectric layer and a piezo-resistor layer. The piezo-resistor layer includes the foregoing N piezo-resistors.

Figure 5:
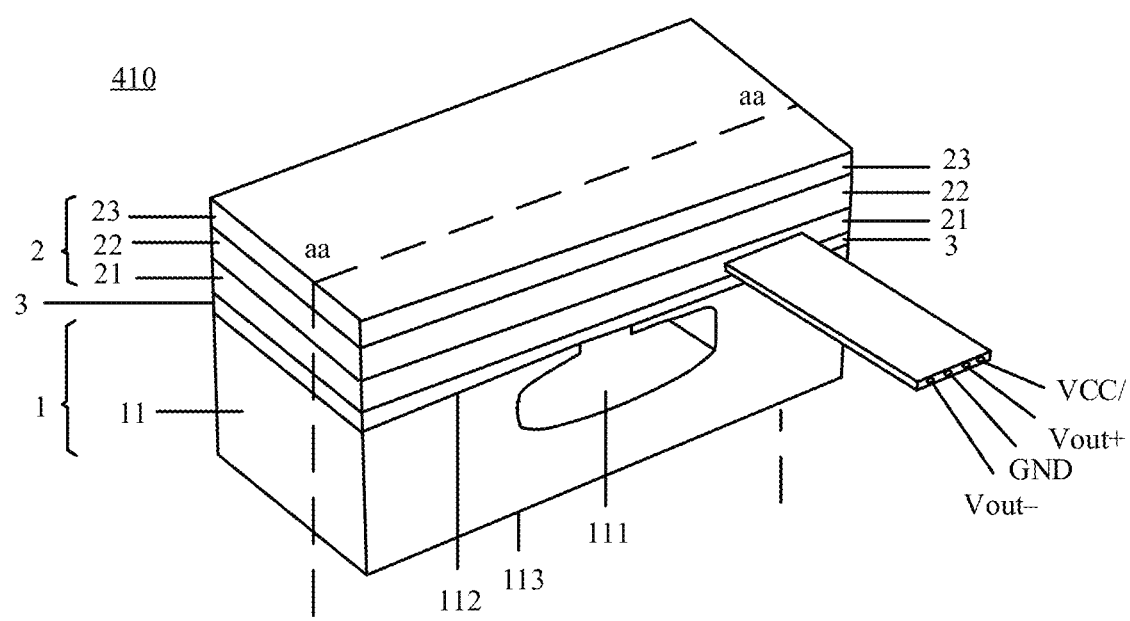
FIG. 5 is a schematic diagram of a three-dimensional structure of a pressure detection structure in the electronic device shown in FIG. 4A or FIG. 4B.

For example, refer to FIG. 5. FIG. 5 is a three-dimensional schematic diagram of a structure of a pressure detection structure 410. As shown in FIG. 5, the pressure detection structure 410 includes a strain amplification layer 1 and a differential resistor layer 2. The strain amplification layer 1 includes a substrate 11. A first cavity 111 is provided in the substrate 11, and an opening of the first cavity 111 is provided on a first surface 112 of the substrate 11. The differential resistor layer 2 includes a first dielectric layer 21 and a piezo-resistor layer 22. The differential resistor layer 2 is fastened on a first surface (that is, the surface on which the opening of the first cavity 111 is provided) of the substrate 11. For example, as shown in FIG. 5, the differential resistor layer 2 may be fastened to the first surface of the substrate 11 by using adhesive 3. Optionally, as shown in FIG. 5, the differential resistor layer 2 further includes an insulating protection layer 23. The insulating protection layer 23 is configured to protect the differential resistor layer 2 from external conduction and from being affected by factors such as ambient humidity.

Figure 6:
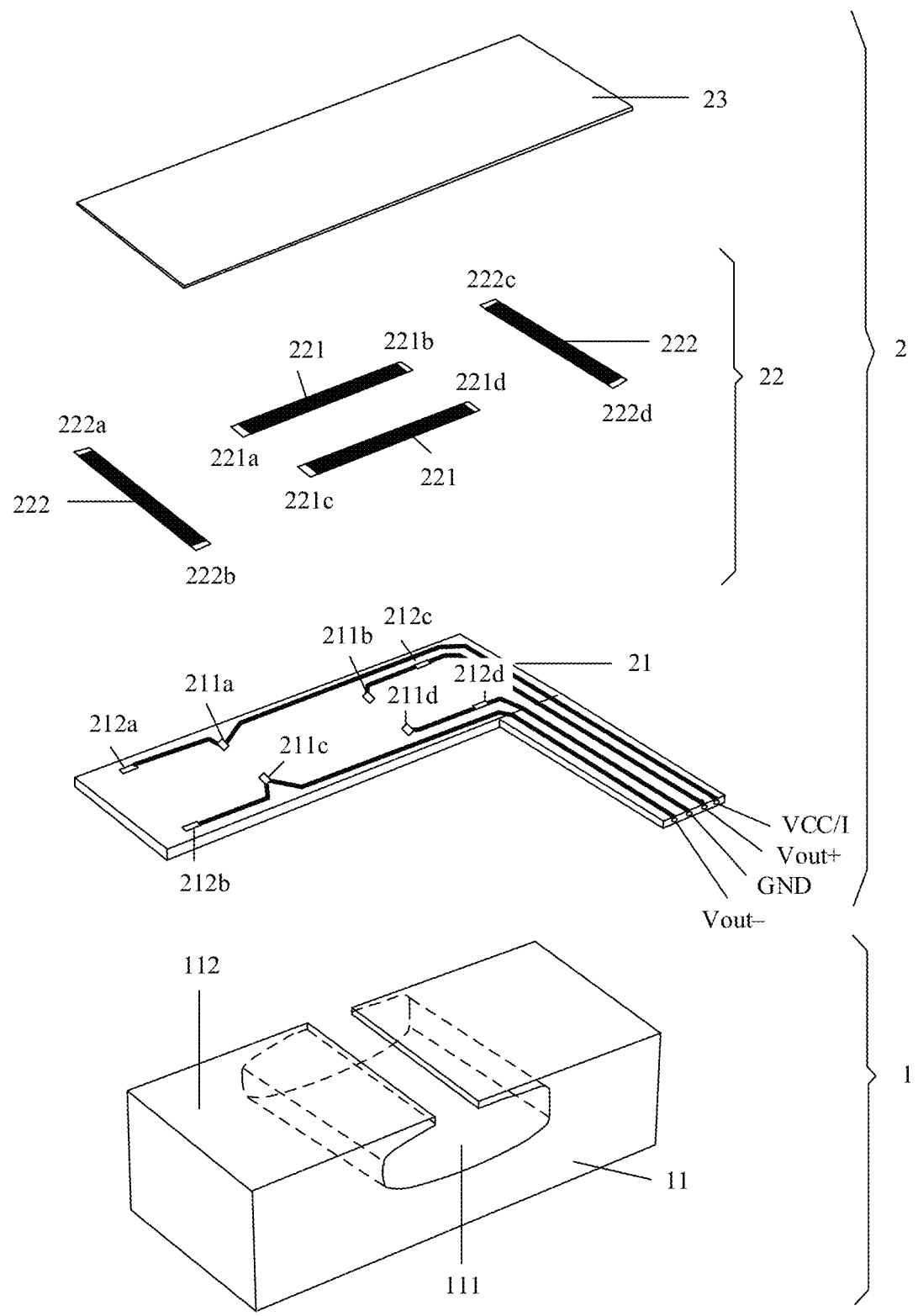
FIG. 6 is a schematic diagram of an exploded structure of the pressure detection structure shown in FIG. 5.

Generally, a cavity is an object that is sealed and isolated from the outside, and has a hollow inside. However, cavities (for example, a first cavity or a second cavity) in embodiments of this application are provided with openings. For example, as shown in FIG. 6, an opening of the first cavity 111 is provided on the first surface 112 of the substrate 11. For another example, in a second cavity 111a shown in FIG. 16B, an opening is provided on an inner side 160 of a middle frame 11-1 of the electronic device.

The cavities (for example, the first cavity or the second cavity) in embodiments of this application may be referred to as grooves. Generally, a groove is an upward concave on a surface of an object, and an opening of the groove is greater than or equal to a distance between opposite walls of the groove.

However, in embodiments of this application, a width of an opening of the groove (also referred to as a cavity) may be equal to a distance between opposite walls of the groove.

Figure 13A:
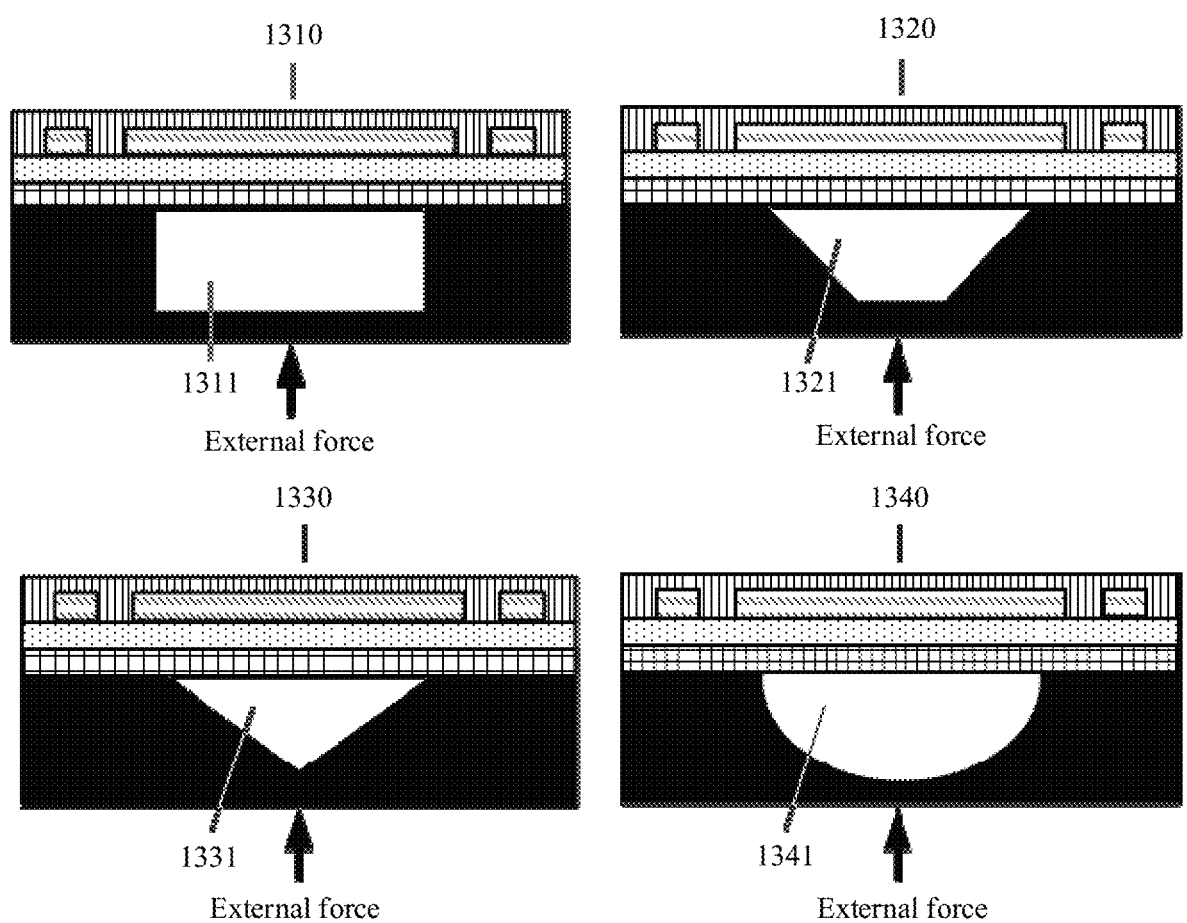
FIG. 13A is a sectional view 1 of pressure detection structures including cavities of different shapes according to an embodiment of this application.

For example, a cross section of a first cavity 1311 (that is, a groove) shown in FIG. 13A is a rectangle, and a width of an opening of the first cavity 1311 may be equal to a distance between opposite walls of the groove.

Alternatively, in embodiments of this application, the opening of the groove (also referred to as a cavity) may be greater than the distance between the opposite walls of the groove. For example, a cross section of a first cavity 1321 (that is, a groove) shown in FIG. 13A is a trapezoid, and a width of an opening of the first cavity 1321 is greater than a distance between opposite walls of the groove.

Alternatively, in embodiments of this application, the opening of the groove (also referred to as a cavity) may be smaller than the distance between the opposite walls of the groove. For example, a width of the opening of the first cavity 111 (that is, a groove) shown in FIG. 6 is smaller than a distance between opposite walls of the groove.

In the following embodiment, specific structures, connection relationships, and operating principles of the components in the pressure detection structure 410 are described in parts (I) to (VII).

(I) The Substrate

A first cavity is provided in the substrate. The substrate may be made of an elastic material or a rigid material. For example, the material of the substrate may be any one of glass, plastic, metal, ceramic, wood, or the like. The first cavity may be a through cavity or a non-through cavity.

For example, the substrate may be an integrated substrate. For example, as shown in FIG. 5, the substrate 11 is an integrated substrate. The first cavity 111 is provided on the first surface 112 of the substrate 11. The first cavity 111 shown in FIG. 5 is a through cavity (or referred to as a cavity). There are the following two cases in which the substrate is an integrated substrate.

Case (a): The substrate is integrated on an inner side of the middle frame of the electronic device 400. In other words, the substrate is the middle frame of the electronic device 400, and the first cavity is provided on the inner side of the middle frame of the electronic device 400.

For example, the electronic device 400 is a mobile phone. As shown in (a) in FIG. 1A or (b) in FIG. 1A, the first cavity 111 is provided on the inner side of the middle frame (namely, the substrate 11) of the mobile phone. In this case, to avoid deformation of the middle frame of the mobile phone, the substrate may be made of a rigid material.

Case (b): The substrate is an independent component. Specifically, the first cavity is provided on the first surface of the substrate, and a second surface of the substrate is attached to the inner side of the middle frame or a lower surface of the display screen of the electronic device 400. The second surface and the first surface (that is, the surface on which the opening of the first cavity is provided) of the substrate face each other. The substrate may be fastened to the inner side of the middle frame or the lower surface of the display screen of the electronic device 400 by using adhesive, welding, screwing, or the like.

For example, the electronic device 400 is a mobile phone. As shown in FIG. 1B, the first cavity 111 is provided in the substrate 11, the opening of the first cavity 111 is provided on the first surface of the substrate 11, and the second surface of the substrate 11 is attached to the inner side of the middle frame of the mobile phone. In this case, the substrate may be made of an elastic material or a rigid material.

(II) The First Dielectric Layer, and a Connection Relationship Between the First Dielectric Layer and the Substrate The first dielectric layer in embodiments of this application may be an elastic dielectric layer. The first dielectric layer is fastened to the first surface (that is, the surface on which the opening of the first cavity is provided) of the substrate. For example, the first dielectric layer may be fastened to the first surface of the substrate in any manner, for example, using adhesive, welding, or screwing. For example, as shown in FIG. 5, the first dielectric layer 21 is fastened on the first surface 112 (that is, the surface on which the opening of the first cavity is provided) of the substrate 11. Optionally, the first dielectric layer 21 shown in FIG. 5 is fastened to the first surface 112 of the substrate 11 by using the adhesive 3.

(III) The N Piezo-Resistors, and a Location Relationship Between the N Piezo-Resistors and the First Dielectric Layer The N piezo-resistors are fastened to the first dielectric layer. The N piezo-resistors include first piezo-resistors 221 (which is also referred to as a pressure-sensitive unit) and second piezo-resistors 222 (which is also referred to as a reference unit). $N \geq 2$, and N is a positive integer. For example, N may be any value such as 2, 4, 6, or 8. The first piezo-resistor 221 and the second piezo-resistor 222 are made of the same material and have the same initial resistance value. The initial resistance value is a resistance value of the piezo-resistor not affected by an external factor (such as an external force or a temperature change).

Figure 7:
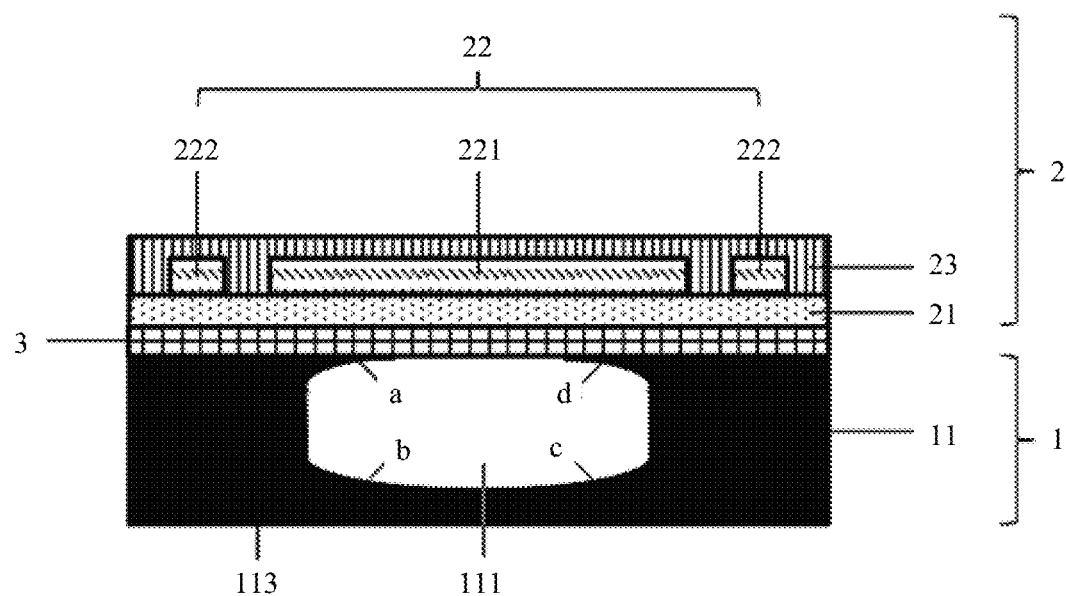
FIG. 7 is a sectional view aa of the pressure detection structure shown in FIG. 5.

For example, N=4, and the piezo-resistor layer 22 shown in FIG. 5 includes four piezo-resistors. Refer to FIG. 6. FIG. 6 is a schematic diagram of an exploded structure of the pressure detection structure 410 shown in FIG. 5. As shown in FIG. 6, the piezo-resistor layer 22 includes two first piezo-resistors 221 and two second piezo-resistors 222. Refer to FIG. 7. FIG. 7 is a sectional view of aa of the pressure detection structure 410 shown in FIG. 5. As shown in FIG. 7, the first piezo-resistors 221 and the second piezo-resistors 222 are fastened at the first dielectric layer 21.

Specifically, the two ends, in a first direction, of the vertical projection of the first piezo-resistor on a contact surface between the N piezo-resistors and the first dielectric layer are located respectively on the two sides, in the first direction, of the vertical projection of the first cavity on the contact surface. The first direction is parallel to the long side of the first piezo-resistor. The vertical projection of the second piezo-resistor on the contact surface does not overlap with the vertical projection of the first cavity on the contact surface. Optionally, the long side of the second piezo-resistor is perpendicular to the first direction.

Figure 8A:
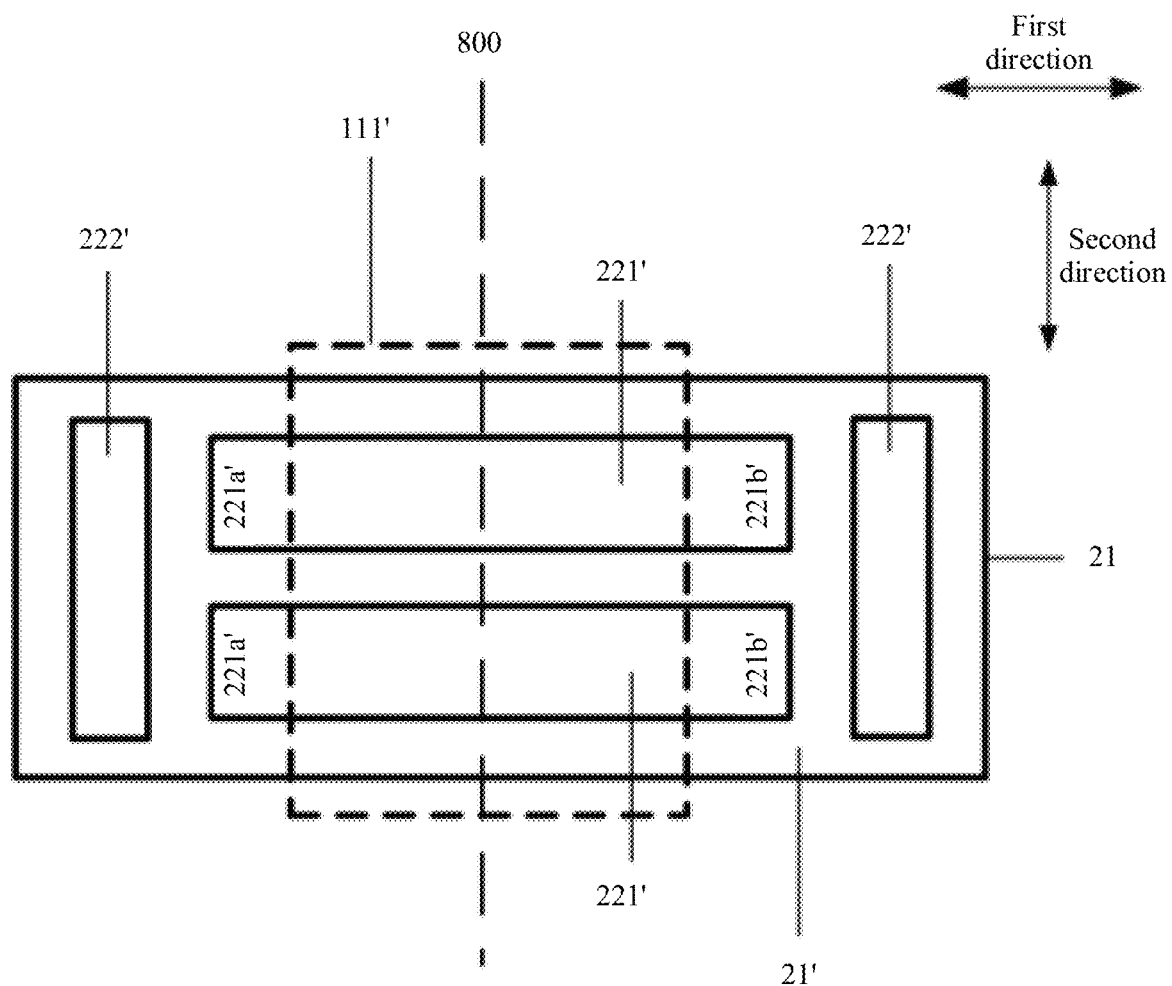
FIG. 8A is a schematic diagram of a distribution manner of the piezo-resistors that are shown in FIG. 6 at a first dielectric layer.
Figure 8B:
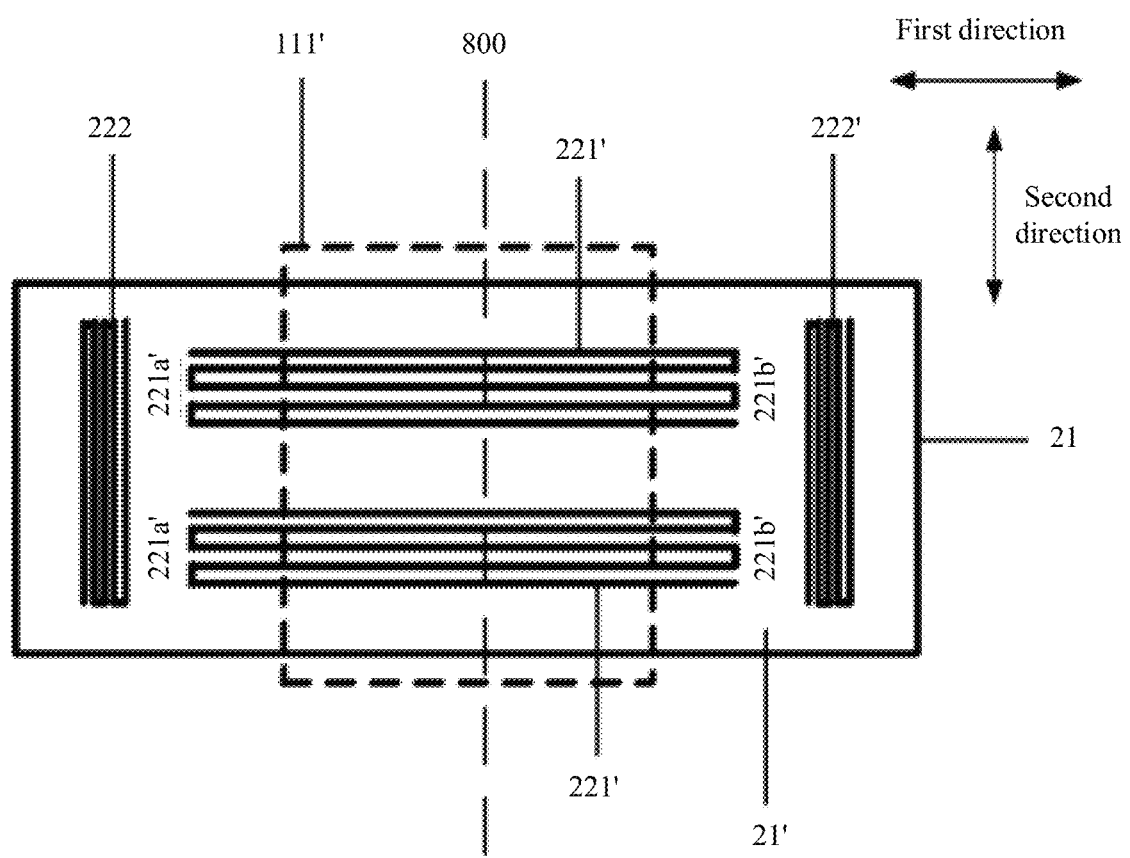
FIG. 8B is a schematic diagram of another distribution manner of the piezo-resistors that are shown in FIG. 6 at a first dielectric layer.

Refer to FIG. 8A or FIG. 8B. FIG. 8A or FIG. 8B is a schematic diagram of a distribution of the piezo-resistors (including the first piezo-resistors 221 and the second piezo-resistors 222) at the first dielectric layer 21 shown in FIG. 6.

In FIG. 8A or FIG. 8B, 21' represents a contact surface between the first dielectric layer 21 and the piezo-resistor layer 22 shown in any one of FIG. 5 to FIG. 7, and 111' represents a vertical projection of the first cavity 111 shown in any one of FIG. 5 to FIG. 7 on the contact surface 21'. In this embodiment of this application, the first direction is parallel to the long side of the first piezo-resistor 221. For example, as shown in FIG. 8A or FIG. 8B, the first direction is parallel to a long side of a vertical projection 221' of the first piezo-resistor 221 on the contact surface 21'.

As shown in FIG. 8A or FIG. 8B, an end 221a' and an end 221c', in the first direction, of the vertical projections 221' of the first piezo-resistors 221 on the contact surface 21' are on a left side of the vertical projection 111' of the first cavity 111 on the contact surface 21'. An end 221*b*' and an end 221*d*', in the first direction, of the vertical projections 221' of the first piezo-resistors 221 on the contact surface 21' are on a right side of the vertical projection 111' of the first cavity 111 on the contact surface 21'. In other words, in this embodiment of this application, the two ends of the vertical projection 221' of the first piezo-resistor 221 on the contact surface 21' may span the vertical projection 111'.

Optionally, the two first piezo-resistors 221 may span above the first cavity 111 side by side. For example, the two vertical projections 221', shown in FIG. 8A or FIG. 8B, span the vertical projection 111' of the first cavity 111 side by side. In addition, the center line of the first piezo-resistors 221 in the second direction coincides with the center line of the first cavity 111 in the second direction. For example, as shown in FIG. 8A or FIG. 8B, a dashed line 800 is the center line of the vertical projection 111' in the second direction, and is also the center line of the vertical projections 221' in the second direction. In embodiments of this application, the second direction is perpendicular to the first direction. Details are not described again in the following embodiments.

As shown in FIG. 8A or FIG. 8B, a vertical projection 222' of one second piezo-resistor 222 on the contact surface 21' is on the left side of the vertical projection 111' of the first cavity 111 on the contact surface 21', and a vertical projection 222' of the other second piezo-resistor 222 on the contact surface 21' is on the right side of the vertical projection 111' of the first cavity 111 on the contact surface 21'. In other words, the vertical projections 222' of the second piezo-resistors 222 on the contact surface 21' do not overlap with the vertical projection 111' of the first cavity 111 on the contact surface 21'. The vertical projections 222' of the second piezo-resistors 222 on the contact surface 21' are beyond the vertical projection 111' of the first cavity 111 on the contact surface 21'. Optionally, as shown in FIG. 8A or FIG. 8B, the long side of the vertical projection 222' of the second piezo-resistor 222 on the contact surface 21' is perpendicular to the first direction.

In some embodiments, the first piezo-resistors 221 and the second piezo-resistors 222 may be rectangular blocks made of a polymer. For example, as shown in FIG. 8A, the vertical projections of the first piezo-resistors 221 and the second piezo-resistors 222 on the contact surface 21' are rectangles.

For example, a method for fabricating the first piezo-resistor 221 and the second piezo-resistor 222 may include the following step 1 to step 4. Step 1: Fabricate a circuit (including disposing electrodes and arranging circuit wiring) on the first dielectric layer 21. For example, the circuit shown in FIG. 9 may be fabricated. Step 2: Print resistive ink (polymer solution). Step 3: Perform hardening at high temperature. Step 4: Print a protective film, for example, the insulating protection layer 23 shown in FIG. 6.

In some other embodiments, the first piezo-resistors 221 and the second piezo-resistors 222 may alternatively be strain resistors or strain gauges made of metal or a semiconductor material. For example, the first piezo-resistors 221 and the second piezo-resistors 222 are manufactured by arranging metal wires in a serpentine shape. As shown in FIG. 8B, the vertical projections of the first piezo-resistors 221 and the second piezo-resistors 222 on the contact surface 21' are in a serpentine-shaped form, and a long side of the serpentine-shaped form is the long side of the first piezo-resistor 221 or the second piezo-resistor 222. In embodiments of this application, an initial resistance value and piezoresistive performance of the piezo-resistor may be adjusted by adjusting parameters such as a size, a length, and density of the snake-shaped structure.

For example, a method for fabricating the first piezo-resistor 221 and the second piezo-resistor 222 may include the following step a to step d. Step a: Fabricate a circuit (including disposing electrodes and arranging circuit wiring) on the first dielectric layer 21. For example, the circuit shown in FIG. 9 may be fabricated. Step b: Deposit a metal layer or a semiconductor layer. Step c: Etch a special structure. Step d: Deposit or print a protective film, for example, the insulating protection layer 23 shown in FIG. 6.

It should be noted that, in this embodiment of this application, a functional layer (for example, the first piezo-resistors 221 and the second piezo-resistors 222) needs to be manufactured/printed on only single side of the first dielectric layer 21. A manufacture process is simple, assembly and mass production are easy, and production costs of the pressure detection structure can be reduced.

(IV) A Circuit Connection Relationship of the N Piezo-Resistors at the First Dielectric Layer.

The N piezo-resistors of the piezo-resistor layer are connected at the first dielectric layer to form a Wheatstone bridge. Specifically, the first dielectric layer may include the connection circuit that is the Wheatstone bridge formed by connecting the N piezo-resistors. An output end of the Wheatstone bridge is an output end of the foregoing pressure detection structure. That is, the processor 420 is connected to the output end of the Wheatstone bridge.

For example, N=4, and the piezo-resistor layer 22 shown in FIG. 5 includes four piezo-resistors. For example, the connection circuit of the first dielectric layer 21 is shown in FIG. 6. A VCC/I shown in FIG. 5 or FIG. 6 is an input end of the foregoing Wheatstone bridge (that is, the connection circuit at the first dielectric layer 21), GND is a ground end, and Vout+ and Vout− are output ends of the pressure detection structure 410. The output ends (for example, the Vout+ and the Vout−) of the pressure detection structure 410 are connected to the processor 420.

As shown in FIG. 6, the connection circuit at the first dielectric layer 21 may include an interface 211*a*, an interface 211*b*, an interface 211*c*, an interface 211*d*, an interface 212*a*, an interface 212*b*, an interface 212*c*, and an interface 212*d*. The interface 212*a* is connected to the interface 211*a*; and the interface 212*a* and the interface 211*a* are connected to the input end VCC/I. The interface 211*b* is connected to the interface 212*c*, and the interface 211*b* and the interface 212*c* are connected to the output end Vout+. The interface 212*b* is connected to the interface 211*c*, and the interface 212*b* and the interface 211*c* are connected to the output end Vout−. The interface 211*d* is connected to the interface 212*d*, and the interface 211*d* and the interface 212*d* are connected to the ground end GND.

Figure 9:
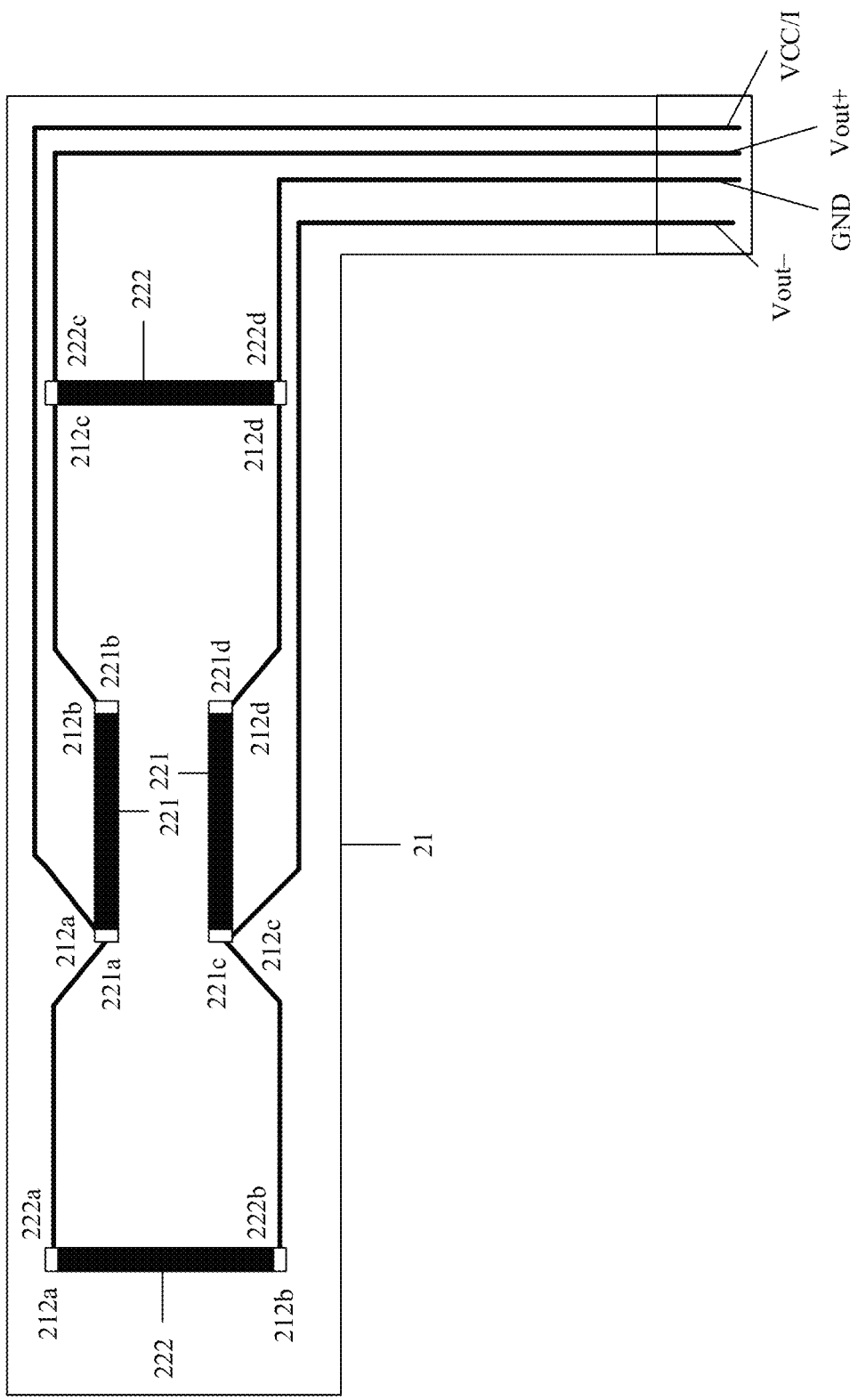
FIG. 9 is a schematic diagram of a connection circuit and a circuit arrangement of the piezo-resistors shown in FIG. 6 at a first dielectric layer.

The first piezo-resistors 221 and the second piezo-resistors 222 shown in FIG. 6 may be fastened on the first dielectric layer 21. The tip electrode 222*a* of the second piezo-resistor 222 is connected to the interface 212*a* at the first dielectric layer 21, and the tip electrode 222*b* is connected to the interface 212*b*. The tip electrode 222*c* of the second piezo-resistor 222 is connected to the interface 212*c* at the first dielectric layer 21, and the tip electrode 222*d* is connected to the interface 212*d*. The tip electrode 221*a* of the first piezo-resistor 221 is connected to the interface 211*a* at the first dielectric layer 21, and the tip electrode 221*b* is connected to the interface 211*b*. The tip electrode 221*c* of the first piezo-resistor 221 is connected to the interface 211*c* at the first dielectric layer 21, and the tip electrode 221*d* is connected to the interface 211*d*. In this way, a connection circuit shown in FIG. 9 is obtained. FIG. 9 is a schematic diagram of the connection circuit and a circuit arrangement, at the first dielectric layer 21, of the piezo-resistors of the piezo-resistor layer 21 shown in FIG. 6.

It should be noted that the VCC/I shown in FIG. 5, FIG. 6, or FIG. 9 indicates that an input of the pressure detection structure 410 may be a constant voltage or a constant current. For example, the VCC may be any voltage value such as 1.8 V, 3.3 V, or 5 V. For another example, I may be any current value such as 0.3 mA, 0.5 mA, or 1 mA.

(V) Strain Concentration and a Strain Amplification Principle of the Strain Amplification Layer 1.

For example, in this embodiment of this application, the pressure detection structure 410 shown in FIG. 5 is used as an example herein to describe a principle of implementing strain concentration and strain amplification by the pressure detection structure 410.

When an external force is exerted on the second surface 113 of the substrate 11 shown in FIG. 5, the substrate 11 bends and deforms. A normal stress is converted into a shear stress tangent to the second face 113. The shear stress is transferred to the differential resistor layer 2 through the adhesive 3, so that the differential resistor layer 2 generates a strain in a direction of the shear stress.

In addition, because the first cavity 111 is disposed on the first surface 112 of the substrate 11, when the substrate 11 bends and deforms, strain amplification may be generated in the first cavity 111 in a vertical direction, and a strain at the top of the first cavity 111 is a maximum strain. Further, because the opening is provided at the top of the first cavity 111, the strain of the first cavity 111 is concentrated at the opening of the first cavity 111, and there is no device supporting at the opening. In this way, a strain amplification effect can be achieved.

Optionally, in the foregoing case (b), if the substrate 11 is fastened to the inner side of the middle frame or the lower surface of the display screen of the electronic device 400 by using adhesive, In this embodiment of this application, glue with a high elastic modulus may be used to fasten the substrate 11 on the inner side of the middle frame or the lower surface of the display screen of the electronic device 400 by using adhesive. The glue with a high elastic modulus refers to glue whose elastic modulus is greater than a first modulus threshold. It can be learned from the description of the elastic modulus in the foregoing term introduction that a higher elastic modulus of an object indicates better normal stress transfer performance of the object. Therefore, the substrate 11 is fastened to the inner side of the middle frame or the lower surface of the display screen of the electronic device 400 by using the glue with a high elastic modulus. In this way, a loss of a normal stress transferred from the middle frame or the display screen of the electronic device 400 to the substrate 11 can be reduced, and the substrate 11 is subject to a maximum normal stress. This helps implement strain amplification.

To describe the strain amplification principle of the pressure detection structure 410, in this embodiment of this application, the substrate 11 shown in FIG. 7 may be divided into three parts based on a section in the sectional view shown in FIG. 7. Then the principle of strain amplification is explained by explaining deformation, stress, and a strain transfer principle of the three parts.

Figure 10A:
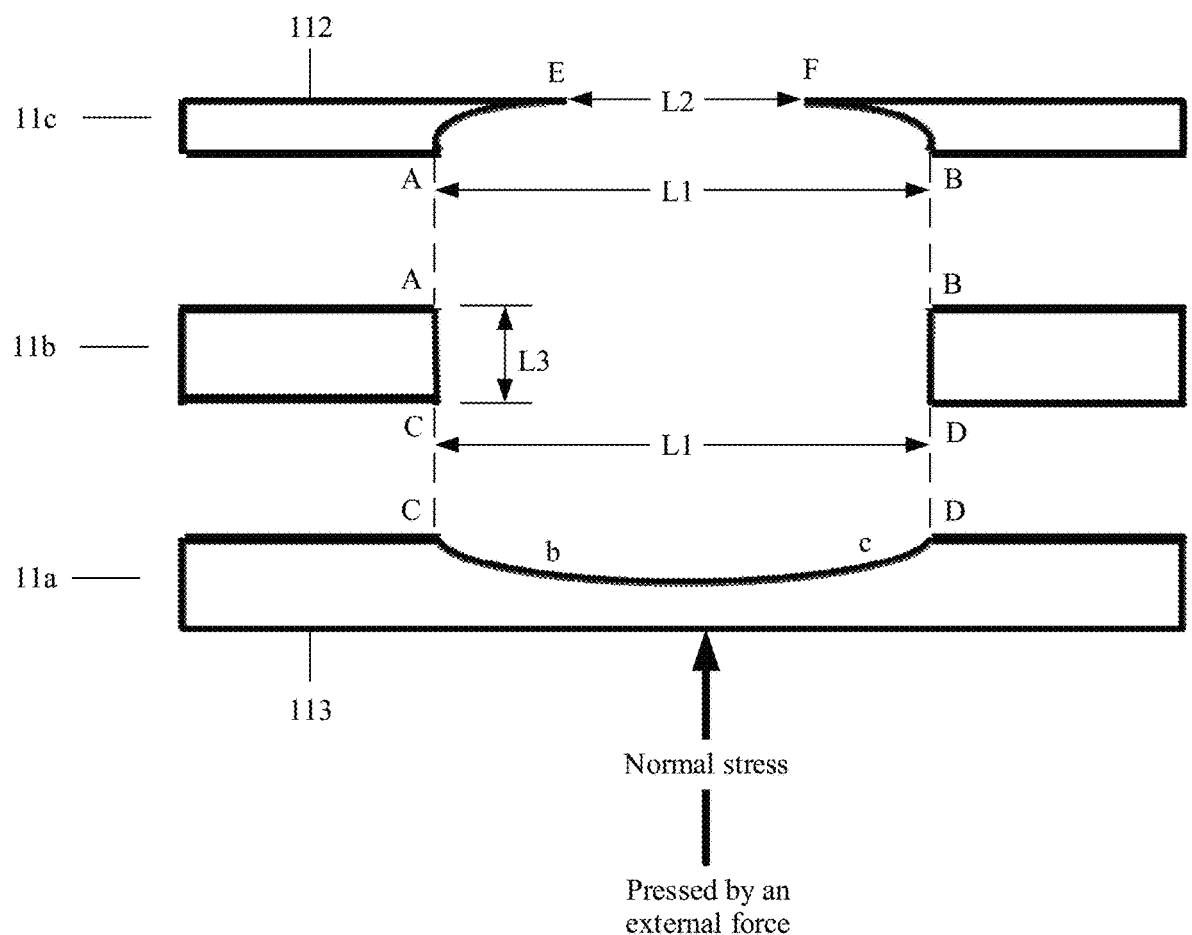
FIG. 10A is a schematic diagram of a strain amplification principle of a substrate shown in FIG. 5.

As shown in FIG. 10A, the substrate 11 may be divided into three parts: 11a, 11b, and 11c. A Point A and a point B are contact points between 11c and 11b in the first cavity 111, a point C and a point D are contact points between 11b and 11a in the first cavity 111, and a point E and a point F are contact points between the first cavity 111 and the first surface 112. In this embodiment of this application, for example, cavity walls AC and BD of the first cavity 111 shown in FIG. 5 are perpendicular to the first surface 112 of the substrate 11, lengths of AB and CD are equal to L1, and a length of EF is equal to L2. Certainly, the lengths of AB and CD may alternatively be different. In this case, the cavity walls AC and BD of the first cavity 111 are not perpendicular to the first surface 112 of the substrate 11.

Figure 10B:
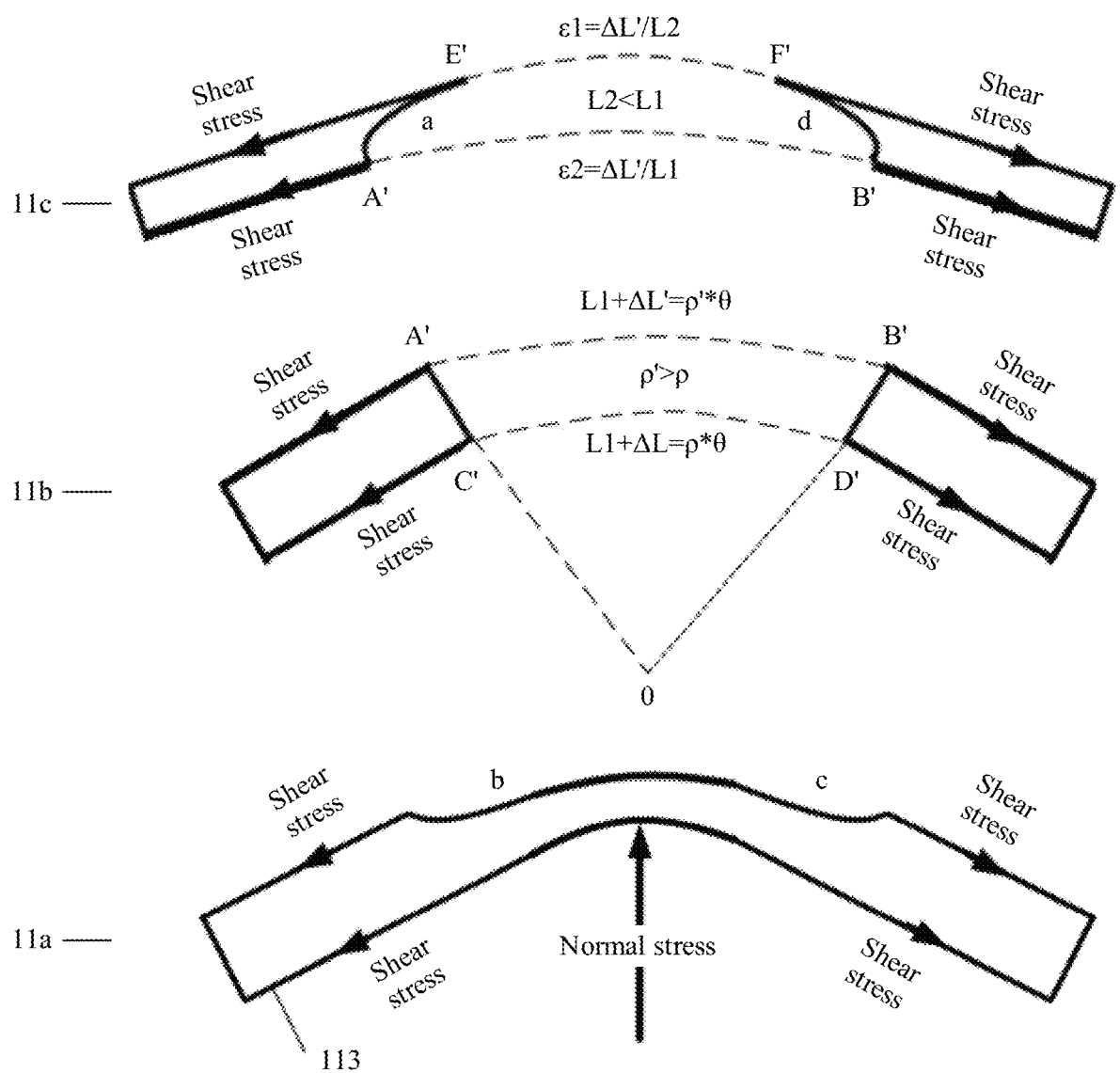
FIG. 10B is another schematic diagram of the strain amplification principle of the substrate shown in FIG. 5.

When 11a shown in FIG. 10A is pressed by an external force, a normal stress on 11a may be generated. As shown in FIG. 10B, the normal stress causes 11a to bend and deform, and deformation of 11a causes the normal stress to be converted into a shear stress tangent to the second surface 113. The shear stress is transferred through 11b and 11c, and strain amplification can be implemented. 11b and 11c may implement strain amplification of two levels.

(1) First-level amplification. 11b can implement first-level strain amplification.

Specifically, after the shear stress transferred from 11a to 11b causes 11b to deform as shown in FIG. 10B, AB shown in FIG. 10A becomes an arc NB' shown in FIG. 10B, and CD shown in FIG. 10A becomes an arc C'D' shown in FIG. 10B. A central angle (denoted as $\theta$) of the arc A'B' is the same as a central angle of the arc C'D', but arc radiuses of the arc A'B' and the arc C'D' are different. The arc radius of the arc A'B' is OA' (or OB'), where OA'=$\rho$'. The arc radius of the arc C'D' is OC' (or OD'), where OC'=$\rho$. OA'>OC', that is, $\rho$'>$\rho$. An arc length of an arc is equal to a product of a central angle of the arc and an arc radius. For example, after 11b deforms, the arc A'B'=$\rho$'*$\theta$, and the arc C'D'=$\rho$*$\theta$. In this case, a deformation amount $\Delta L'$ of the arc A'B' relative to AB is equal to $\rho$'*$\theta$−L1, and a deformation amount $\Delta L$ of the arc C'D' relative to CD is equal to $\rho$*$\theta$−L1. That is, as shown in FIG. 10B, the arc A'B'=L1+$\Delta L'$=$\rho$'*$\theta$, and the arc C'D'=L1+$\Delta L$=$\rho$*$\theta$.

It may be understood that, because $\rho$'>$\rho$, $\Delta L'$>$\Delta L$. That is, the deformation amount of the arc A'B' relative to AB is greater than the deformation amount of the arc C'D' relative to CD. Because AB=CD=L1, it can be learned based on a definition of strain that a strain of the arc A'B' relative to AB (that is, a strain on an outer side of 11b, for example, $\Delta L'/L1$) is greater than a strain of the arc C'D' relative to CD (that is, a strain on an inner side of 11b, for example, $\Delta L/L1$). The inner side of 11b is a side of 11b that receives a stress. The inner side of 11b is connected to 11a, and can receive a stress from 11a. The outer side of 11b is a side where 11b outputs a stress. The outer side of 11b is connected to 11c, and can transfer a stress to 11c. In conclusion, strain on the outer side of 11b (that is, the side of 11b that outputs a stress) is greater than strain on the inner side of 11b (that is, the side of 11b that receives a stress). That is, 11b achieves strain amplification.

(2) Second-level amplification. 11c can implement second-level strain amplification.

As shown in FIG. 10A, FE=L2, AB=L1, and L2<L1. A strain of an object can be calculated according to a formula: $\varepsilon = \Delta S / S$, where $\Delta S$ is a variation (that is, a deformation amount) of a size of a section after the object deforms, and S is a size of the section before the object deforms. It is assumed that a deformation amount ($\Delta L'$) of the arc E'F' relative to EF is equal to a deformation amount of the arc C'D' relative to CD. Then, as shown in FIG. 10B, the strain of the arc E'F' relative to EF is $\varepsilon_1 = \Delta L'/L2$, and the strain of the arc A'B' relative to AB is $\varepsilon_2 = \Delta L'/L1$. Because L2<L1, the strain $\varepsilon_1$ of the arc E'F' relative to EF is greater than the strain $\varepsilon_2$ of the arc A'B' relative to AB, that is, $\varepsilon_1 > \varepsilon_2$.

The side with the strain ε2 of the arc A'B' relative to AB is the side of 11*b* that receives a stress (referred to as an inner side of 11*c*). The inner side of 11*c* is connected to 11*b*, and can receive a stress from 11*b*. The side with the strain ε1 of the arc E'F' relative to EF is the side of 11*c* that outputs a stress (referred to as an outer side of 11*c*). The outer side of 11*c* is connected to the differential resistor layer 2, and can transfer a stress to the differential resistor layer 2. In conclusion, the strain on the outer side of 11*c* (that is, the side of 11*c* that outputs a stress) is greater than the strain on the inner side of 11*c* (that is, the side of 11*c* that receives a stress). That is, 11*c* achieves strain amplification.

It should be noted that, in this embodiment of this application, the substrate 11 is divided into three parts 11*a*, 11*b*, and 11*c* herein only to describe the strain amplification principle of the substrate 11, and this does not indicate that the substrate 11 is formed by the three parts.

In some embodiments, the first dielectric layer 21 (included in the differential resistor layer 2) shown in FIG. 5 is fastened to the first surface 112 of the substrate 11 by using the adhesive 3. Optionally, the adhesive 3 may be glue with a high shear modulus. The glue with a high shear modulus refers to glue whose shear modulus is greater than a second modulus threshold. It can be learned from the description of the shear modulus in the foregoing term introduction that a higher shear modulus of an object indicates better shear stress transfer performance of the object. In addition, a larger shear stress exerted on a piezo-resistor indicates a larger strain (that is, a deformation degree) of the piezo-resistor in a direction of the shear stress. Therefore, the adhesive 3 is made of a material with a high shear modulus, which can improve performance of shear stress transfer between the substrate 11 and the first dielectric layer 21, and reduce a loss of a shear stress transferred from the substrate 11 to the first dielectric layer 21. In this way, the first dielectric layer 21 is subject to a maximum shear stress, which facilitates strain amplification.

In conclusion, because the first cavity 111 is disposed on the substrate 11, the substrate 11 is prone to deformation under an external force, and a stress amplification structure is formed to convert a normal stress into a shear stress, amplify the shear stress, and exert the shear stress on the differential resistor layer 2. In this way, the differential resistor layer 2 can be subject to the maximum shear stress as much as possible, which facilitates strain amplification.

(VI) Strain Concentration and a Strain Amplification Principle of the Differential Resistor Layer 2.

In this embodiment of this application, positions of the piezo-resistors at the differential resistor layer 2 are designed to face a position of the first cavity 111, so that a strain amplification effect can be improved. In this embodiment of this application, a region corresponding to the vertical projection 111' in the contact surface 21' shown in FIG. 8A or FIG. 8B may be referred to as a strain concentration region, and is denoted as the strain concentration region 111'.

(i) Strain Concentration and Strain Amplification of the First Piezo-Resistors 221

Refer to FIG. 8A or FIG. 8B. It can be learned from the description in "(III) the N piezo-resistors, and a location relationship between the N piezo-resistors and the first dielectric layer" that the vertical projections 221' of the first piezo-resistors 221 on the contact surface 21' span, in the direction of the long side of the first piezo-resistor 221 (that is, the first direction), the vertical projection 221' of the first cavity 111 in the first direction on the contact surface 21'. It may be understood that, it can be learned from the description in "(V) Strain concentration and a strain amplification principle of the strain amplification layer 1" that the stress transferred from the strain amplification layer 1 to the differential resistor layer 2 is also a shear stress in the first direction. Therefore, as shown in FIG. 8A or FIG. 8B, the positions of the first piezo-resistors 221 are designed to face the position of the first cavity 111, so that the shear stress from the strain amplification layer 1 can be intensively exerted in the direction of the long side of the first piezo-resistor 221.

It should be noted that, it is known by a person skilled in the art that the stress is exerted in the direction of the long side of the first piezo-resistor 221, so that the piezo-resistor is stretched in the direction of the long side of the first piezo-resistor 221, and the piezo-resistor greatly deforms. In this way, the strain of the piezo-resistor can be increased, so that a resistance value of the piezo-resistor changes greatly (that is, a piezoresistive response of the piezo-resistor is increased).

Therefore, in the foregoing design, when an external force is exerted on the strain amplification layer 1, the shear stress transferred to the differential resistor layer 2 may be intensively exerted in the direction of the long side of the first piezo-resistor 221. In this way, strain concentration and strain amplification of the first piezo-resistor 221 is achieved.

It should be noted that, as shown in FIG. 8A or FIG. 8B, the vertical projections 221' of the first piezo-resistors 221 on the contact surface 21' is beyond the strain concentration region 111' (that is, an area corresponding to the vertical projection 111' of the first cavity 111 on the contact surface 21'). That is, the two ends (for example, 211*a*' and 211*b*') of the vertical projection 221' of the first piezo-resistor 221 on the contact surface 21' may be located respectively at the two sides of the vertical projection 111; and the two ends (for example, 211*a*' and 211*b*') of the vertical projection 221' are located beyond the strain concentration region 111'. 211*a*' and 211*b*' are vertical projections of the tip electrodes of the first piezo-resistor 221 on the contact surface 21'. This reduces a possibility that the electrodes are peeled off because the first piezo-resistor 221 is subject to the shear stress tangent to the contact surface 21'.

(ii) Strains of the Second Piezo-Resistors 222 Approaching Zero

As shown in FIG. 8A or FIG. 8B, the vertical projections 222' of the second piezo-resistors 222 on the contact surface 21' do not overlap with the strain concentration region 111'. That is, the vertical projections 222' of the second piezo-resistors 222 on the contact surface 21' are beyond the vertical projection 111' of the first cavity 111 on the contact surface 21'. In this way, the shear stress tangent to the contact surface 21' arising from deformation of the first cavity 111 can be prevented from being applied to the second piezo-resistors 222, and therefore deformation of the second piezo-resistors 222 can be avoided. In this way, the strains of the second piezo-resistors 222 can be minimized, so that the strains of the second piezo-resistors 222 approaches zero.

In this way, even if the strain amplification layer 1 is subject to an external force, the second piezo-resistors 222 do not deform under the stress from the strain amplification layer 1, and resistance values of the second piezo-resistors 222 do not change.

In conclusion, when the strain amplification layer 1 is subject to an external force, resistance values of the first piezo-resistors 221 change, but the resistance values of the second piezo-resistors 222 do not change. That is, when the strain amplification layer 1 is subject to an external force, resistance values of some piezo-resistors in the Wheatstone bridge formed by connecting the N piezo-resistors change. It may be understood that, on a premise that an input of the Wheatstone bridge is a constant voltage or a constant current, as a resistance value of a piezo-resistor in the Wheatstone bridge changes, an output voltage of the Wheatstone bridge changes. In this embodiment of this application, the processor 420 may detect, based on the output voltage of the Wheatstone bridge (that is, the output voltage of the pressure detection structure 410), the press operation performed by the user on the pressure-sensitive button formed by the pressure detection structure 410.

(VII) A Principle of Reducing Impact of Temperature on Pressure Detection in the Pressure Detection Structure 410

A resistance value of a piezo-resistor changes due to deformation of the piezo-resistor. In addition, the resistance value of the piezo-resistor is affected by temperature fluctuation due to a thermal effect of the piezo-resistor. Consequently, accuracy of pressure detection is affected. By using the pressure detection structure 410 provided in embodiments of this application, the impact of temperature on pressure detection can be reduced.

It can be learned from the foregoing description in "(VI) Strain concentration and a strain amplification principle of the differential resistor layer 2" that when the strain amplification layer 1 is subject to an external force, the resistance values of the first piezo-resistors 221 change, but the resistance values of the second piezo-resistors 222 do not change. However, the resistance values of the first piezo-resistors 221 and the second piezo-resistors 222 are affected by temperature. In addition, temperature affects the resistance values of the first piezo-resistors 221 and the second piezo-resistors 222 to basically the same extent. Therefore, in this embodiment of this application, impact of temperature on the resistance values of the first piezo-resistors 221 may be offset by impact of temperature on the resistance values of the second piezo-resistors 222. In this way, the impact of temperature on pressure detection can be reduced or even avoided.

For example, it is assumed that initial resistance values of the first piezo-resistors 221 and the second piezo-resistors 222 are R0. The initial resistance value is a resistance value of a piezo-resistor not affected by an external factor (such as an external force or a temperature change). The first piezo-resistors 221 and the second piezo-resistors 222 shown in FIG. 9 may be connected to form the Wheatstone bridge shown in (a) or (b) in FIG. 11. As shown in (a) or (b) in FIG. 11, $R_{221}$ indicates a changed resistance value of the first piezo-resistor 221, and $R_{222}$ indicates a changed resistance value of the second piezo-resistor 222.

When an external force is exerted and temperature changes, the resistance value of the first piezo-resistor 221 is affected by both the external force and temperature. The changed resistance value of the first piezo-resistor 221 is $R_{221}=R0+\Delta R_F+\Delta R_T$. When an external force is exerted and temperature changes, the resistance value of the second piezo-resistor 222 is affected by temperature, but is not affected by the external force, or the impact of the external force may be ignored. The changed resistance value of the second piezo-resistor 222 is $R_{222}=R0+\Delta R_T$, where $\Delta R_F$ indicates a change of the resistance value of the first piezo-resistor 221 caused by the external force. $\Delta R_T$ represents a change of the resistance values of the first piezo-resistor 221 and the second piezo-resistor 222 caused by temperature.

Figure 11:
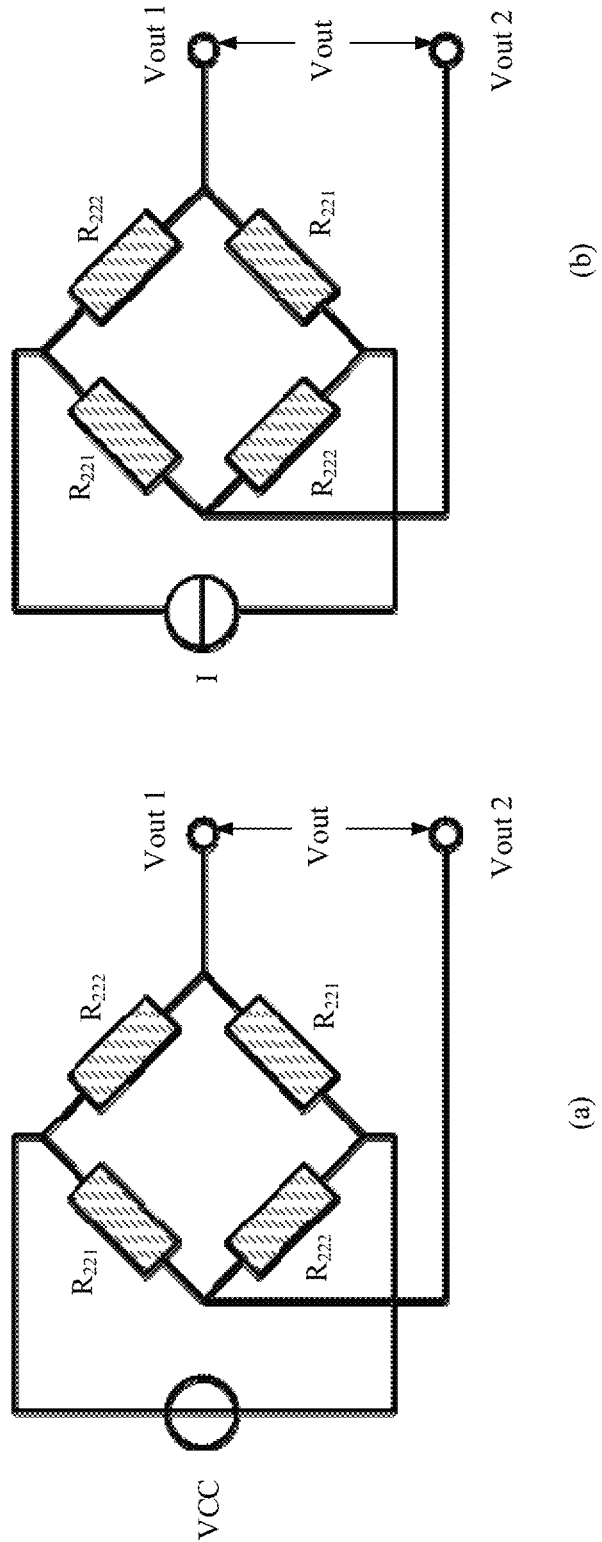
FIG. 11 is a schematic diagram of a connection circuit of a Wheatstone bridge formed by the piezo-resistors that are shown in FIG. 6 at a first dielectric layer.

For example, as shown in (a) in FIG. 11, the input of the pressure detection structure 410 is a constant voltage VCC. In this case, the output voltage (that is, the output voltage of the pressure detection structure 410) Vout of the Wheatstone bridge may be calculated according to the following formula (1).

$$Vout = \frac{R_{221} - R_{222}}{R_{221} + R_{222}} = \frac{\Delta R_F}{2R0 + \Delta R_F + 2\Delta R_T} * VCC \quad \text{formula (1)}$$

$\Delta R_T$ and $\Delta R_T$ are much smaller than R0. Therefore, the foregoing formula (1) may be simplified as $$Vout \approx \frac{VCC}{2R0} * \Delta R_F.$$

According to $$Vout \approx \frac{VCC}{2R0} * \Delta R_F,$$

it can be learned that the output voltage Vout of the pressure detection structure 410 is not affected by temperature. In other words, impact of temperature on the output voltage Vout of the pressure detection structure 410 can be eliminated due to a differential effect of the foregoing Wheatstone bridge, and therefore accuracy of pressure detection can be improved.

For another example, as shown in (b) in FIG. 11, the input of the pressure detection structure 410 is a constant current I. In this case, the output voltage (that is, the output voltage of the pressure detection structure 410) Vout of the Wheatstone bridge may be calculated according to the following formula (2).

$$Vout=\frac{1}{2}*(R_{221}-R_{222})=\frac{1}{2}*\Delta R_F \quad \text{formula (2)}$$

According to the formula (2), it can be learned that the output voltage Vout of the pressure detection structure 410 is not affected by temperature. In other words, according to the solution in this embodiment of this application, the impact of temperature on the output voltage Vout of the pressure detection structure 410 can be eliminated, and therefore accuracy of pressure detection can be improved.

It should be noted that a value of the output voltage Vout of the pressure detection structure 410 depends on the initial resistance values R0 of the first piezo-resistor 221 and the second piezo-resistor 222, $\Delta R_F$ of the first piezo-resistor 221, and the VCC/I. For example, usually, R0 is 1 to 10 kilohms (kΩ). For a value of the VCC/I, refer to the description in the foregoing embodiments. A value of $\Delta R_F$ depends on a value of a strain of the first piezo-resistor 221. A greater strain of the first piezo-resistor 221 indicates a larger $\Delta R_F$, and a smaller strain of the first piezo-resistor 221 indicates a smaller $\Delta R_F$.

In the pressure detection structure 410 provided in embodiments of this application, the strain of the first piezo-resistor 221 in the pressure detection structure 410 is increased, and therefore pressure detection sensitivity of the pressure detection structure 410 is improved. In addition, the impact of temperature on the resistance value of the piezo-resistor can be reduced, and therefore accuracy of pressure detection is improved.

It should be noted that in the foregoing embodiments, N=4 is used as an example to describe embodiments of this application. However, a value of N includes but is not limited to 2. N≥2, and N is a positive integer. It should be noted that a first piezo-resistor and a second piezo-resistor shown in any one of FIG. 12A to FIG. 12D are made of the same material and have the same initial resistance value. For a changed resistance value of the first piezo-resistor shown in any one of FIG. 12A to FIG. 12D, refer to $R_{221}$ in the foregoing embodiment. For a changed resistance value of the second piezo-resistor, refer to $R_{222}$ in the foregoing embodiment. Details are not described herein again in this embodiment of this application.

In some embodiments, N=2, and two piezo-resistors may be connected at the first dielectric layer to form one half bridge of the Wheatstone bridge. As shown in (a) in FIG. 12A, R1 indicates the changed resistance value of the first piezo-resistor, and R2 indicates the changed resistance value of the second piezo-resistor. The first piezo-resistor with the resistance value R1 and the second piezo-resistor with the resistance value R2 are connected to form one half bridge of the Wheatstone bridge. The input of the Wheatstone bridge is a VCC/I, and the output is a Vout.

Figure 12A:
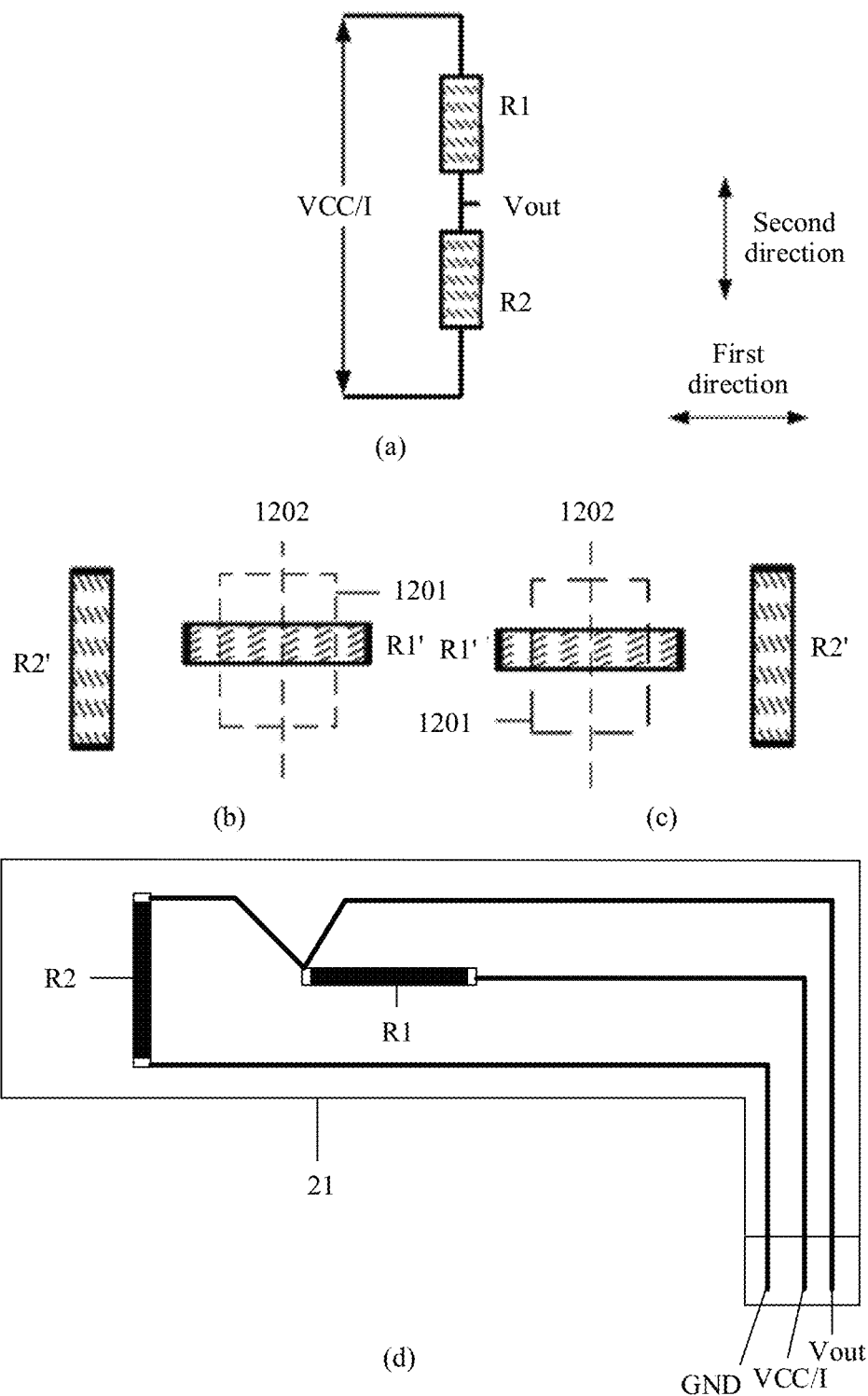
FIG. 12A is a schematic diagram of a connection circuit and a resistor distribution manner of a Wheatstone bridge according to an embodiment of this application.

Refer to (b) or (c) in FIG. 12A, where (b) or (c) in FIG. 12A is a schematic diagram of a distribution, at the first dielectric layer, of the first piezo-resistor and the second piezo-resistor in the half bridge shown in (a) in FIG. 12A. 1201 shown in (b) or (c) in FIG. 12A represents a vertical projection of the first cavity on a contact surface between the first dielectric layer and the piezo-resistor layer, R1' represents a vertical projection of the first piezo-resistor on the contact surface, and R2' represents a vertical projection of the second piezo-resistor on the contact surface.

In this embodiment of this application, a first direction is parallel to a long side of the first piezo-resistor. For example, as shown in (b) or (c) in FIG. 12A, a long side of the vertical projection R1' is parallel to the first direction. As shown in (b) or (c) in FIG. 12A, one end of the vertical projection R1' in the first direction is on a left side of the vertical projection 1201; and the other end of the vertical projection R1' in the first direction is on a right side of the vertical projection 1201. In other words, in this embodiment of this application, the two ends of the vertical projection R1' of the first piezo-resistor on the contact surface may be located respectively at the two sides of the vertical projection 1201.

Optionally, the center line of the first piezo-resistor in a second direction coincides with the center line of the first cavity in the second direction. For example, as shown in (b) or (c) in FIG. 12A, a dashed line 1202 is the center line of the vertical projection 1201 in the second direction, and is also the center line of the vertical projection R1' in the second direction.

A long side of the second piezo-resistor is perpendicular to the first direction, and the second piezo-resistor may be disposed on any side of the first piezo-resistor in the first direction. In addition, the vertical projection of the second piezo-resistor on the contact surface does not overlap with the vertical projection of the first cavity on the contact surface.

For example, as shown in (b) or (c) in FIG. 12A, a long side of the vertical projection R2' is perpendicular to the first direction, and the vertical projection R2' does not overlap with the vertical projection 1201. As shown in (b) in FIG. 12A, the vertical projection R2' is on the left side of the vertical projection 1201. As shown in (c) in FIG. 12A, the vertical projection R2' is on the right side of the vertical projection 1201.

It should be noted that (b) or (c) in FIG. 12A is only an example of a distribution manner of the first piezo-resistor and the second piezo-resistor at the first dielectric layer when N=2. When N=2, a distribution manner of the first piezo-resistor and the second piezo-resistor at the first dielectric layer includes but is not limited to that shown in (b) or (c) in FIG. 12A. As shown in (b) or (c) in FIG. 12A, the vertical projection R2' may be on an upper side or a lower side of the vertical projection 1201. With reference to the example of the distribution manner shown in (b) in FIG. 12A, (d) in FIG. 12A shows a schematic diagram of a connection circuit and a circuit arrangement of the piezo-resistors at the first dielectric layer 21 shown in (a) in FIG. 12A.

In some other embodiments, N=4, and four piezo-resistors may be connected at the first dielectric layer to form two half bridges of the Wheatstone bridge, that is a full bridge. The four piezo-resistors include two first piezo-resistors and two second piezo-resistors. As shown in (a) in FIG. 12B, R11 and R12 indicate changed resistance values of the first piezo-resistors, and R21 and R22 indicate changed resistance values of the second piezo-resistors. Generally, R11=R12=R21=R22. The two first piezo-resistors with the resistance values R11 and R12 and the two second piezo-resistors with the resistance values R21 and R22 are connected to form two half bridges of the Wheatstone bridge. The input of the Wheatstone bridge is a VCC/I, and the output is a Vout. The input of the Wheatstone bridge is the VCC/I, and the output is a Vout 1 (that is, an output voltage of a first output end) and a Vout 2 (that is, an output voltage of a second output end). After detecting the Vout 1 and the Vout 2, the processor 420 may calculate a difference between the Vout 1 and the Vout 2, and use Vout 1−Vout 2 as a pressure signal. In this way, impact of temperature on the output voltage Vout of the pressure detection structure 410 can be eliminated, and therefore accuracy of pressure detection can be improved.

Figure 12B:
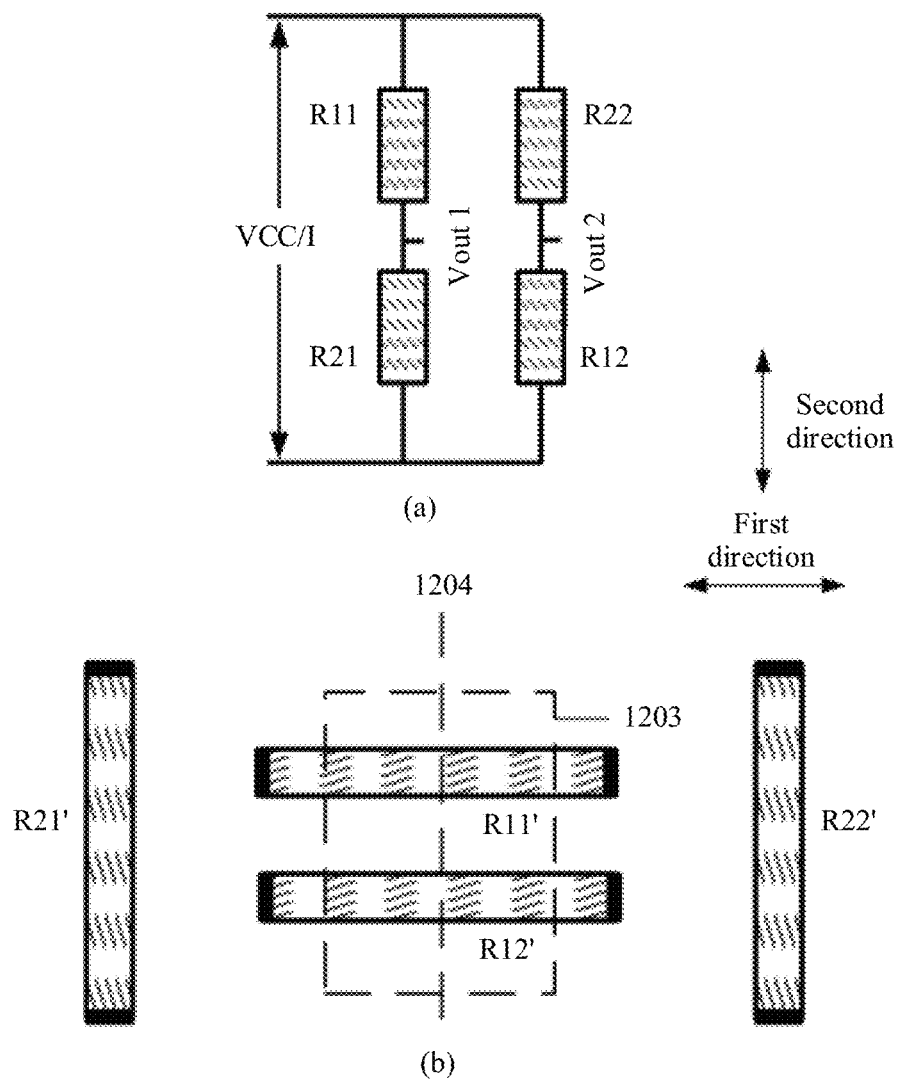
FIG. 12B is a schematic diagram of a connection circuit and a resistor distribution manner of a Wheatstone bridge according to an embodiment of this application.

Refer to (b) in FIG. 12B, where (b) in FIG. 12B is a schematic diagram of a distribution, at the first dielectric layer, of the first piezo-resistors and the second piezo-resistors in the two half bridges shown in (a) in FIG. 12B. 1203 shown in (b) in FIG. 12B represents a vertical projection of the first cavity on the contact surface between the first dielectric layer and the piezo-resistor layer. R11' and R12' represent vertical projections of the two first piezo-resistors on the contact surface. R21' and R22' represent vertical projections of the two second piezo-resistors on the contact surface. A dashed line 1204 is the center line of the vertical projection 1203 in a second direction, and it is the center line of the vertical projections R11' and R12' in the second direction.

For the distribution manner shown in (b) in FIG. 12B, refer to the description of the distribution manner of the first piezo-resistors and the second piezo-resistors at the first dielectric layer shown in FIG. 8A or FIG. 8B in the foregoing embodiments. For a connection circuit and a circuit arrangement of the piezo-resistors at the first dielectric layer 21 shown in (a) in FIG. 12B, refer to FIG. 9. Details are not described herein again in this embodiment of this application.

It should be noted that quantities of first piezo-resistors and second piezo-resistors in the N piezo-resistors may be the same or may be different. For example, in the foregoing embodiments, an example in which the quantities of first piezo-resistors and second piezo-resistors in the N piezo-resistors are the same is used. In the following embodiments, an example in which the quantities of first piezo-resistors and second piezo-resistors in the N piezo-resistors are not the same is used.

In some embodiments, for example, N=6, and the N piezo-resistors include two first piezo-resistors and four second piezo-resistors. The six piezo-resistors may be connected at the first dielectric layer to form three half bridges of the Wheatstone bridge. As shown in (a) in FIG. 12C, R11 and R12 indicate changed resistance values of the first piezo-resistors. R21, R22, R23, and R24 indicate changed resistance values of the second piezo-resistors. Generally, R11 R12 R21 R22 R23 R24. The two first piezo-resistors with the resistance values R11 and R12 and the four second piezo-resistors with the resistance values R21, R22, R23, and R24 are connected to form three half bridges of the Wheatstone bridge. The input of the Wheatstone bridge is the VCC/I, and the output is a Vout I (that is, an output voltage of a third output end), a Vout II (that is, an output voltage of a fourth output end), and a Vout III (that is, an output voltage of a fifth output end). After detecting the Vout I, the Vout II, and the Vout III, the processor 420 may calculate a difference between the Vout I and the Vout II, and calculate a variation (for example, ΔVout III) of the Vout III. Then the processor 420 may use Vout I–Vout II as a pressure signal, and use ΔVout III as a temperature compensation signal. The processor 420 may eliminate impact of temperature on the pressure signal Vout I–Vout II by using the temperature compensation signal ΔVout III. In this way, accuracy of pressure detection can be improved.

Figure 12C:
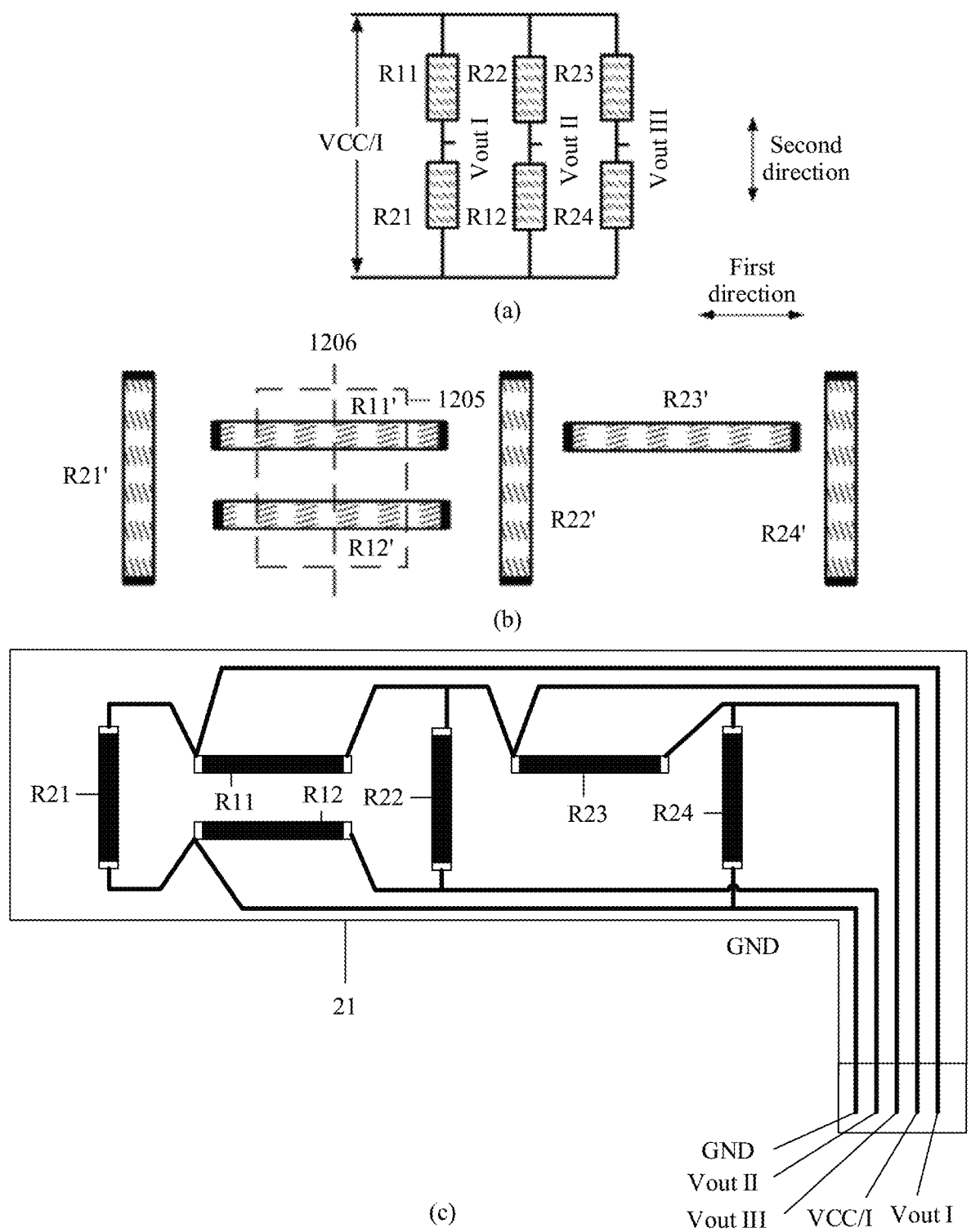
FIG. 12C is a schematic diagram of a connection circuit and a resistor distribution manner of a Wheatstone bridge according to an embodiment of this application.

Refer to (b) in FIG. 12C, where (b) in FIG. 12C is a schematic diagram of a distribution, at the first dielectric layer, of the first piezo-resistors and the second piezo-resistors in the three half bridges shown in (a) in FIG. 12C. 1205 shown in (b) in FIG. 12C represents a vertical projection of the first cavity on the contact surface between the first dielectric layer and the piezo-resistor layer. R11' and R12' represents vertical projections of the two first piezo-resistors on the contact surface. R21', R22', R23', and R24' represent vertical projections of the four second piezo-resistors on the contact surface.

In this embodiment of this application, a first direction is parallel to long sides of the first piezo-resistors. For example, as shown in (b) in FIG. 12C, long sides of the vertical projections R11' and R12' are parallel to the first direction. As shown in (b) in FIG. 12C, one end of the vertical projection R11' and one end of the vertical projection R12' in the first direction are on a left side of the vertical projection 1205; and the other end of the vertical projection R11' and the other end of the vertical projection R12' in the first direction are on a right side of the vertical projection 1205. In other words, in this embodiment of this application, the two ends of the vertical projection R11' and the two ends of the vertical projection R12' of the first piezo-resistors on the contact surface may be located respectively at the two sides of the vertical projection 1205.

Optionally, the center line of the first piezo-resistors in a second direction coincides with the center line of the first cavity in the second direction. For example, as shown in (b) in FIG. 12C, a dashed line 1206 is the center line of the vertical projection 1205 in the second direction, and is also the center line of the vertical projections R11' and R12' in the second direction.

In the foregoing four second piezo-resistors, long sides of some second piezo-resistors are perpendicular to the first direction, and long sides of some second piezo-resistors are parallel to the first direction. In addition, the vertical projections of the second piezo-resistors on the contact surface do not overlap with the vertical projection of the first cavity on the contact surface.

For example, as shown in (b) in FIG. 12C, long sides of the vertical projections R21', R22', and R24' are perpendicular to the first direction, and a long side of the vertical projection R23' is parallel to the first direction. In addition, the vertical projections R21', R22', R23', and R24' do not overlap with the vertical projection 1205. Optionally, the distribution of the vertical projection R21' and the vertical projection R22' is symmetric about the center line 1206 of the vertical projection 1205 in the second direction.

It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this embodiment of this application, long sides of some second piezo-resistors are perpendicular to the first direction, and long sides of some second piezo-resistors are parallel to the first direction, so that the impact of a distribution manner of the piezo-resistors on the resistance values of the piezo-resistors can be reduced. In this way, the accuracy of pressure detection can be further improved.

As shown in (b) in FIG. 12C, the vertical projection R21' and the vertical projection R22' are on the left and right sides of the vertical projection 1205 respectively, the vertical projection R23' is on a right side of the vertical projection R22', and the vertical projection R24' is on a right side of the vertical projection R23'.

It should be noted that (b) in FIG. 12C is only an example of the distribution manner of the first piezo-resistors and the second piezo-resistors at the first dielectric layer in the foregoing embodiment. The distribution manner of the first piezo-resistors and the second piezo-resistors at the first dielectric layer includes but is not limited to that shown in (b) in FIG. 12C. With reference to the example of the distribution manner shown in (b) in FIG. 12C, (c) in FIG. 12C shows a schematic diagram of a connection circuit and a circuit arrangement of the piezo-resistors at the first dielectric layer 21 shown in (a) in FIG. 12C.

In some other embodiments, for example, N=8, and the N piezo-resistors include two first piezo-resistors and six second piezo-resistors. The eight piezo-resistors may be connected at the first dielectric layer to form four half bridges of the Wheatstone bridge. As shown in (a) in FIG. 12D, R11 and R12 indicate changed resistance values of the first piezo-resistors. R21, R22, R23, R24, R25, and R26 indicate changed resistance values of the second piezo-resistors. Generally, R11 R12 R21 R22 R23 R24 R25 R26. The two first piezo-resistors with the resistance values R11 and R12 and the six second piezo-resistors with the resistance values R21, R22, R23, R24, R25, and R26 are connected to form four half bridges of the Wheatstone bridge.

The input of the Wheatstone bridge is a VCC/I, and the output is a Vou A, a Vout B, a Vout C, and a Vout D. After detecting the Vout A (that is, an output voltage of a sixth output end), the Vout B (that is, an output voltage of a seventh output end), the Vout C (that is, an output voltage of an eighth output end), and the Vout D (that is, an output voltage of a ninth output end), the processor 420 may calculate a first difference U1=Vout A–Vout D, a second difference U2=Vout B–Vout C, a third difference U3=Vout C–Vout D, and a variation of U1, U2, and U3 (that is, ΔU1, ΔU2, and ΔU3). Then the processor 420 may use ΔU1+ΔU2 as a pressure signal, use ΔU3 as a temperature compensation signal, and use ΔU1–ΔU2 as a distortion signal. The distortion signal refers to a signal generated due to deformation of a piezo-resistor. The processor 420 may eliminate impact of temperature on the pressure signal ΔU1+ΔU2 by using the temperature compensation signal ΔU3. In this way, accuracy of pressure detection can be improved. The processor 420 may eliminate impact of deformation of a piezo-resistor (for example, the second piezo-resistor) on the pressure signal ΔU1+ΔU2 by using the distortion signal ΔU1−ΔU2. In this way, the accuracy of pressure detection can be further improved.

Figure 12D:
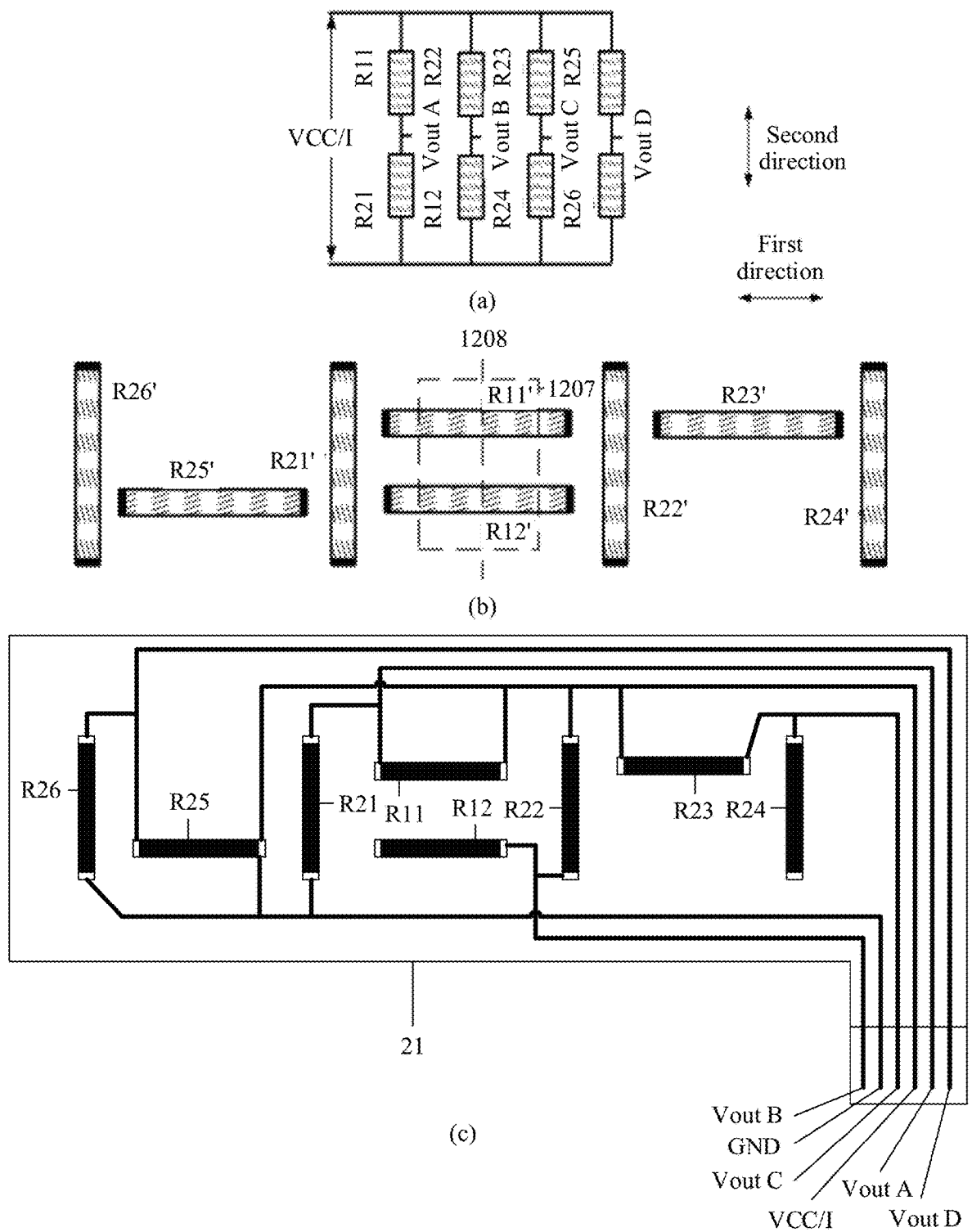
FIG. 12D is a schematic diagram of a connection circuit and a resistor distribution manner of a Wheatstone bridge according to an embodiment of this application.

Refer to (b) in FIG. 12D, where (b) in FIG. 12D is a schematic diagram of a distribution, at the first dielectric layer, of the first piezo-resistors and the second piezo-resistors in the four half bridges shown in (a) in FIG. 12D. 1207 shown in (b) in FIG. 12D represents a vertical projection of the first cavity on the contact surface between the first dielectric layer and the piezo-resistor layer. R11' and R12' represents vertical projections of the two first piezo-resistors on the contact surface. R21', R22', R23', R24', R25', and R26' represent vertical projections of the six second piezo-resistors on the contact surface.

In this embodiment of this application, a first direction is parallel to long sides of the first piezo-resistors. For example, as shown in (b) in FIG. 12D, long sides of the vertical projections R11' and R12' are parallel to the first direction. As shown in (b) in FIG. 12D, one end of the vertical projection R11' and one end of the vertical projection R12' in the first direction are on a left side of the vertical projection 1207; and the other end of the vertical projection R11' and the other end of the vertical projection R12' in the first direction are on a right side of the vertical projection 1207. In other words, in this embodiment of this application, the two ends of the vertical projection R11' and the two ends of the vertical projection R12' of the first piezo-resistors on the contact surface may be located at the two sides of the vertical projection 1207.

Optionally, the center line, in a second direction, of the vertical projections of the first piezo-resistors on the contact surface coincides with the center line, in the second direction, of the vertical projection of the first cavity on the contact surface. For example, as shown in (b) in FIG. 12D, a dashed line 1208 is the center line of the vertical projection 1207 in the second direction, and is also the center line of the vertical projections R11' and R12' in the second direction.

In the foregoing four second piezo-resistors, long sides of some second piezo-resistors are perpendicular to the first direction, and long sides of some second piezo-resistors are parallel to the first direction. In addition, the vertical projections of the second piezo-resistors on the contact surface do not overlap with the vertical projection of the first cavity on the contact surface.

For example, as shown in (b) in FIG. 12C, long sides of the vertical projections R21', R22', R24', and R6' are perpendicular to the first direction, and long sides of the vertical projections R23' and R25' are parallel to the first direction. In addition, the vertical projections R21', R22', R23', R24', R25', and R26' do not overlap with the vertical projection 1207.

It may be understood that a distribution manner of the piezo-resistors at the first dielectric layer (for example, the piezo-resistors are arranged to be parallel to or perpendicular to the first direction) may affect impact of temperature and pressure on the resistance values of the piezo-resistors. In this embodiment of this application, long sides of some second piezo-resistors are perpendicular to the first direction, and long sides of some second piezo-resistors are parallel to the first direction, so that impact of a distribution manner of the piezo-resistors on the resistance values of the piezo-resistors can be reduced. In this way, the accuracy of pressure detection can be further improved.

As shown in (b) in FIG. 12D, the vertical projection R21' and the vertical projection R22' are on the left and right sides of the vertical projection 1207 respectively; the vertical projection R23' is on a right side of the vertical projection R22'; the vertical projection R24' is on a right side of the vertical projection R23'; the vertical projection R25' is on a left side of the vertical projection R24'; and the vertical projection R26' is on a left side of the vertical projection R25'.

To improve the accuracy of pressure detection, as shown in (b) in FIG. 12D, the two second piezo-resistors corresponding to the vertical projections R21' and R22' are disposed symmetrically (for example, the two second piezo-resistors are axially symmetric) about the center line 1208 of the vertical projection 1207 in the second direction; the two second piezo-resistors corresponding to the vertical projections R24' and R26' are disposed symmetrically (for example, the two second piezo-resistors are axially symmetric) about the center line 1208 of the vertical projection 1207 in the second direction; and the two second piezo-resistors corresponding to the vertical projections R23' and R25' are disposed symmetrically (for example, the two second piezo-resistors are centrosymmetric) about the center line 1208 of the vertical projection 1207 in the second direction.

It may be understood that deformation of two second piezo-resistors symmetrically disposed on the two sides of the first cavity is almost the same, and resistance values of the two second piezo-resistors are also almost the same, where deformation of the two second piezo-resistors is caused by deformation of the first cavity. Therefore, in the foregoing design, the impact of the distribution manner of the piezo-resistors on the resistance values of the piezo-resistors can be reduced, and the accuracy of pressure detection can be further improved.

It should be noted that (b) in FIG. 12D is only an example of the distribution manner of the first piezo-resistors and the second piezo-resistors at the first dielectric layer in the foregoing embodiment. The distribution manner of the first piezo-resistors and the second piezo-resistors at the first dielectric layer includes but is not limited to that shown in (b) in FIG. 12D. With reference to the example of the distribution manner shown in (b) in FIG. 12D, (c) in FIG. 12D shows a schematic diagram of a connection circuit and a circuit arrangement of the piezo-resistors at the first dielectric layer 21 shown in (a) in FIG. 12D.

It should be noted that, in this embodiment of this application, a quantity of first piezo-resistors in the N piezo-resistors includes but is not limited to 2, and a quantity of second piezo-resistors in the N piezo-resistors includes but is not limited to 2, 4, and 6. A designer may set a quantity of piezo-resistors in the pressure detection structure based on a use requirement for the pressure detection structure. A value of N is not limited in embodiments of this application. Regardless of the value of N, for a connection principle and an operating principle of the Wheatstone bridge, refer to related descriptions in the foregoing embodiments. Details are not described herein again in this embodiment of this application.

It should be noted that a cross section of the first cavity may be any shape such as a triangle, a trapezoid, a rectangle, a polygon, a circle, a sector, an ellipse, or a curve.

For example, as shown in FIG. 5, FIG. 6, or FIG. 7, the cross section of the first cavity 111 is an arc formed by elliptic arcs a to d. For another example, FIG. 13A shows schematic diagrams of cross sections of a plurality of pressure detection structures. As shown in FIG. 13A, a section of a first cavity 1311 of a pressure detection structure 1310 is a rectangle, a section of a first cavity 1321 of a pressure detection structure 1320 is a trapezoid, a section of a first cavity 1331 of a pressure detection structure 1330 is a triangle, and a section of a first cavity 1341 of a pressure detection structure 1340 is a semicircular.

It may be understood that disposing a first cavity on a substrate can enhance a strain amplification effect of the substrate and affects a structural strength of the substrate. In addition, when shapes of cross sections of first cavities are different, strain amplification effects of substrates are different, and structural strengths of the substrates are also different.

For example, in this embodiment of this application, cross sections of four shapes shown in FIG. 13A are used as examples to describe impact of a shape of a cross section of a first cavity on a structural strength and a strain amplification effect of a substrate.

Figure 13B:
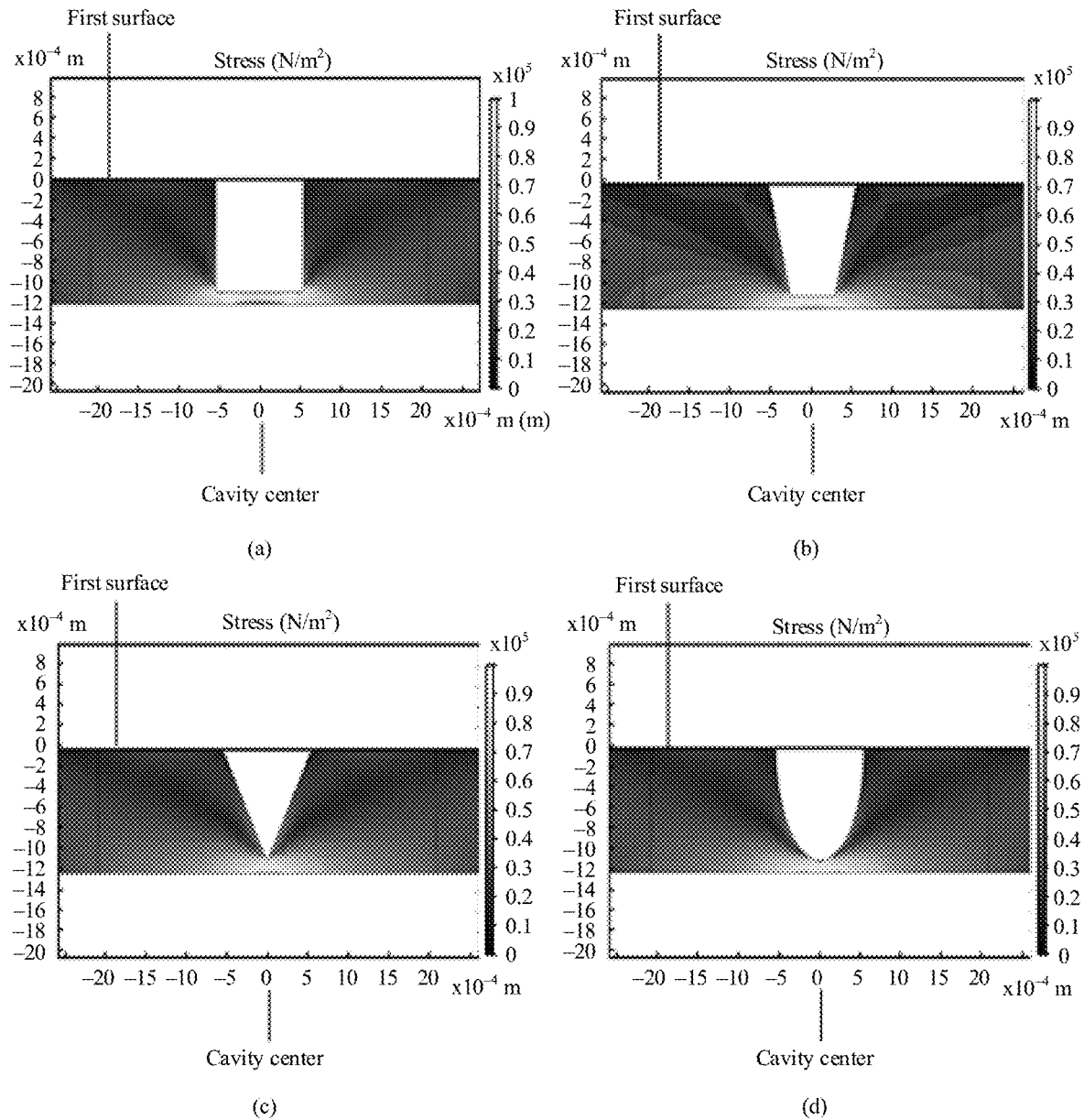
FIG. 13B is a schematic diagram of simulation results of the pressure detection structures shown in FIG. 13A.

It is assumed that the four pressure detection structures shown in FIG. 13A are subject to external forces in a direction shown in FIG. 13A, and each pressure detection structure is subject to the same external force of 1.3 kPa. Refer to FIG. 13B. FIG. 13B shows schematic diagrams of stress simulation on first surfaces of the four pressure detection structures shown in FIG. 13A when the external force of 1.3 kPa is exerted on the four pressure detection structures, where (a) in FIG. 13B is a schematic diagram of stress simulation of the pressure detection structure 1310 shown in FIG. 13A, (b) in FIG. 13B is a schematic diagram of stress simulation of the pressure detection structure 1320 shown in FIG. 13A, (c) in FIG. 13B is a schematic diagram of stress simulation of the pressure detection structure 1330 shown in FIG. 13A, and (d) in FIG. 13B is a schematic diagram of stress simulation of the pressure detection structure 1340 shown in FIG. 13A. In the pressure detection structures shown in FIG. 13A, except that the shapes of the cross sections of the first cavity are different, structures, materials, and relative position relationships of other components are completely the same. It should be noted that, for an object made of one material, a stress applied to the object is in direct proportion to a strain generated by the stress. A stress (usually represented by an external pressure) is applied to an object. A stress conversion rate of the stress can be used to describe a strain amplification effect of the object. A higher stress conversion rate indicates a better strain amplification effect. Refer to Table 1. Table 1 is a table of stress simulation parameters of the four pressure detection structures shown in FIG. 13B.

TABLE 1

Table of stress simulation parameters

| Cavity shape | Rectangle | Trapezoid | Triangle | Ellipse |
|---|---|---|---|---|
| Differential resistor layer (kPa) | 5.3687 | 5.227 | 5.0744 | 5.2381 |
| Stress conversion rate | 412% | 402% | 390% | 403% |
| Maximum stress on a substrate (kPa) | 99 | 81 | 78 | 56 |

As shown in Table 1, when the force of 1.3 kPa is exerted on the pressure detection structure 1310 (whose cavity is a rectangle) shown in FIG. 13A, a strain amplification layer of the pressure detection structure 1310 may amplify the external force to 5.3687 kPa, and transfer the external force to a differential resistor layer. A stress conversion rate of the pressure detection structure 1310 is 412%, where 5.3687/1.3=412%. The force of 1.3 kPa is exerted on the pressure detection structure 1310, and then a substrate of the pressure detection structure 1310 deforms. A maximum stress generated due to deformation of the substrate inside the substrate is 99 kPa.

When the force of 1.3 kPa is exerted on the pressure detection structure 1320 (whose cavity is a trapezoid) shown in FIG. 13A, a strain amplification layer of the pressure detection structure 1320 may amplify the external force to 5.3227 kPa, and transfer the external force to a differential resistor layer. A stress conversion rate of the pressure detection structure 1320 is 402%, where 5.3227/1.3=402%. The force of 1.3 kPa is exerted on the pressure detection structure 1320, and then a substrate of the pressure detection structure 1320 deforms. A maximum stress generated due to deformation of the substrate inside the substrate is 81 kPa.

When the force of 1.3 kPa is exerted on the pressure detection structure 1330 (whose cavity is a triangle) shown in FIG. 13A, a strain amplification layer of the pressure detection structure 1330 may amplify the external force to 5.0744 kPa, and transfer the external force to a differential resistor layer. A stress conversion rate of the pressure detection structure 1330 is 390%, where 5.0744/1.3=390%. The force of 1.3 kPa is exerted on the pressure detection structure 1330, and then a substrate of the pressure detection structure 1330 deforms. A maximum stress generated due to deformation of the substrate inside the substrate is 78 kPa.

When the force of 1.3 kPa is exerted on the pressure detection structure 1340 (whose cavity is an ellipse) shown in FIG. 13A, a strain amplification layer of the pressure detection structure 1340 may amplify the external force to 5.2381 kPa, and transfer the external force to a differential resistor layer. A stress conversion rate of the pressure detection structure 1340 is 403%, where 5.2381/1.3=403%. The force of 1.3 kPa is exerted on the pressure detection structure 1340, and then a substrate of the pressure detection structure 1340 deforms. A maximum stress generated due to deformation of the substrate inside the substrate is 56 kPa.

It may be understood that a stress exerted on a strain amplification layer (namely, a substrate) is inversely proportional to a structural strength of the substrate. Specifically, a higher structural strength of the substrate indicates that the substrate is less likely to deform, and therefore the stress exerted on a first surface of the substrate is smaller.

It can be learned from Table 1 that the strain amplification layer of the pressure detection structure 1340 (that is, the substrate with the elliptic cavity) is subject to a smallest stress, and the substrate of the pressure detection structure 1340 has a highest structural strength; and the pressure detection structure 1310 has a highest stress conversion rate, and the substrate of the pressure detection structure 1310 has a lowest structural strength. However, the pressure detection structure 1340 has a highest stress conversion rate and a best strain amplification effect, and the pressure detection structure 1310 has a lowest stress conversion rate and a worst strain amplification effect.

In embodiments of this application, authenticity and appropriateness of the foregoing simulation data can be proved by the following experiment. In the experiment, an external force of 1.3 kPa in a direction shown in FIG. 13A is exerted on the four pressure detection structures shown in FIG. 13A. Then an output voltage of each pressure detection structure is measured, and a normalized strain of each pressure detection structure is obtained based on the output voltage. Refer to Table 2. Table 2 shows a table of output voltages and normalized strain parameters of the four pressure detection structures shown in FIG. 13A.

TABLE 2

Table of output voltages and normalized strain parameters of substrates

| Cavity shape | Rectangle | Trapezoid | Triangle | Ellipse |
|---|---|---|---|---|
| Vout | 194.15 | 126.96 | 92.71 | 115.88 |
| Normalized strain | 1 | 0.653927 | 0.477517 | 0.596858 |

In this embodiment of this application, a strain of a pressure detection structure may be determined based on an output voltage of the pressure detection structure. The normalized strain of each pressure detection structure shown in Table 2 is a ratio of a strain of the pressure detection structure to a strain of the pressure detection structure having the rectangular cavity.

As shown in Table 2, the pressure detection structure 1310 (that is, the pressure detection structure with the rectangular cavity) has a largest output voltage and a largest normalized strain; the pressure detection structure 1330 (that is, the pressure detection structure with the triangular cavity) has a smallest output voltage and a smallest normalized strain; and an output voltage of the pressure detection structure 1340 (that is, the pressure detection structure with the elliptic cavity) is slightly greater than the output voltage of the pressure detection structure 1330, and a normalized strain of the pressure detection structure 1340 is slightly greater than a normalized strain of the pressure detection structure 1330.

Figure 13C:
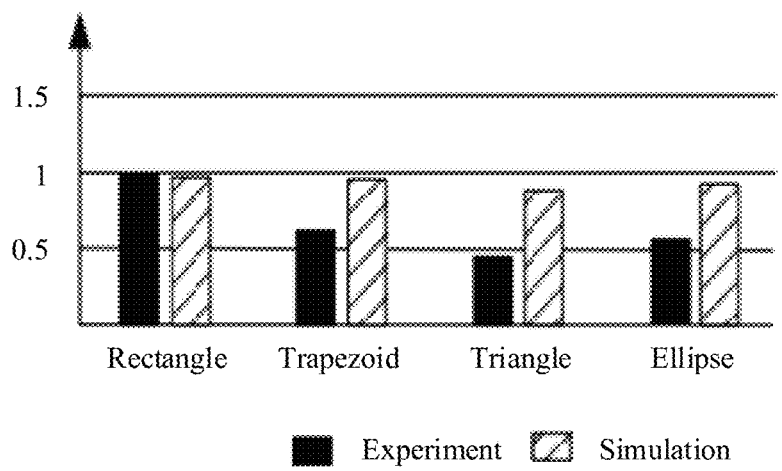
FIG. 13C is a schematic diagram of comparison between simulated normalized strains and experimental normalized strains of the pressure detection structures shown in FIG. 13A.

In this embodiment of this application, a simulated normalized strain of each pressure detection structure may be calculated based on stresses that correspond to the strain amplification layer and the differential resistor layer of each pressure detection structure and that are shown in Table 1. FIG. 13C is a schematic diagram of comparison between the simulated normalized strains and the experimental normalized strains of the pressure detection structures shown in FIG. 13A according to this embodiment of this application, where the comparison is based on the parameters in Table 1 and Table 2. It can be learned from FIG. 13C that the simulated normalized strains of the pressure detection structures are basically consistent with the experimental normalized strains.

Figure 13D:
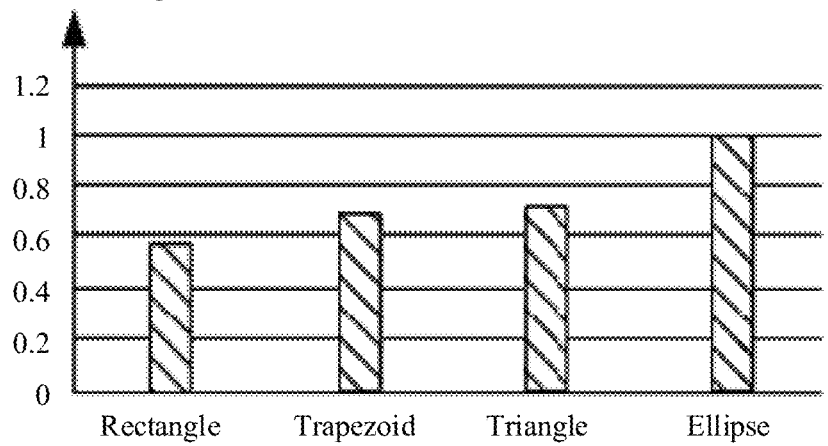
FIG. 13D is a schematic diagram of experimental normalized structural strengths of the pressure detection structures shown in FIG. 13A.

Refer to FIG. 13D. FIG. 13D is a schematic diagram of normalized structural strengths of the pressure detection structures in the experiment. It can be learned from FIG. 13D that the pressure detection structure 1340 (that is, the pressure detection structure with the elliptical first cavity) has a highest structural strength, and the pressure detection structure 1310 (that is, the pressure detection structure with the rectangular first cavity) has a lowest structural strength. The structural strength of each pressure detection structure in experimental data shown in FIG. 13D is basically consistent with the structural strength of each pressure detection structure in simulation data.

In conclusion, the simulation data is authentic and appropriate. When shapes of cross sections of first cavities are different, strain amplification effects of substrates are different, and structural strengths of the substrates are also different.

It may be understood that a lower structural strength of a substrate indicates that the substrate is more likely to be damaged after an external force is exerted on the substrate, and a higher structural strength of a substrate indicates a longer service life of the substrate. In embodiments of this application, to maximize strain amplification, the substrate is required to have a good strain amplification effect. In other words, in embodiments of this application, the substrate is required to have a good strain amplification effect, and the structural strength of the substrate is high.

It should be noted that the simulation parameter or the simulation data in embodiments of this application may be parameters such as a stress and a strain that are obtained when an external force is exerted on the foregoing pressure detection structures, which is implemented through software simulation. The experimental data or the experimental parameters in embodiments of this application may be parameters such as a stress and a strain that are obtained through measurement in the experiment when an external force is exerted on entity models of the foregoing pressure detection structures.

In the foregoing example, a strain amplification effect of the substrate having the first cavity with the rectangular cross section is the best, but the structural strength of the substrate is the lowest. To resolve this problem, in this embodiment of this application, the rectangular first cavity may be improved, to improve the structural strength of the substrate. In this embodiment of this application, a bottom or a joint between an opening and a slot of the rectangular first cavity 1311 shown in FIG. 13A may be designed as an arc. In this way, the structural strength of the substrate can be improved.

Figure 14A:
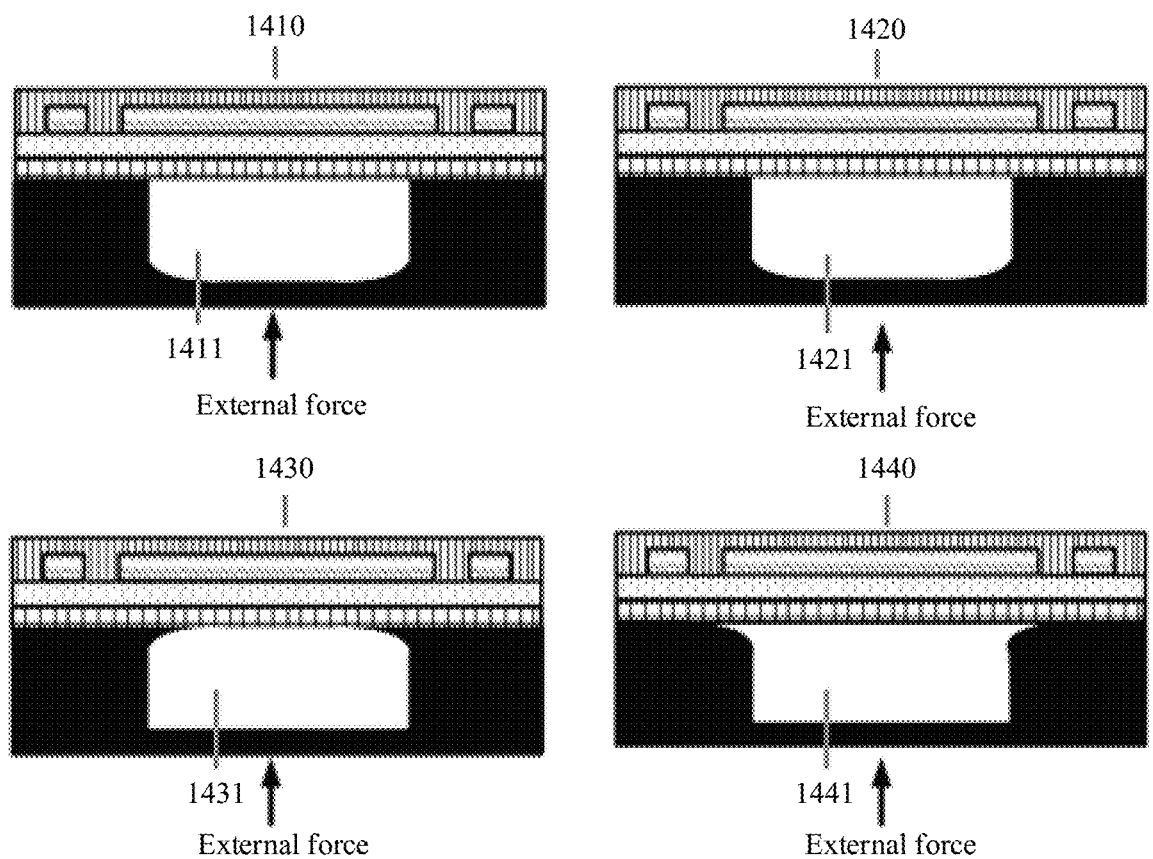
FIG. 14A is a sectional view 2 of pressure detection structures including cavities of different shapes according to an embodiment of this application.

For example, as shown in FIG. 14A, a bottom of a first cavity 1411 of a pressure detection structure 1410 is two small arcs; a bottom of a first cavity 1421 of a pressure detection structure 1420 is an entire elliptical arc; a joint between an opening of a first cavity 1431 of a pressure detection structure 1430 and two cavity walls is composed of arcs extending inwards; and a joint between an opening of a first cavity 1441 of a pressure detection structure 1440 and two cavity walls is composed of arcs extending outwards.

As shown in FIG. 7, the shape of the first cavity 111 shown in FIG. 5 is different from shapes of the first cavities shown in FIG. 14A. As shown in FIG. 7, the cavity walls of the first cavity 111 are perpendicular to the second surface 113 of the substrate 11. In addition, a joint between the opening of the first cavity 111 and the two cavity walls is composed of an elliptical arc a and an elliptical arc d that extend inwards, and a joint between a bottom of the first cavity 111 and the two cavity walls is composed of an elliptical arc b and an elliptical arc c that extend outwards. As shown in FIG. 7, one end of the elliptic arc a is tangent to an upper surface of the strain amplification layer 1, and the other end is tangent to a vertical direction. One end of the elliptic arc d is tangent to the upper surface of the strain amplification layer 1, and the other end is tangent to the cavity wall. One end of the elliptic arc b is tangent to the cavity wall, and the other end is tangent to one end of the elliptic arc c. The other end of the elliptical arc c is tangent to the cavity wall. The end of the elliptic arc b tangent to the elliptic arc c is parallel to the first face 113. Optionally, chamfering may be performed on ends, of the elliptic arc a and the elliptic arc d, that are tangent to the upper surface of the strain amplification layer 1.

It should be noted that strain amplification effects of the four pressure detection structures shown in FIG. 14A are different, and structural strengths of substrates are also different. In addition, in the four pressure detection structures shown in FIG. 14A, the pressure detection structure 1310 (which includes the rectangular cavity) shown in FIG. 13A, and the pressure detection structure shown in FIG. 5, the strain amplification effects of the pressure detection structures are different, and the structural strengths of the substrates are also different.

In the following embodiment, impact of setting each corner of a rectangular cavity to an arc on a strain amplification effect and a structural strength of a substrate of a pressure detection structure is described by using simulation and experimental data. It should be noted that in the pressure detection structures shown in FIG. 14A and FIG. 7 and the pressure detection structure 1310 shown in FIG. 13A, except that the shapes of the cross sections of the first cavities are different, other components and relative position relationships are completely the same.

Figure 14B:
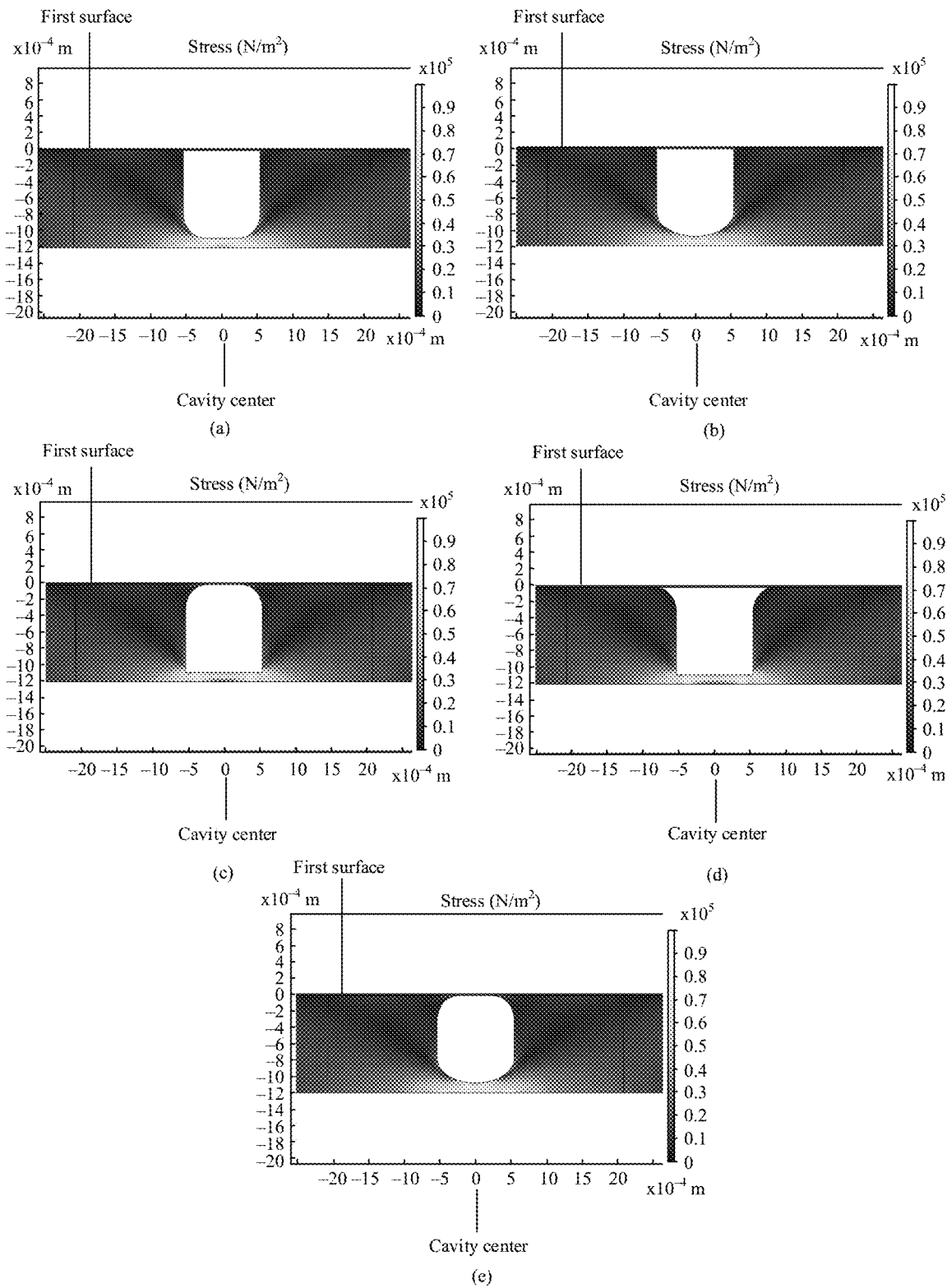
FIG. 14B is a schematic diagram of simulation results of the pressure detection structures shown in FIG. 14A.

It is assumed that the four pressure detection structures shown in FIG. 14A and the pressure detection structure shown in FIG. 7 are subject to external forces in a direction shown in FIG. 14A, and each pressure detection structure is subject to the same external force of 1.3 kPa. Refer to FIG. 14B. FIG. 14B shows schematic diagrams of stress simulation on the first surfaces of the four pressure detection structures shown in FIG. 14A and the pressure detection structure shown in FIG. 7 when the external force of 1.3 kPa is exerted on the pressure detection structures.

In the schematic diagrams, (a) in FIG. 14B is a schematic diagram of stress simulation of the pressure detection structure 1410 shown in FIG. 14A, (b) in FIG. 14B is a schematic diagram of stress simulation of the pressure detection structure 1420 shown in FIG. 14A, (c) in FIG. 14B is a schematic diagram of stress simulation of the pressure detection structure 1430 shown in FIG. 14A, (d) in FIG. 14B is a schematic diagram of stress simulation of the pressure detection structure 1440 shown in FIG. 14A, and (e) in FIG. 14B is a schematic diagram of stress simulation of the pressure detection structure 410 shown in FIG. 7. Refer to Table 3. Table 3 is a table of stress simulation parameters of the pressure detection structure 1310 shown in FIG. 13A, the four pressure detection structures shown in FIG. 14A, and the pressure detection structure 410 shown in FIG. 7 when the force of 1.3 kPa is exerted on all of the pressure detection structure 1310 shown in FIG. 13A, the four pressure detection structures shown in FIG. 14A, and the pressure detection structure 410 shown in FIG. 7.

When the force of 1.3 kPa is exerted on the pressure detection structure 1410 shown in FIG. 14A, a strain amplification layer of the pressure detection structure 1410 may amplify the external force to 5.3448 kPa, and transfer the external force to a differential resistor layer. A stress conversion rate of the pressure detection structure 1410 is 411%, where 5.3448/1.3=411%. The force of 1.3 kPa is exerted on the pressure detection structure 1410, and then a substrate of the pressure detection structure 1410 deforms. A maximum stress generated due to deformation of the substrate inside the substrate is 78 kPa.

When the force of 1.3 kPa is exerted on the pressure detection structure 1420 shown in FIG. 14A, a strain amplification layer of the pressure detection structure 1420 may amplify the external force to 5.3285 kPa, and transfer the external force to a differential resistor layer. A stress conversion rate of the pressure detection structure 1420 is 409%, where 5.3285/1.3=409%. The force of 1.3 kPa is exerted on the pressure detection structure 1420, and then a substrate of the pressure detection structure 1420 deforms. A maximum stress generated due to deformation of the substrate inside the substrate is 58 kPa.

When the force of 1.3 kPa is exerted on the pressure detection structure 1430 shown in FIG. 14A, a strain amplification layer of the pressure detection structure 1430 may amplify the external force to 9.0079 kPa, and transfer the external force to a differential resistor layer. A stress conversion rate of the pressure detection structure 1430 is 693%, where 9.0079/1.3=693%. The force of 1.3 kPa is exerted on the pressure detection structure 1430, and then a substrate of the pressure detection structure 1430 deforms. A maximum stress generated due to deformation of the substrate inside the substrate is 98 kPa.

When the force of 1.3 kPa is exerted on the pressure detection structure 1440 shown in FIG. 14A, a strain amplification layer of the pressure detection structure 1440 may amplify the external force to 3.5581 kPa, and transfer the external force to a differential resistor layer. A stress conversion rate of the pressure detection structure 1440 is

TABLE 3

Table of stress simulation parameters

| Cavity shape | 1310 shown in FIG. 13A | 1410 shown in FIG. 14A | 1420 shown in FIG. 14A | 1430 shown in FIG. 14A | 1440 shown in FIG. 14A | 410 shown in FIG. 7 |
|---|---|---|---|---|---|---|
| Differential resistor layer (kPa) | 5.3687 | 5.3448 | 5.3285 | 9.0079 | 3.5581 | 8.9409 |
| Stress conversion rate | 412% | 411% | 409% | 693% | 274% | 688% |
| Maximum stress on a substrate (kPa) | 99 | 78 | 58 | 98 | 98 | 58 |

As shown in Table 3, when the force of 1.3 kPa is exerted on the pressure detection structure 1310 (whose cavity is a rectangle) shown in FIG. 13A, the strain amplification layer of the pressure detection structure 1310 may amplify the external force to 5.3687 kPa, and transfer the external force to the differential resistor layer. The stress conversion rate of the pressure detection structure 1310 is 412%, where 5.3687/1.3=412%. The force of 1.3 kPa is exerted on the pressure detection structure 1310, and then the substrate of the pressure detection structure 1310 deforms. The maximum stress generated due to deformation of the substrate inside the substrate is 99 kPa.

274%, where 3.5581/1.3=274%. The force of 1.3 kPa is exerted on the pressure detection structure 1440, and then a substrate of the pressure detection structure 1440 deforms. A maximum stress generated due to deformation of the substrate inside the substrate is 98 kPa.

When the force of 1.3 kPa is exerted on the pressure detection structure 410 shown in FIG. 7, the strain amplification layer of the pressure detection structure 410 may amplify the external force to 8.9409 kPa, and transfer the external force to the differential resistor layer. A stress conversion rate of the pressure detection structure 410 is 688%, where 8.9409/1.3=688%. The force of 1.3 kPa is exerted on the pressure detection structure 410, and then the substrate of the pressure detection structure 410 deforms. A maximum stress generated due to deformation of the substrate inside the substrate is 58 kPa.

It can be learned from Table 3 that the substrate of the pressure detection structure 1310 is subject to a largest stress (for example, 99 kPa), and the substrates of the pressure detection structure 1430 and the pressure detection structure 1440 are subject to stresses (for example, 98 kPa) slightly smaller than the stress exerted on the strain amplification layer of the pressure detection structure 1310. However, the stress conversion rate of the pressure detection structure 1430 (for example, 693%) is much greater than the stress conversion rate of the pressure detection structure 1310 (for example, 412%) and the stress conversion rate of the pressure detection structure 1440 (for example, 274%).

The stress exerted on the substrate of the pressure detection structure 1420 (for example, 58 kPa) is equal to the stress exerted on the strain amplification layer of the pressure detection structure 410 (for example, 58 kPa). However, the stress conversion rate of the pressure detection structure 410 (for example, 688%) is much greater than the stress conversion rate of the pressure detection structure 1420 (for example, 409%).

It can be learned that, when a first cavity is disposed on a substrate, a smaller opening (for example, the opening is an arc extending inwards from cavity walls) of the first cavity is helpful to improve a stress conversion rate of a strain amplification layer (that is, the substrate) and enhance a strain amplification effect of the substrate.

That is, a structural strength of the substrate of the pressure detection structure 1310 is lower than a structural strength of the substrate of the pressure detection structure 1410, and the structural strength of the substrate of the pressure detection structure 1410 is lower than a structural strength of the substrate of the pressure detection structure 1420.

It can be learned that after disposing a first cavity on a substrate, a structural strength of the substrate can be enhanced through a bottom design of the first cavity (for example, the bottom of the cavity is an arc extending inwards from cavity walls). In other words, because the first cavity 111 is disposed in the pressure detection structure 410 shown in FIG. 7, the stress conversion rate of the substrate 11 can be improved, the strain amplification effect can be maximized, and the structural strength of the substrate 11 can be enhanced.

In embodiments of this application, authenticity and appropriateness of the foregoing simulation data can be proved by the following experiment. In the experiment, an external force of 1.3 kPa in a direction shown in FIG. 13A is exerted on the pressure detection structure 1310 shown in FIG. 13A, the four pressure detection structures shown in FIG. 14A, and the pressure detection structure 410 shown in FIG. 7. Then an output voltage of each pressure detection structure is measured, and a normalized strain of each pressure detection structure is obtained based on the output voltage. Refer to Table 4. Table 4 shows a table of output voltages and normalized strain parameters of the pressure detection structure 1310 shown in FIG. 13A, the four pressure detection structures shown in FIG. 14A, and the pressure detection structure 410 shown in FIG. 7.

TABLE 4

| | Table of output voltages and normalized strain parameters of substrates | | | | | |
|---|---|---|---|---|---|---|
| Cavity shape | 1310 shown in FIG. 13A (rectangle) | 1410 shown in FIG. 14A | 1420 shown in FIG. 14A | 1430 shown in FIG. 14A | 1440 shown in FIG. 14A | 410 shown in FIG. 7 |
| Vout | 194.15 | 160.38 | 151.01 | 181.75 | 101.69 | 157.43 |
| Normalized strain | 1 | 0.826062 | 0.777801 | 2.34033 | 0.52377 | 2.02717 |

In addition, it can be learned from Table 3 that the strain conversion rate of the pressure detection structure 410 (for example, 688%) and the strain conversion rate of the pressure detection structure 1430 (for example, 693%) are almost the same. However, the stress exerted on the substrate of the pressure detection structure 410 (for example, 58 kPa) is much smaller than the stress exerted on the substrate of the pressure detection structure 1430 (for example, 98 kPa). In other words, the structural strength of the substrate of the pressure detection structure 410 is much greater than a structural strength of the substrate of the pressure detection structure 1430.

The strain conversion rate of the pressure detection structure 1310 (for example, 412%), the strain conversion rate of the pressure detection structure 1410 (411%), and the strain conversion rate of the pressure detection structure 1420 (409%) are almost the same. However, the stress exerted on the substrate of the pressure detection structure 1310 (for example, 99 kPa) is much greater than the stress exerted on the substrate of the pressure detection structure 1410 (for example, 78 kPa), and the stress exerted on the substrate of the pressure detection structure 1410 (for example, 78 kPa) is greater than the stress exerted on the substrate of the pressure detection structure 1420 (for example, 58 kPa).

In this embodiment of this application, a strain of a pressure detection structure may be determined based on an output voltage of the pressure detection structure. The normalized strain of each pressure detection structure shown in Table 4 is a ratio of a strain of the pressure detection structure to a strain of the pressure detection structure having the rectangular cavity.

As shown in Table 4, an output voltage of the pressure detection structure 1310 is the largest, and a normalized strain of the pressure detection structure 1430 is the largest. A normalized strain of the pressure detection structure 410 is slightly smaller than the normalized strain of the pressure detection structure 1430.

Figure 14C:
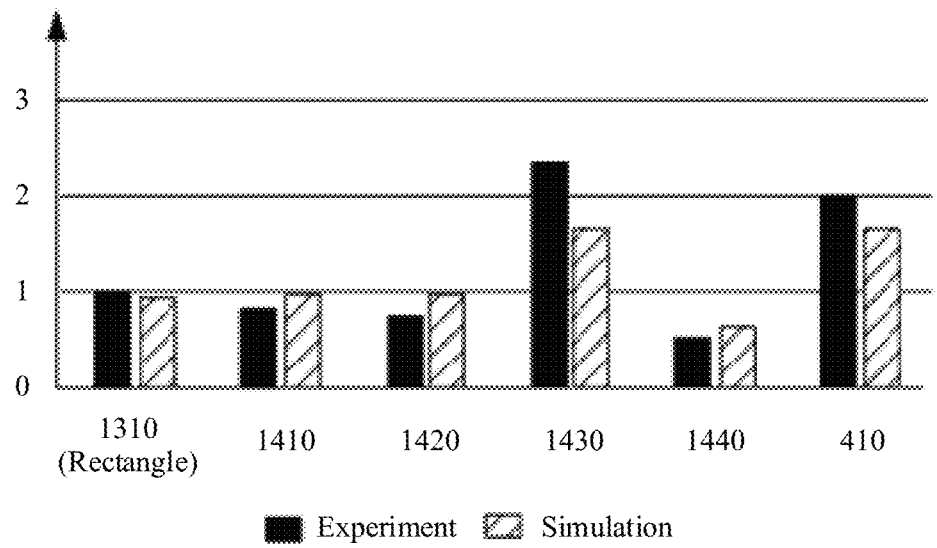
FIG. 14C is a schematic diagram of comparison between simulated normalized strains and experimental normalized strains of the pressure detection structures shown in FIG. 14A.

In this embodiment of this application, a simulated normalized strain of each pressure detection structure may be calculated based on stresses that correspond to the strain amplification layer and the differential resistor layer of each pressure detection structure and that are shown in Table 3. FIG. 14C is a schematic diagram of comparison between the simulated normalized strains and the experimental normalized strains of the pressure detection structure 1310 shown in FIG. 13A, the four pressure detection structures shown in FIG. 14A, and the pressure detection structure 410 shown in FIG. 7 according to this embodiment of this application, where the comparison is based on the parameters in Table 3 and Table 4. It can be learned from FIG. 14C that the simulated normalized strains of the pressure detection structures are basically consistent with the experimental normalized strains.

Figure 14D:
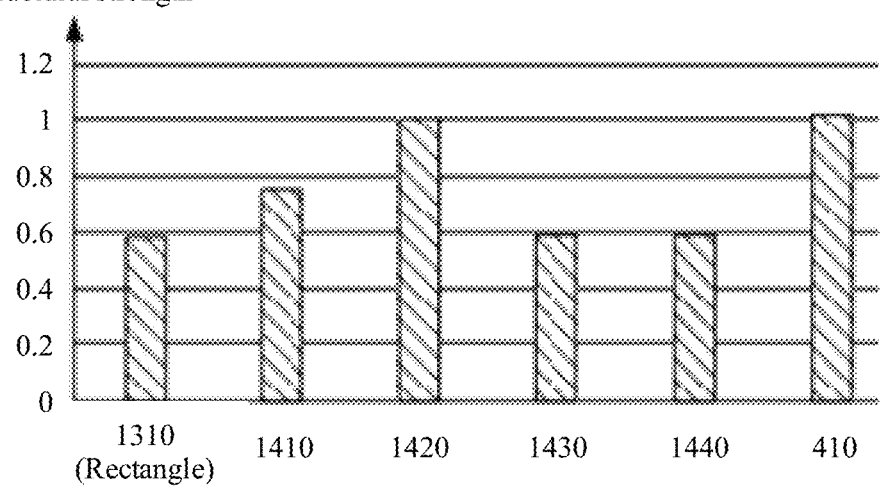
FIG. 14D is a schematic diagram of experimental normalized structural strengths of the pressure detection structures shown in FIG. 14A.

Refer to FIG. 14D. FIG. 14D is a schematic diagram of normalized structural strengths of the pressure detection structures in the experiment. It can be learned from FIG. 14D that the pressure detection structure 410 has a highest structural strength, and the pressure detection structure 1310 has a lowest structural strength. The structural strength of each pressure detection structure in experimental data shown in FIG. 14D is basically consistent with the structural strength of each pressure detection structure in simulation data.

In conclusion, the simulation data is authentic and appropriate. When shapes of cross sections of first cavities are different, strain amplification effects of substrates are different, and structural strengths of the substrates are also different.

By analyzing the foregoing simulation and experimental data, it can be learned that a size of an opening of a first cavity affects a structural strength of a substrate. Specifically, a smaller opening of the first cavity indicates a higher structural strength of the substrate, and a larger opening of the first cavity indicates a lower structural strength of the substrate. For example, the opening of the first cavity 111 shown in FIG. 7 is smaller than the opening of the first cavity 1441 shown in FIG. 14A. As shown in FIG. 14D, the structural strength of the pressure detection structure 410 is greater than the structural strength of the pressure detection structure 1410.

The size of the opening of the first cavity affects a strain amplification effect of a strain amplification layer (that is, the substrate) in addition to the structural strength of the substrate. Specifically, it can be learned from the description in "(V) Strain concentration and a strain amplification principle of the strain amplification layer 1" that the substrate 111 shown in FIG. 7 can implement strain amplification of two levels. The first-level strain amplification is implemented by 11b shown in FIG. 10A or FIG. 10B, and the second-level strain amplification is implemented by 11c shown in FIG. 10A or FIG. 10B. It can be learned from the foregoing description of the principle of strain amplification of two levels that, 11c shown in FIG. 10A or FIG. 10B implements the second-level strain amplification because L2<L1, that is, the opening EF of the first cavity 111 shown in FIG. 10A is less than the width AB (that is, a distance between the cavity walls on two sides) of the first cavity 111. However, the pressure detection structure 1310 shown in FIG. 13A and the pressure detection structures shown in FIG. 14A can implement only first-level strain amplification, but cannot implement second-level strain amplification.

Generally, a smaller L2 (that is, the size of the opening of the first cavity 111) shown in FIG. 10A indicates a larger L1 (that is, the distance between the two cavity walls of the first cavity 111), and a larger L3 (that is, the cavity wall of the first cavity 111) indicates a better strain amplification effect of the strain amplification layer (that is, the substrate 11). However, in an actual product, a larger L1 and a larger L3 indicate a lower structural strength of the substrate, and a smaller L2 (that is, the size of the opening of the first cavity 111) indicates higher manufacture difficulty. According to the present manufacture level, L2>0.5 mm (mm). Therefore, in manufacture of the pressure detection structure in embodiments of this application, sizes of parts in the first cavity may be designed based on the present manufacture level, a material of the substrate, and a requirement on a structural strength of a substrate in a process of using the product, so that a best strain amplification effect can be achieved.

It should be noted that although disposing first cavities of different shapes on substrates leads to different strain amplification effects of the substrates, a substrate provided with a first cavity has a better strain amplification effect compared with a substrate without a cavity, regardless of a shape of the first cavity.

For example, the first cavity 111 shown in FIG. 7 is used as an example to describe differences in structural strengths and strain amplification effects between the substrate provided with a cavity and the substrate without a cavity. It is assumed that in a pressure detection structure without a cavity, except that there is no cavity, other components and relative position relationships are completely the same as those in the pressure detection structure 410 shown in FIG. 7.

Figure 15A:
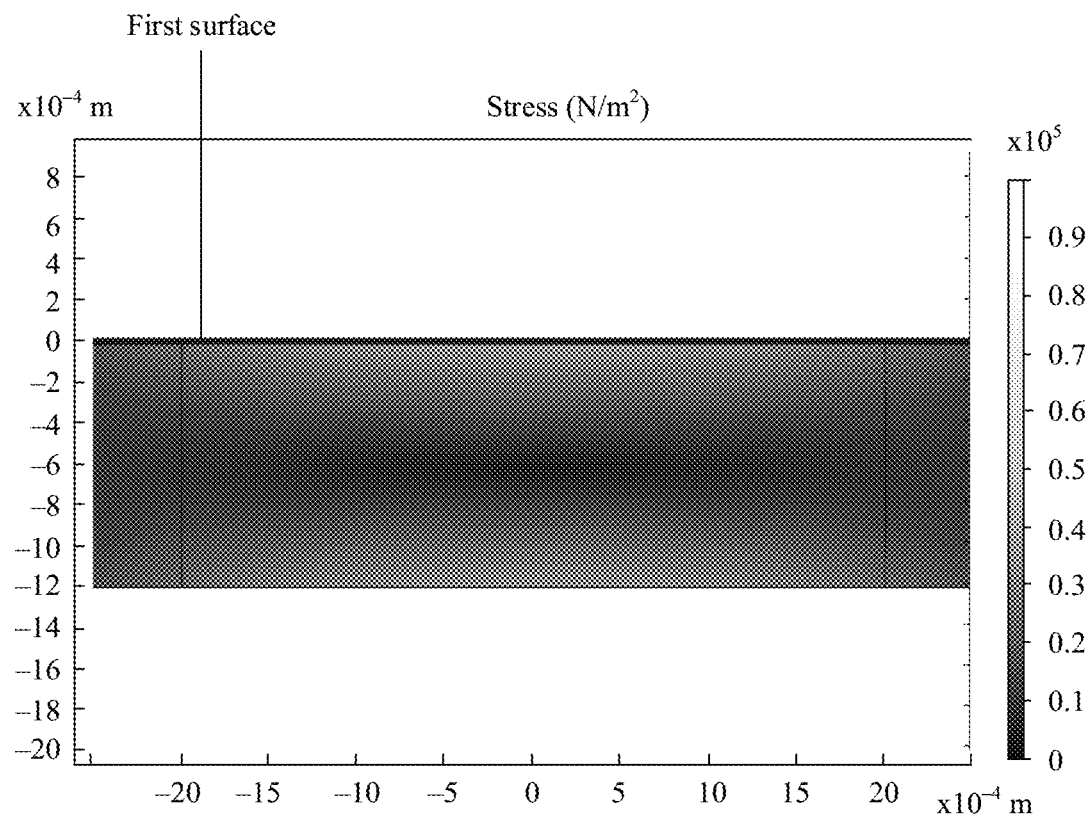
FIG. 15A is a schematic diagram of a simulation result of a pressure detection structure that does not include a cavity.

It is assumed that the pressure detection structure without a cavity and the pressure detection structure 410 are subject to an external force of 1.3 kPa. Refer to FIG. 15A. FIG. 15A shows a schematic diagram of stress simulation on a first surface of the pressure detection structure without a cavity when the external force of 1.3 kPa is exerted on the pressure detection structure without a cavity. Refer to Table 5. Table 5 is a table of stress simulation parameters of the pressure detection structure without a cavity and the pressure detection structure 410 shown in FIG. 7.

TABLE 5

Table of stress simulation parameters

| Cavity shape | With a cavity (the first cavity 111) | Without a cavity |
| --- | --- | --- |
| Differential resistor layer (kPa) | 8.9409 | 0.73 |
| Stress conversion rate | 688% | 56% |
| Maximum stress on a substrate (kPa) | 58 | 30 |

As shown in Table 5, when the force of 1.3 kPa is exerted on the pressure detection structure 410 shown in FIG. 7, the strain amplification layer of the pressure detection structure 410 may amplify the external force to 8.9409 kPa, and transfer the external force to the differential resistor layer. The stress conversion rate of the pressure detection structure 410 is 688%, where 8.9409/1.3=688%. The force of 1.3 kPa is exerted on the pressure detection structure 410, and then the substrate of the pressure detection structure 410 deforms. The maximum stress generated due to deformation of the substrate inside the substrate is 58 kPa.

When the force of 1.3 kPa is exerted on the pressure detection structure without a cavity, a strain amplification layer of the pressure detection structure without a cavity may amplify the external force to 0.73 kPa, and transfer the external force to a differential resistor layer. A stress conversion rate of the pressure detection structure without a cavity is 56%, where 0.73/1.3=56%. The force of 1.3 kPa is exerted on the pressure detection structure without a cavity, and then the substrate of the pressure detection structure without a cavity deforms. A maximum stress generated due to deformation of the substrate inside the substrate is 30 kPa.

It can be learned from Table 5 that the stress exerted on the substrate of the pressure detection structure 410 is greater than the stress exerted on the substrate of the pressure detection structure without a cavity, that is, the structural strength of the substrate of the pressure detection structure 410 is lower than a structural strength of the substrate of the pressure detection structure without a cavity. The stress conversion rate of the pressure detection structure 410 is much greater than the stress conversion rate of the pressure detection structure without a cavity. In other words, the strain amplification effect of the pressure detection structure 410 is better than the strain amplification effect of the pressure detection structure without a cavity.

In embodiments of this application, authenticity and appropriateness of the foregoing simulation data can be proved by the following experiment. In the experiment, an external force of 1.3 kPa is exerted on the pressure detection structure 410 shown in FIG. 7 and the pressure detection structure without a cavity. Then an output voltage of each pressure detection structure is measured, and a normalized strain of each pressure detection structure is obtained based on the output voltage. Refer to Table 6. Table 6 shows a table of output voltages and normalized strain parameters of the pressure detection structure 410 shown in FIG. 7 and the pressure detection structure without a cavity.

TABLE 6

Table of output voltages and normalized strain parameters of substrates

| Cavity shape | With a cavity (the first cavity 111) | Without a cavity |
|---|---|---|
| Vout | 157.43 | 34.73 |
| Normalized strain | 1 | 0.088242 |

As shown in Table 6, the output voltage of the pressure detection structure 410 is greater than an output voltage of the pressure detection structure without a cavity, and the normalized strain of the pressure detection structure 410 is much greater than a normalized strain of the pressure detection structure without a cavity.

Figure 15B:
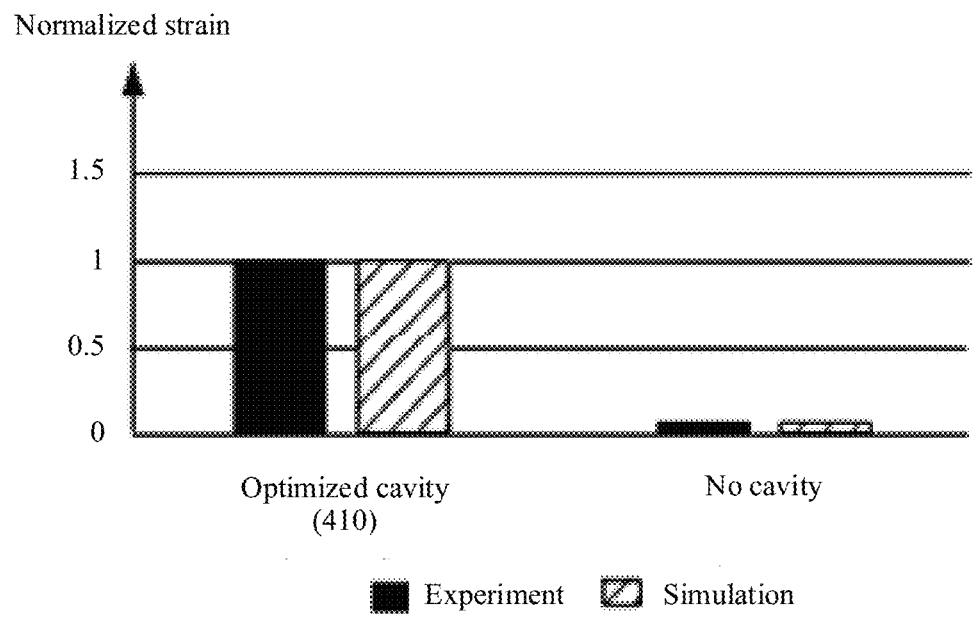
FIG. 15B is a schematic diagram of comparison between simulated normalized strains and experimental normalized strains of a pressure detection structure that does not include a cavity and the pressure detection structure shown in FIG. 5.

In this embodiment of this application, a simulated normalized strain of each pressure detection structure may be calculated based on stresses that correspond to the strain amplification layer and the differential resistor layer of each pressure detection structure and that are shown in Table 5. FIG. 15B is a schematic diagram of comparison between the simulated normalized strains and the experimental normalized strains of the pressure detection structure 410 shown in FIG. 7 and the pressure detection structure without a cavity according to this embodiment of this application, where the comparison is based on the parameters in Table 5 and Table 6. It can be learned from FIG. 15B that the simulated normalized strains of the pressure detection structure 410 shown in FIG. 7 and the pressure detection structure without a cavity are basically consistent with the experimental normalized strains.

Figure 15C:
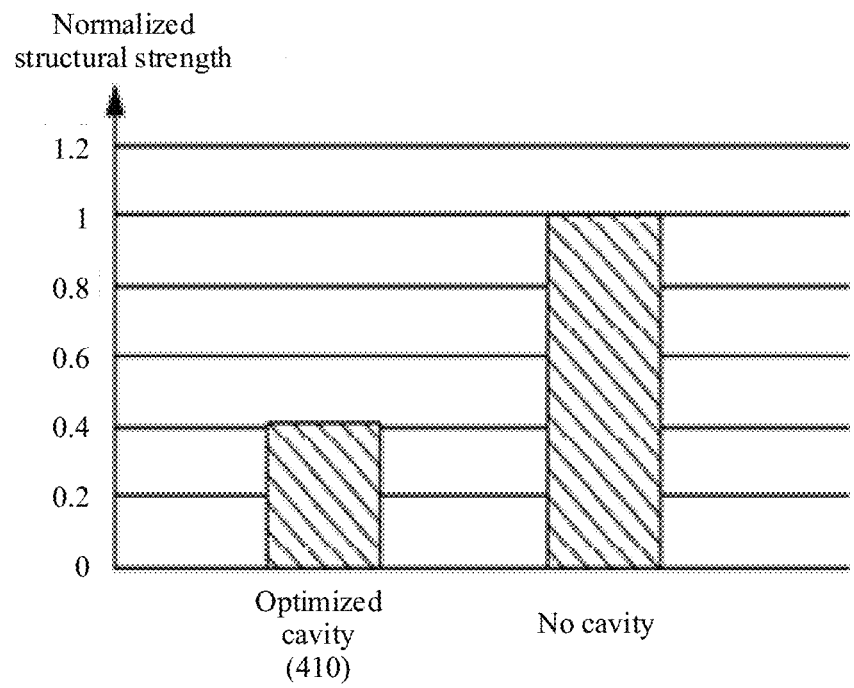
FIG. 15C is a schematic diagram of experimental normalized structural strengths of a pressure detection structure that does not include a cavity and the pressure detection structure shown in FIG. 5.

Refer to FIG. 15C. FIG. 15C is a schematic diagram of normalized structural strengths of the pressure detection structures in the experiment. It can be learned from FIG. 15C that the structural strength of the pressure detection structure 410 is lower than the structural strength of the pressure detection structure without a cavity. The structural strength of each pressure detection structure in experimental data shown in FIG. 15C is basically consistent with the structural strength of each pressure detection structure in simulation data.

In conclusion, the simulation data is authentic and appropriate. Strain amplification effects of the substrate provided with a first cavity and the substrate without a cavity are different, and structural strengths of the substrates are also different.

Figure 16A:
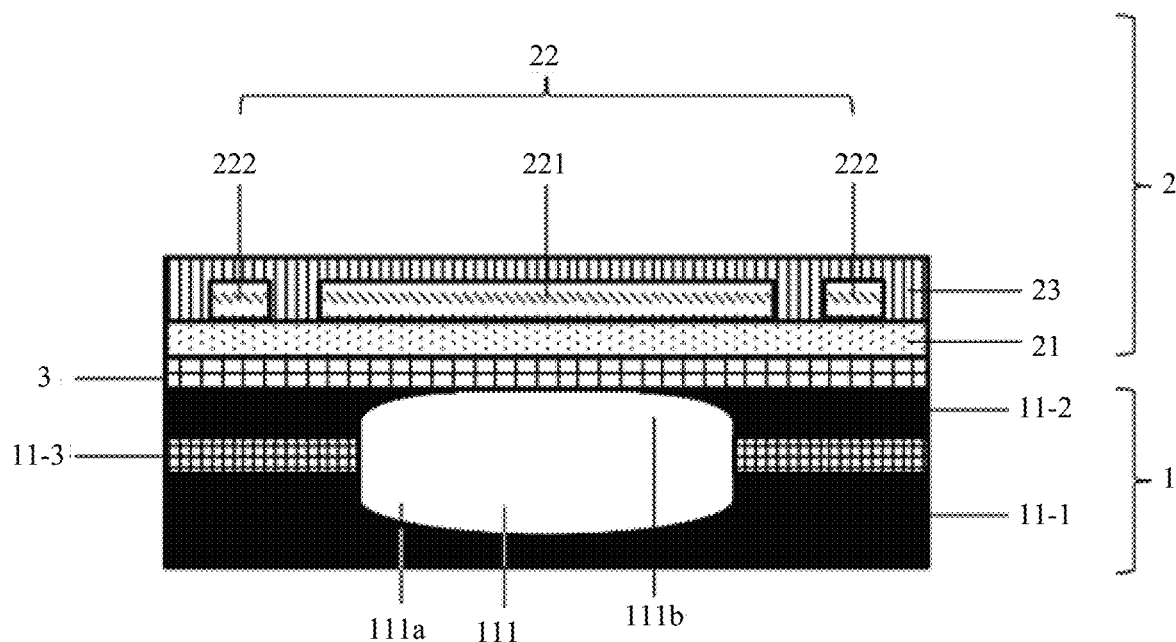
FIG. 16A is another sectional view aa of the pressure detection structure shown in FIG. 5.
Figure 16B:
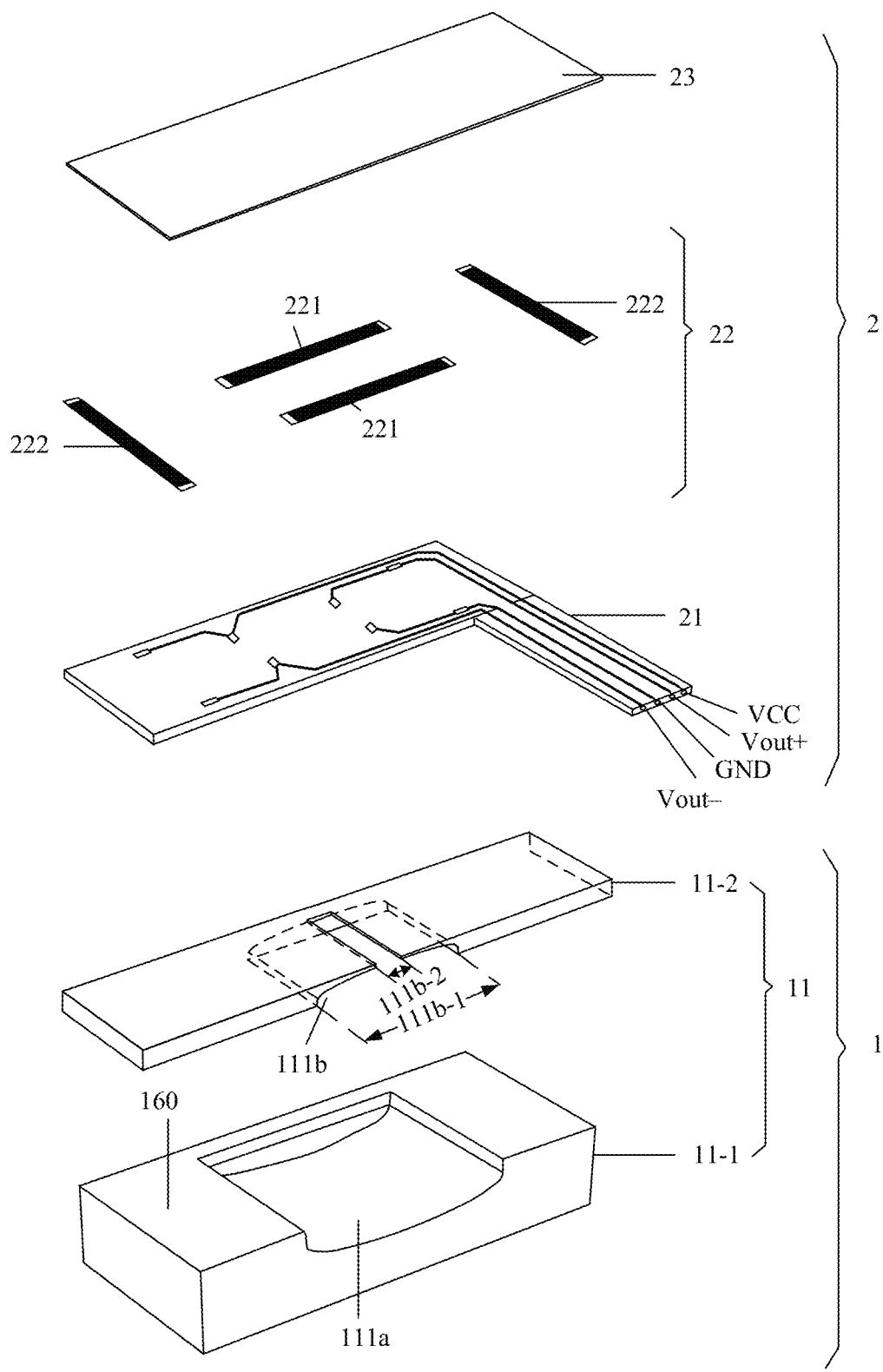
FIG. 16B is another schematic diagram of an exploded structure of the pressure detection structure shown in FIG. 5.

In some embodiments, the substrate 11 may be an integrated substrate. For example, as shown in FIG. 6 or FIG. 7, the substrate 11 is an integrated substrate. In some other embodiments, a second cavity is disposed on the inner side of the middle frame of the electronic device. In the second cavity, an open substrate 11 is disposed on the inner side of the middle frame, and may include a middle frame of the second cavity and a first module on which through holes are disposed. For example, FIG. 16A is another sectional view aa of the pressure detection structure 410 shown in FIG. 5. The substrate 11 may include the middle frame 11-1 and the first module 11-2 shown in FIG. 16A or FIG. 16B. The middle frame 11-1 may be the middle frame of the electronic device 400. As shown in FIG. 16A, a second cavity 111a is disposed on one side of the middle frame 11-1, and the first module 11-2 is fastened to the side that is of the middle frame 11-1 and on which the second cavity 111a is disposed. As shown in FIG. 16B, a first opening 111b-1 of a through hole 111b of the first module 11-2 corresponds to an opening of the second cavity 111a. The second cavity 111a and the through hole 111b of the first module 11-2 may form the first cavity 111, and a second opening 111b-2 of the through hole 111b of the first module 11-2 shown in FIG. 16B is an opening of the first cavity 111. Refer to FIG. 16B. FIG. 16B is a schematic diagram of an exploded structure of the pressure detection structure 410 shown in FIG. 5, where the schematic diagram corresponds to FIG. 16A. For the first dielectric layer 21, the piezo-resistor layer 22, and the insulating protection layer 23 shown in FIG. 16B, refer to the descriptions of the corresponding components in FIG. 6 in the foregoing embodiments. The substrate 11 shown in FIG. 16B is different from the substrate 11 shown in FIG. 6. As shown in FIG. 16B, the substrate 11 includes the middle frame 11-1 and the first module 11-2.

In embodiments of this application, the first cavity may be a through cavity or a non-through cavity. For example, as shown in FIG. 16B, the cavity of the substrate 11 is a non-through cavity. Certainly, in embodiments of this application, a first cavity of an integrated substrate may alternatively be a non-through cavity, and a first cavity of a non-integrated substrate (for example, the substrate including the middle frame of the second cavity and the first module) may alternatively be a through cavity. This is not limited in embodiments of this application.

For example, the first module 11-2 may be fastened to an inner side of the middle frame 11-1 by using adhesive, welding, screwing, or the like. For example, the first module 11-2 may be fastened to the inner side of the middle frame 11-1 by using glue 11-3. The glue 11-3 is glue with a high elastic modulus (that is glue whose elastic modulus is greater than a first modulus threshold). It can be learned from the description of the elastic modulus in the foregoing term introduction that a higher elastic modulus of an object indicates better normal stress transfer performance of the object. Therefore, the first module 11-2 is fastened on the inner side of the middle frame 11-1 by using the glue with a high elastic modulus. This can reduce a loss of a normal stress transferred from the middle frame 11-1 to the first module 11-2, so that the substrate 11 is subject to a maximum normal stress. This helps implement strain amplification. It should be noted that an operating principle of the pressure detection structure shown in FIG. 16A is the same as the operating principle of the pressure detection structure shown in FIG. 7. Details are not described herein again in this embodiment of this application.

In some embodiments, the pressure detection structure 410 may further include a second dielectric layer and a capacitive layer. The second dielectric layer is fastened to the second surface of the substrate. For example, the second dielectric layer may be fastened to the second surface of the substrate by using adhesive, welding, screwing, or the like. The capacitive layer is disposed on a surface that is of the second dielectric layer and that faces the contact surface with the substrate.

Figure 17:
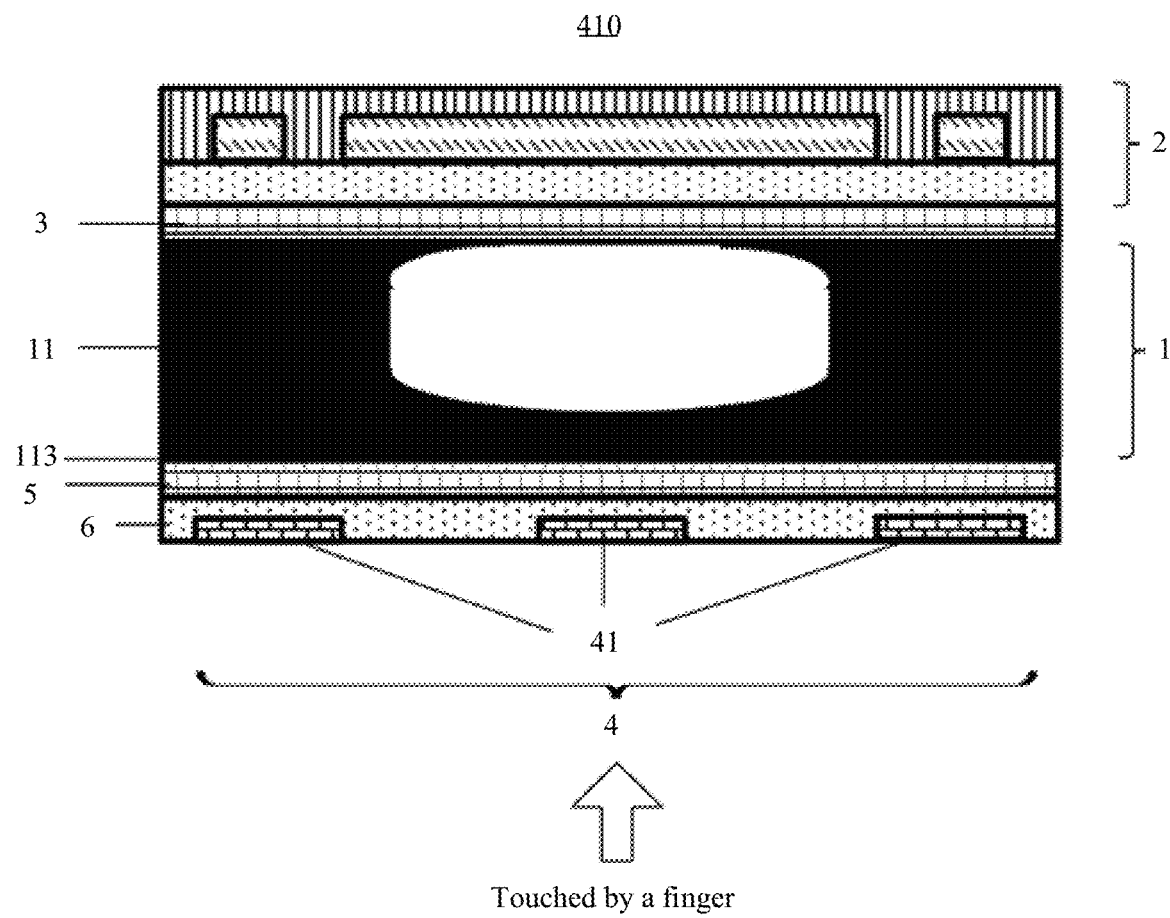
FIG. 17 is a section view of a pressure detection structure of a capacitor configured to detect a touch operation of a user according to an embodiment of this application.

For example, as shown in FIG. 17, the pressure detection structure 410 may further include a second dielectric layer 6 and a capacitive layer 4. The capacitive layer 4 may include one or more metal electrodes 41 connected to a circuit. The capacitive layer 4 is disposed on the second dielectric layer 6. The second dielectric layer 6 is fastened to a second surface 113 of the substrate 11, and the second surface 113 faces the first surface of the substrate 11. An output end of the circuit connected to one or more metal electrodes 41 in the capacitive layer 4 is connected to the processor 420.

For example, as shown in FIG. 17, the second dielectric layer 6 is fastened to the second surface 113 of the substrate 11 by using adhesive 5. The adhesive 5 may be glue with a high elastic modulus. The second dielectric layer 6 is fastened to the second surface 113 of the substrate 11 by using the glue with a high elastic modulus. In this way, a loss of a normal stress transferred from the second dielectric layer 6 to the strain amplification layer 1 (that is, the substrate 11) can be reduced, and the strain amplification layer 1 is subject to a maximum normal stress, which helps strain amplification.

It may be understood that, as shown in FIG. 17, when a finger approaches or contacts the pressure detection structure 410 in a direction indicated by an arrow, an electric charge flow occurs on the metal electrode 41 due to a capacitance effect, and then an electric signal is generated. Because the output end of the circuit connected to one or more metal electrodes 41 in the capacitive layer 4 is connected to the processor 420, the processor 420 can detect the electrical signal, and therefore approach and touch by a finger of a user can be detected. As shown in the figure, the metal electrode 41 may be in different shapes such as a rectangle, a parallelogram, a rhombus, and an arrow, and the plurality of metal electrodes 41 may be arranged in a strip shape or an array shape, which helps sliding signal detection.

In some embodiments, if the processor 420 detects approach and touch of a finger of the user based on the electrical signal, a preset component of the electronic device 400 may be triggered to send prompt information, to prompt the user to input a touch operation to control the electronic device 400.

For example, the preset component may be a motor of the electronic device 400. When the preset component is the motor of the electronic device 400, the prompt information may be a vibration prompt. Alternatively, the preset component may be a speaker of the electronic device 400, and the prompt information may be a voice prompt. The prompt information is used to prompt the user to input a touch operation in a finger contact area to control the electronic device 400.

In some embodiments, the capacitive layer 4 includes a plurality of metal electrodes 41. In this case, contact points and sliding directions of the finger are different on a surface of the capacitive layer 4. Therefore, the capacitive layer 4 can output different electrical signals. The processor 420 may detect a type (for example, a single-finger operation or a multi-finger operation) and a sliding direction of the touch operation (that is, the press operation) of the user based on a charge output by the capacitive layer 4. Then the processor 420 may trigger, based on the type and the sliding direction of the touch operation, components in the electronic device 400 to respond to the touch operation of the user. Optionally, for touch operations whose sliding directions and types are different, the processor 420 may trigger the preset component in the electronic device 400 to send different prompt information, for example, vibration prompts with different vibration frequencies and/or different vibration times.

Figure 18:
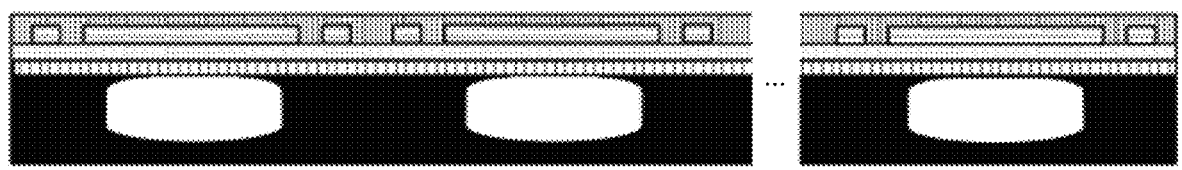
FIG. 18 is a section view of a plurality of pressure detection structures according to an embodiment of this application.

In some embodiments, the electronic device 400 may include a plurality of pressure detection structures shown in FIG. 18. For example, the plurality of pressure detection structures may be disposed side by side in the electronic device 400. For example, as shown in FIG. 1C, three pressure detection structures are disposed in the mobile phone, for example, the pressure detection structure 101, the pressure detection structure 102, and the pressure detection structure 103.

The plurality of pressure detection structures in the electronic device may be disposed side by side. For example, as shown in FIG. 1C, the pressure detection structure 102 and the pressure detection structure 103 are disposed side by side on the right-side frame of the mobile phone. The plurality of pressure detection structures may work independently or may work cooperatively. When the finger of the user continuously slides over a plurality of buttons, different touch and slide operations may be identified based on combinations of output signals of different pressure detection structures, for example, a slide direction may be identified. Alternatively, the plurality of pressure detection structures in the electronic device may not be disposed side by side. For example, as shown in FIG. 1C, the pressure detection structure 101 and the pressure detection structure 103 are disposed in the left-side frame and the right-side frame of the mobile phone respectively, and are not disposed side by side. It should be noted that, regardless of positions of the plurality of pressure detection structures in the electronic device, each pressure detection structure may work independently.

In the pressure detection structure provided in embodiments of this application, a strain of a first piezo-resistor in the pressure detection structure is increased, and therefore pressure detection sensitivity of the pressure detection structure is improved. In addition, impact of temperature on a resistance value of a piezo-resistor can be reduced, and therefore accuracy of pressure detection is improved.

In addition, a manufacture process of the pressure detection structure is simple, and therefore assembly and mass production of the pressure detection structure is easy. This can reduce production costs of the pressure detection structure. Further, a medium that is of the pressure detection structure and to which a pressure is exerted is not specified. A pressure directly exerted by the user by using a finger, a pressure exerted by the user by using a finger wearing gloves, and a pressure exerted by the user by using any other media such as a conductor or an insulator can all be detected by the pressure detection structure. In this way, generalization of an application scenario of the pressure detection structure can be improved.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. An electronic device comprising:
a processor; and
a pressure detection structure, wherein the processor is connected to an output end of the pressure detection structure;
wherein the pressure detection structure comprises a substrate, a first dielectric layer, and N piezo-resistors, wherein N≥2, and N is an integer; a first cavity is disposed in the substrate; an opening of the first cavity is provided on a first surface of the substrate; the first dielectric layer is fastened to the first surface of the substrate; and the N piezo-resistors are fastened to the first dielectric layer;
wherein the N piezo-resistors comprise one or more first piezo-resistors and one or more second piezo-resistors, and the one or more first piezo-resistors and the one or more second piezo-resistors are made of a same material and have a same resistance value;
wherein the N piezo-resistors and the first dielectric layer form a contact surface;
wherein two ends, in a first direction, of a vertical projection of each first piezo-resistor on the contact surface are on two sides, in the first direction, of a vertical projection of the first cavity on the contact surface; the first direction is parallel to a long side of the first piezo-resistor;
wherein a vertical projection of each second piezo-resistor on the contact surface does not overlap with the vertical projection of the first cavity on the contact surface;
wherein the N piezo-resistors are connected at the first dielectric layer to form a Wheatstone bridge; when a second surface of the substrate facing the first surface is pressed by an external force, a stress is transferred to the first dielectric layer to deform the first piezo-resistor; and an output end of the Wheatstone bridge is the output end of the pressure detection structure; and
wherein the processor is configured to: receive an output voltage of the Wheatstone bridge, and determine, based on the output voltage, a press operation performed on a pressure-sensitive button formed by the pressure detection structure.

2. The electronic device according to claim 1, wherein the substrate is an integrated substrate; and
the substrate is a middle frame of the electronic device, and an inner side of the middle frame is the first surface of the substrate, or the substrate is a component independent of the middle frame of the electronic device, wherein the second surface of the substrate is attached to the inner side of the middle frame, or the second surface of the substrate is attached to a lower surface of a display screen of the electronic device.

3. The electronic device according to claim 1, wherein a second cavity is disposed on an inner side of a middle frame of the electronic device, an opening of the second cavity is provided on the inner side of the middle frame, and the substrate comprises a first module on which a through hole is disposed and the middle frame on which the second cavity is disposed, wherein
the first module is fastened to a surface, of the middle frame, on which the second cavity is disposed, a first opening of the through hole of the first module corresponds to the opening of the second cavity, the second cavity and the through hole of the first module form the first cavity, and a second opening of the through hole of the first module is the opening of the first cavity.

4. The electronic device according to claim 3, wherein the first module is fastened by glue to a surface, of the middle frame, on which the opening of the second cavity is provided; and
an elastic modulus of the glue is greater than a first modulus threshold.

5. The electronic device according to claim 1, wherein the first dielectric layer is an elastic dielectric layer, and the first dielectric layer is fastened to the first surface of the substrate by glue; and
a shear modulus of the glue is greater than a second modulus threshold.

6. The electronic device according to claim 1, wherein the two ends, in the first direction, of the vertical projection of the first piezo-resistor on the contact surface are located beyond the vertical projection of the first cavity on the contact surface.

7. The electronic device according to claim 1, wherein a center line, in a second direction, of the vertical projection of the first piezo-resistor on the contact surface coincides with a center line, in the second direction, of the vertical projection of the first cavity on the contact surface; and the second direction is perpendicular to the first direction.

8. The electronic device according to claim 1, wherein a long side of the second piezo-resistor is perpendicular to the first direction.

9. The electronic device according to claim 1, wherein N=4, the N piezo-resistors comprise two first piezo-resistors and two second piezo-resistors, and the N piezo-resistors are connected at the first dielectric layer to form a full bridge of the Wheatstone bridge, wherein
a distribution of vertical projections of the two second piezo-resistors on the contact surface is symmetric about the center line, in the second direction, of the vertical projection of the first cavity on the contact surface, and the second direction is perpendicular to the first direction.

10. The electronic device according to claim 9, wherein the Wheatstone bridge comprises a first output end and a second output end; and
the processor is further configured to: receive an output voltage of the first output end and an output voltage of the second output end, use a difference between the output voltage of the first output end and the output voltage of the second output end as a pressure signal, and determine, based on the pressure signal, the press operation performed on the pressure-sensitive button, so that the electronic device performs a function corresponding to the press operation.

11. The electronic device according to claim 1, wherein N=2, and the N piezo-resistors comprise one first piezo-resistor and one second piezo-resistor; and
the N piezo-resistors are connected at the first dielectric layer to form one half bridge of the Wheatstone bridge.

12. The electronic device according to claim 1, wherein N=6, the N piezo-resistors comprise two first piezo-resistors and four second piezo-resistors, and the N piezo-resistors are connected at the first dielectric layer to form three half bridges of the Wheatstone bridge, wherein
among the four second piezo-resistors, a distribution of vertical projections of two second piezo-resistors on the contact surface is symmetric about the center line, in the second direction, of the vertical projection of the first cavity on the contact surface; long sides of the two second piezo-resistors are perpendicular to the first direction; in the other two second piezo-resistors, a long side of one second piezo-resistor is parallel to the first direction, and a long side of the other second piezo-resistor is perpendicular to the first direction; and the second direction is perpendicular to the first direction.

13. The electronic device according to claim 12, wherein the Wheatstone bridge comprises a third output end, a fourth output end, and a fifth output end;

the processor is further configured to: receive an output voltage of the third output end, an output voltage of the fourth output end, and an output voltage of the fifth output end; use a difference between the output voltage of the third output end and the output voltage of the fourth output end as a pressure signal; and determine, based on the pressure signal, the press operation performed on the pressure-sensitive button, so that the electronic device performs a function corresponding to the press operation; and the processor is further configured to use a variation of the output voltage of the fifth output end as a temperature compensation signal, to eliminate impact of temperature on the pressure signal.

14. The electronic device according to claim 1, wherein N=8, the N piezo-resistors comprise two first piezo-resistors and six second piezo-resistors, and the N piezo-resistors are connected at the first dielectric layer to form four half bridges of the Wheatstone bridge, wherein among the six second piezo-resistors, a distribution of vertical projections of every two second piezo-resistors on the contact surface is symmetric about the center line, in the second direction, of the vertical projection of the first cavity on the contact surface, and the second direction is perpendicular to the first direction.

15. The electronic device according to claim 14, wherein among the six second piezo-resistors, long sides of four second piezo-resistors are perpendicular to the first direction, and long sides of the other two second piezo-resistors are parallel to the first direction.

16. A pressure detection structure, wherein the pressure detection structure comprises:

a substrate, wherein a first cavity is disposed in the substrate, and an opening of the first cavity is provided on a first surface of the substrate;

a first dielectric layer is fastened to a first surface of the substrate; and

N piezo-resistors, fastened to the first dielectric layer, wherein N≥2, and N is an integer; the N piezo-resistors comprise one or more first piezo-resistors and one or more second piezo-resistors, and the one or more first piezo-resistors and the one or more second piezo-resistors are made of a same material and have a same resistance value; two ends, in a first direction, of a vertical projection of each first piezo-resistor on a contact surface between the N piezo-resistors and the first dielectric layer are on two sides, in the first direction, of a vertical projection of the first cavity on the contact surface; the first direction is parallel to a long side of the first piezo-resistor; a vertical projection of each second piezo-resistor on the contact surface does not overlap with the vertical projection of the first cavity on the contact surface; the N piezo-resistors are connected at the first dielectric layer to form a Wheatstone bridge; and an output end of the Wheatstone bridge is an output end of the pressure detection structure.

17. The pressure detection structure according to claim 16, wherein the first dielectric layer is an elastic dielectric layer, and the first dielectric layer is fastened to the first surface of the substrate by glue; and a shear modulus of the glue is greater than a second modulus threshold.

18. The pressure detection structure according to claim 16, wherein the two ends, in the first direction, of the vertical projection of the first piezo-resistor on the contact surface are located beyond the vertical projection of the first cavity on the contact surface.

19. The pressure detection structure according to claim 16, wherein a center line, in a second direction, of the vertical projection of the first piezo-resistor on the contact surface coincides with a center line, in the second direction, of the vertical projection of the first cavity on the contact surface; and the second direction is perpendicular to the first direction.

20. The pressure detection structure according to claim 16, wherein a long side of the second piezo-resistor is perpendicular to the first direction.

* * * * *